United States Patent
Davidson

(10) Patent No.: US 10,309,788 B2
(45) Date of Patent: Jun. 4, 2019

(54) DETERMINING STREET SEGMENT HEADINGS

(71) Applicant: United Parcel Service of America, Inc., Atlanta, GA (US)

(72) Inventor: Mark J. Davidson, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 4 days.

(21) Appl. No.: 14/708,624

(22) Filed: May 11, 2015

(65) Prior Publication Data

US 2016/0334227 A1 Nov. 17, 2016

Related U.S. Application Data

(63) Continuation of application No. 14/708,473, filed on May 11, 2015, now abandoned.

(51) Int. Cl.
*G01C 21/26* (2006.01)
*G01C 21/34* (2006.01)
(Continued)

(52) U.S. Cl.
CPC ............ *G01C 21/26* (2013.01); *G01C 21/32* (2013.01); *G01C 21/34* (2013.01); *G06Q 10/04* (2013.01); *G09B 29/004* (2013.01); *G09B 29/007* (2013.01)

(58) Field of Classification Search
CPC .... G01C 21/26; G01C 21/30; G01C 21/3492; G01C 21/367; G01C 21/3658;
(Continued)

(56) References Cited

U.S. PATENT DOCUMENTS

| 3,526,127 A | 9/1970 | Sarkis |
| 3,789,198 A | 1/1974 | Henson et al. |

(Continued)

FOREIGN PATENT DOCUMENTS

| CN | 201732473 U | 2/2011 |
| DE | 196 18 535 A1 | 7/1997 |

(Continued)

OTHER PUBLICATIONS

Canadian Intellectual Property Office, Requisition by the Examiner for Application No. 2,917,808, dated Aug. 30, 2016, 3 pages, Canada.

(Continued)

*Primary Examiner* — Thomas G Black
*Assistant Examiner* — Sze-Hon Kong
(74) *Attorney, Agent, or Firm* — Shook, Hardy & Bacon, L.L.P.

(57) ABSTRACT

Embodiments of the present invention provide methods, systems, computer program products, and apparatuses for determining whether a street segment is a one-way street segment or a bi-directional segment, validating map data, and/or updating map data. In one embodiment, a method for determining whether a street segment is a one-way street segment or a bi-directional segment is provided. The method comprises receiving vehicle telematics data associated with one or more vehicles during one or more time periods, the vehicle telematics data indicating a street segment traveled by the one or more vehicles during the one or more time periods; and based at least in part on the vehicle telematics, determining whether the street segment is a one-way street segment or a bi-directional segment.

18 Claims, 18 Drawing Sheets

(51) Int. Cl.
*G01C 21/32* (2006.01)
*G06Q 10/04* (2012.01)
*G09B 29/00* (2006.01)

(58) Field of Classification Search
CPC ...... G01C 21/32; G01C 21/34; G08G 1/0112;
G08G 1/0141; G08G 1/0133; G08G
1/056; B60W 2550/402; B60W 2550/141;
G06Q 10/04; G09B 29/004; G09B 29/007
See application file for complete search history.

(56) References Cited

U.S. PATENT DOCUMENTS

| | | |
|---|---|---|
| 3,822,049 A | 7/1974 | Saunders |
| 4,113,217 A | 9/1978 | O'Connell |
| 4,124,815 A | 11/1978 | Stoschek |
| 4,152,693 A | 5/1979 | Ashworth, Jr. |
| 4,312,310 A | 1/1982 | Chivilo et al. |
| 4,398,515 A | 8/1983 | Canup et al. |
| 4,492,195 A | 1/1985 | Takahashi et al. |
| 4,514,811 A | 4/1985 | Daubenmier et al. |
| 4,773,011 A | 9/1988 | VanHoose |
| 4,945,759 A | 8/1990 | Krofchalk et al. |
| 4,977,399 A | 12/1990 | Price et al. |
| 5,014,206 A | 5/1991 | Scribner et al. |
| 5,041,976 A | 8/1991 | Marko et al. |
| 5,048,482 A | 9/1991 | Kraft et al. |
| 5,060,156 A | 10/1991 | Vajgart et al. |
| 5,068,656 A | 11/1991 | Sutherland |
| 5,095,500 A | 3/1992 | Tayloe et al. |
| 5,111,902 A | 5/1992 | Sundeen et al. |
| 5,117,682 A | 6/1992 | Amano |
| 5,214,757 A | 5/1993 | Mauney et al. |
| 5,218,367 A | 6/1993 | Sheffer et al. |
| 5,227,614 A | 7/1993 | Danielson et al. |
| 5,347,274 A | 9/1994 | Hassett et al. |
| 5,398,276 A | 3/1995 | Lemke et al. |
| 5,414,809 A | 5/1995 | Hogan et al. |
| 5,444,444 A | 8/1995 | Ross et al. |
| 5,472,097 A | 12/1995 | Villachica |
| 5,481,588 A | 1/1996 | Rickli et al. |
| 5,497,149 A | 3/1996 | Fast |
| 5,500,516 A | 3/1996 | Durbin |
| 5,515,419 A | 5/1996 | Sheffer |
| 5,528,758 A | 6/1996 | Yeh |
| 5,534,684 A | 7/1996 | Danielson |
| 5,561,839 A | 10/1996 | Österberg et al. |
| 5,619,412 A | 4/1997 | Hapka |
| 5,635,693 A | 6/1997 | Benson et al. |
| 5,648,770 A | 7/1997 | Ross |
| 5,708,423 A | 1/1998 | Ghaffari et al. |
| 5,736,725 A | 4/1998 | Danielson |
| 5,739,787 A | 4/1998 | Burke et al. |
| 5,751,245 A | 5/1998 | Janky et al. |
| 5,751,973 A | 5/1998 | Hassett et al. |
| 5,752,164 A | 5/1998 | Jones |
| 5,758,313 A | 5/1998 | Shah et al. |
| 5,771,169 A | 6/1998 | Wendte |
| 5,797,134 A | 8/1998 | McMillan et al. |
| 5,802,545 A | 9/1998 | Coverdill |
| 5,805,419 A | 9/1998 | Hundt et al. |
| 5,808,564 A | 9/1998 | Simms et al. |
| 5,808,565 A | 9/1998 | Matta et al. |
| 5,808,907 A | 9/1998 | Shetty et al. |
| 5,815,093 A | 9/1998 | Kikinis |
| 5,818,356 A | 10/1998 | Schuessler |
| 5,825,283 A | 10/1998 | Camhi |
| 5,834,749 A | 11/1998 | Durbin |
| 5,835,377 A | 11/1998 | Bush |
| 5,857,159 A | 1/1999 | Dickrell et al. |
| 5,862,500 A | 1/1999 | Goodwin |
| 5,867,382 A | 2/1999 | McLaughlin |
| 5,867,785 A | 2/1999 | Averbuch et al. |
| 5,904,727 A | 5/1999 | Prabhakaran |
| 5,919,239 A | 7/1999 | Fraker et al. |
| 5,926,762 A | 7/1999 | Arpee et al. |
| 5,928,291 A | 7/1999 | Jenkins et al. |
| 5,938,716 A | 8/1999 | Shuty et al. |
| 5,946,612 A | 8/1999 | Johannson |
| 5,948,026 A | 9/1999 | Beemer, II et al. |
| 5,974,357 A | 10/1999 | Poonsaengsathit et al. |
| 5,982,325 A | 11/1999 | Thornton et al. |
| 5,987,306 A | 11/1999 | Nilsen et al. |
| 5,991,622 A | 11/1999 | Henry, Jr. |
| 5,993,098 A | 11/1999 | Osada |
| 6,003,010 A | 12/1999 | Scolly et al. |
| 6,003,773 A | 12/1999 | Durbin et al. |
| 6,031,455 A | 2/2000 | Grube et al. |
| 6,034,379 A | 3/2000 | Bunte et al. |
| 6,060,992 A | 5/2000 | Huang et al. |
| 6,064,970 A | 5/2000 | McMillan et al. |
| 6,071,643 A | 6/2000 | Chino et al. |
| 6,075,530 A | 6/2000 | Lucas et al. |
| 6,084,528 A | 7/2000 | Beach et al. |
| 6,084,870 A | 7/2000 | Wooten et al. |
| 6,088,648 A | 7/2000 | Shah et al. |
| 6,092,021 A | 7/2000 | Ehlbeck et al. |
| 6,098,048 A | 8/2000 | Dashefsky et al. |
| 6,108,591 A | 8/2000 | Segal et al. |
| 6,112,152 A | 8/2000 | Tuttle |
| 6,124,806 A | 9/2000 | Cunningham et al. |
| 6,124,810 A | 9/2000 | Segal et al. |
| 6,128,543 A | 10/2000 | Hitchner |
| 6,134,437 A | 10/2000 | Karabinis et al. |
| 6,148,262 A | 11/2000 | Fry |
| 6,157,838 A | 12/2000 | Di Huo et al. |
| 6,169,896 B1 | 1/2001 | Sant et al. |
| 6,181,994 B1 | 1/2001 | Colson et al. |
| 6,202,629 B1 | 3/2001 | Zhu et al. |
| 6,211,781 B1 | 4/2001 | McDonald |
| 6,246,672 B1 | 6/2001 | Lumelsky |
| 6,246,938 B1 | 6/2001 | Giletta et al. |
| 6,249,008 B1 | 6/2001 | Bunte et al. |
| 6,253,129 B1 | 6/2001 | Jenkins et al. |
| 6,272,337 B1 | 8/2001 | Mount et al. |
| 6,278,361 B1 | 8/2001 | Magiawala et al. |
| 6,282,486 B1 | 8/2001 | Bates et al. |
| 6,285,916 B1 | 9/2001 | Kadaba et al. |
| 6,292,724 B1 | 9/2001 | Apsell et al. |
| 6,295,492 B1 | 9/2001 | Lang et al. |
| 6,304,816 B1 | 10/2001 | Berstis |
| 6,306,063 B1 | 10/2001 | Horgan et al. |
| 6,307,576 B1 | 10/2001 | Rosenfeld |
| 6,308,120 B1 | 10/2001 | Good |
| 6,313,791 B1 | 11/2001 | Klanke |
| 6,315,255 B1 | 11/2001 | Chan et al. |
| 6,324,659 B1 | 11/2001 | Pierro |
| 6,330,499 B1 | 12/2001 | Chou et al. |
| 6,336,035 B1 | 1/2002 | Somoza et al. |
| 6,338,152 B1 | 1/2002 | Fera et al. |
| 6,339,745 B1 | 1/2002 | Novik |
| 6,356,836 B1 | 3/2002 | Adolph |
| 6,363,323 B1 | 3/2002 | Jones |
| 6,377,881 B1 | 4/2002 | Mullins |
| 6,389,337 B1 | 5/2002 | Kolls |
| 6,400,690 B1 | 6/2002 | Liu et al. |
| 6,401,027 B1 | 6/2002 | Xu et al. |
| 6,405,112 B1 | 6/2002 | Rayner |
| 6,408,232 B1 | 6/2002 | Cannon et al. |
| 6,408,233 B1 | 6/2002 | Solomon et al. |
| 6,411,891 B1 | 6/2002 | Jones |
| 6,433,732 B1 | 8/2002 | Dutta |
| 6,434,512 B1 | 8/2002 | Discenzo |
| 6,449,485 B1 | 9/2002 | Anzil |
| 6,459,967 B1 | 10/2002 | Otto |
| 6,459,969 B1 | 10/2002 | Bates et al. |
| 6,462,675 B1 | 10/2002 | Humphrey et al. |
| 6,466,862 B1 * | 10/2002 | DeKock ............ G08G 1/0104 340/901 |
| 6,470,240 B1 | 10/2002 | Haynes et al. |
| 6,477,452 B2 | 11/2002 | Good |
| 6,484,080 B2 | 11/2002 | Breed |
| 6,496,775 B2 | 12/2002 | McDonald, Jr. et al. |
| 6,496,806 B1 | 12/2002 | Horwitz et al. |

(56) References Cited

U.S. PATENT DOCUMENTS

| | | |
|---|---|---|
| 6,498,986 B1 | 12/2002 | Kurtzberg et al. |
| 6,502,030 B2 | 12/2002 | Hilleary |
| 6,509,749 B1 | 1/2003 | Buelna et al. |
| 6,525,672 B2 | 2/2003 | Chainer et al. |
| 6,526,341 B1 | 2/2003 | Bird et al. |
| 6,529,818 B2 | 3/2003 | Kitajima et al. |
| 6,535,142 B2 | 3/2003 | Wakabayashi et al. |
| 6,570,529 B2 | 5/2003 | Richton et al. |
| 6,580,973 B2 | 6/2003 | Leivian et al. |
| 6,587,787 B1 | 7/2003 | Yokota |
| 6,594,579 B1 | 7/2003 | Lowery et al. |
| 6,600,418 B2 | 7/2003 | Francis et al. |
| 6,603,966 B1 | 8/2003 | Sheffield |
| 6,604,033 B1 | 8/2003 | Banet et al. |
| 6,611,740 B2 | 8/2003 | Lowery et al. |
| 6,611,755 B1 | 8/2003 | Coffee et al. |
| 6,618,668 B1 | 9/2003 | Laird |
| 6,622,083 B1 | 9/2003 | Knockeart et al. |
| 6,629,034 B1 | 9/2003 | Kozak et al. |
| 6,634,329 B2 | 10/2003 | Kusano et al. |
| 6,636,790 B1 | 10/2003 | Lightner et al. |
| 6,648,770 B1 | 11/2003 | Snyder |
| 6,664,922 B1 | 12/2003 | Fan |
| 6,675,635 B2 | 1/2004 | Kasen et al. |
| 6,711,404 B1 | 3/2004 | Apree et al. |
| 6,711,408 B1 | 3/2004 | Raith |
| 6,731,925 B2 | 5/2004 | Naboulsi |
| 6,732,031 B1 | 5/2004 | Lightner et al. |
| 6,732,032 B1 | 5/2004 | Banet et al. |
| 6,741,938 B2 | 5/2004 | Berndorfer |
| 6,745,153 B2 | 6/2004 | White et al. |
| 6,763,903 B2 | 7/2004 | Morimoto et al. |
| 6,772,142 B1 | 8/2004 | Kelling et al. |
| 6,775,642 B2 | 8/2004 | Remboski et al. |
| 6,778,888 B2 | 8/2004 | Cataldo et al. |
| 6,792,352 B1 | 9/2004 | Hoffmann et al. |
| 6,801,850 B1 | 10/2004 | Wolfson |
| 6,802,291 B2 | 10/2004 | Ujifusa |
| 6,819,267 B1 | 11/2004 | Edmark |
| 6,819,988 B2 | 11/2004 | Dietz et al. |
| 6,832,140 B2 | 12/2004 | Fan et al. |
| 6,832,141 B2 | 12/2004 | Skeen et al. |
| 6,840,093 B2 | 1/2005 | Kasen et al. |
| 6,847,871 B2 | 1/2005 | Malik et al. |
| 6,850,823 B2 | 2/2005 | Eun et al. |
| 6,853,842 B1 | 2/2005 | Wilson et al. |
| 6,857,262 B2 | 2/2005 | Rendahl et al. |
| 6,859,039 B2 | 2/2005 | Horie et al. |
| 6,865,457 B1 | 3/2005 | Mittelsteadt et al. |
| 6,868,386 B1 | 3/2005 | Henderson et al. |
| 6,879,910 B2 | 4/2005 | Shike et al. |
| 6,879,969 B2 | 4/2005 | Engstroem et al. |
| 6,895,329 B1 | 5/2005 | Wolfson |
| 6,909,947 B2 | 6/2005 | Douros et al. |
| 6,911,830 B2 | 6/2005 | Heremans et al. |
| 6,915,128 B1 | 7/2005 | Oh |
| 6,919,821 B1 | 7/2005 | Smith |
| 6,920,779 B2 | 7/2005 | Carlstrom et al. |
| 6,925,425 B2 | 8/2005 | Remboski et al. |
| 6,928,280 B1 | 8/2005 | Xanthos et al. |
| 6,931,235 B2 | 8/2005 | Kline et al. |
| 6,933,842 B2 | 8/2005 | Oesterling et al. |
| 6,947,827 B2 | 9/2005 | Fuse et al. |
| 6,960,168 B2 | 11/2005 | Yanagidaira et al. |
| 6,975,928 B2 | 12/2005 | Timko et al. |
| 7,002,579 B2 | 2/2006 | Olson |
| 7,003,289 B1 | 2/2006 | Kolls |
| 7,016,771 B2 | 3/2006 | Watkins et al. |
| 7,024,306 B2 | 4/2006 | Minami et al. |
| 7,027,808 B2 | 4/2006 | Wesby |
| 7,031,663 B2 | 4/2006 | Heinonen et al. |
| 7,034,683 B2 | 4/2006 | Ghazarian |
| 7,062,264 B2 | 6/2006 | Ko et al. |
| 7,075,421 B1 | 7/2006 | Tuttle |
| 7,076,505 B2 | 7/2006 | Campbell |
| 7,089,198 B2 | 8/2006 | Freedenberg et al. |
| 7,089,784 B2 | 8/2006 | Jakoby et al. |
| 7,090,134 B2 | 8/2006 | Ramsager |
| 7,099,669 B2 | 8/2006 | Sheffield |
| 7,107,150 B2 | 9/2006 | Iwamura et al. |
| 7,113,793 B2 | 9/2006 | Veerasamy et al. |
| 7,113,839 B2 | 9/2006 | Ferguson et al. |
| 7,146,264 B2 | 12/2006 | Bates et al. |
| 7,155,321 B2 | 12/2006 | Bromley et al. |
| 7,161,688 B1 | 1/2007 | Bonner et al. |
| 7,162,339 B2 | 1/2007 | Nguyen |
| 7,173,632 B2 | 2/2007 | Inokuchi et al. |
| 7,174,301 B2 | 2/2007 | Florance et al. |
| 7,212,122 B2 | 5/2007 | Gloekler et al. |
| 7,216,037 B2 | 5/2007 | Graulich et al. |
| 7,236,779 B2 | 6/2007 | Lahav et al. |
| 7,248,159 B2 | 7/2007 | Smith |
| 7,251,558 B1 | 7/2007 | McGrath |
| 7,257,396 B2 | 8/2007 | Olsen et al. |
| 7,263,419 B2 | 8/2007 | Wheals et al. |
| 7,266,435 B2 | 9/2007 | Wang |
| 7,271,716 B2 | 9/2007 | Nou et al. |
| 7,289,786 B2 | 10/2007 | Krasner |
| 7,292,152 B2 | 11/2007 | Torkkola et al. |
| 7,299,125 B2 | 11/2007 | Marks et al. |
| 7,302,371 B2 | 11/2007 | Oesterling et al. |
| 7,309,178 B2 | 12/2007 | Ikeda |
| 7,313,530 B2 | 12/2007 | Smith et al. |
| 7,317,975 B2 | 1/2008 | Woolford et al. |
| 7,327,258 B2 | 2/2008 | Fast et al. |
| 7,333,820 B2 | 2/2008 | Sheha et al. |
| 7,343,174 B2 | 3/2008 | Suryanarayana et al. |
| 7,349,782 B2 | 3/2008 | Churchill et al. |
| 7,356,392 B2 | 4/2008 | Hubbard et al. |
| 7,358,857 B1 | 4/2008 | White |
| 7,385,529 B2 | 6/2008 | Hersh et al. |
| 7,389,178 B2 | 6/2008 | Raz et al. |
| 7,394,393 B2 | 7/2008 | Zhang et al. |
| 7,395,140 B2 | 7/2008 | Christie et al. |
| 7,400,954 B2 | 7/2008 | Sumcad et al. |
| 7,409,274 B2 | 8/2008 | Grana et al. |
| 7,412,398 B1 | 8/2008 | Bailey |
| 7,430,471 B2 | 9/2008 | Simon |
| 7,444,311 B2 | 10/2008 | Engstrom et al. |
| 7,457,693 B2 | 11/2008 | Olsen et al. |
| 7,463,951 B2 | 12/2008 | Ampunan et al. |
| 7,469,827 B2 | 12/2008 | Katragadda et al. |
| 7,480,551 B1 | 1/2009 | Lowery et al. |
| 7,486,181 B2 | 2/2009 | Olsen et al. |
| 7,487,036 B2 | 2/2009 | Kim |
| 7,489,996 B2 | 2/2009 | Gowan et al. |
| 7,515,302 B2 | 4/2009 | Furuta |
| 7,523,159 B1 | 4/2009 | Williams et al. |
| 7,532,958 B2 | 5/2009 | Powers et al. |
| 7,536,457 B2 | 5/2009 | Miller |
| 7,542,915 B2 | 6/2009 | Kendrick |
| 7,554,441 B2 | 6/2009 | Viegers et al. |
| 7,561,054 B2 | 7/2009 | Raz et al. |
| 7,561,069 B2 | 7/2009 | Horstemeyer |
| 7,564,377 B2 | 7/2009 | Kimchi et al. |
| 7,565,230 B2 | 7/2009 | Gardner et al. |
| 7,571,036 B2 | 8/2009 | Olsen et al. |
| 7,571,111 B2 | 8/2009 | Ahrens et al. |
| 7,584,033 B2 | 9/2009 | Mittelsteadt et al. |
| 7,587,276 B2 | 9/2009 | Gold et al. |
| 7,589,619 B2 | 9/2009 | DeKeuster et al. |
| 7,599,786 B2 | 10/2009 | Utsumi et al. |
| 7,599,843 B2 | 10/2009 | Watkins et al. |
| 7,603,138 B2 | 10/2009 | Zhang et al. |
| 7,616,217 B2 | 11/2009 | Dayan et al. |
| 7,619,515 B2 | 11/2009 | Valania |
| 7,627,406 B2 | 12/2009 | Wang et al. |
| 7,627,535 B2 | 12/2009 | Brockman et al. |
| 7,659,827 B2 | 2/2010 | Gunderson et al. |
| 7,672,774 B2 | 3/2010 | Glaza et al. |
| 7,676,306 B2 | 3/2010 | Kubo et al. |
| 7,683,774 B2 | 3/2010 | Olsen et al. |
| 7,705,743 B2 | 4/2010 | Barone et al. |
| 7,706,938 B2 | 4/2010 | Palladino |

(56) References Cited

U.S. PATENT DOCUMENTS

| | | |
|---|---|---|
| 7,714,705 B2 | 5/2010 | Rennie et al. |
| 7,715,961 B1 | 5/2010 | Kargupta |
| 7,725,216 B2 | 5/2010 | Kim |
| 7,739,007 B2 | 6/2010 | Logsdon |
| 7,765,058 B2 | 7/2010 | Doering |
| 7,769,499 B2 | 8/2010 | McQuade et al. |
| 7,774,130 B2 | 8/2010 | Pepper |
| 7,778,752 B1 | 8/2010 | Hunt et al. |
| 7,786,895 B2 | 8/2010 | Zoladek et al. |
| 7,788,005 B2 | 8/2010 | Enomoto et al. |
| 7,789,796 B2 | 9/2010 | Choi |
| 7,805,233 B2 | 9/2010 | Gowan et al. |
| 7,860,636 B2 | 12/2010 | Yamaguchi |
| 7,860,637 B2 | 12/2010 | Yamaguchi |
| 7,877,198 B2 | 1/2011 | Tenzer et al. |
| 7,880,767 B2 | 2/2011 | Chinigo |
| 7,881,838 B2 | 2/2011 | Larschan et al. |
| 7,903,001 B2 | 3/2011 | Sheha et al. |
| 7,912,502 B2 | 3/2011 | Ando et al. |
| 7,912,641 B2 | 3/2011 | Osentoski et al. |
| 7,912,796 B2 | 3/2011 | Engstroem et al. |
| 7,913,179 B2 | 3/2011 | Sheha et al. |
| 7,917,253 B2 | 3/2011 | Inbarajan et al. |
| 7,917,852 B2 | 3/2011 | Wattenberg et al. |
| 7,920,944 B2 | 4/2011 | Gould et al. |
| 7,925,982 B2 | 4/2011 | Parker et al. |
| 7,925,985 B2 | 4/2011 | Moore |
| 7,982,764 B2 | 7/2011 | Kadaba |
| 7,991,407 B2 | 8/2011 | McCormick et al. |
| 7,996,235 B2 | 8/2011 | Laghrari et al. |
| 8,005,589 B2 | 8/2011 | MacDonald et al. |
| 8,046,167 B2 | 10/2011 | Mishra et al. |
| 8,069,412 B2 | 11/2011 | Bankston et al. |
| 8,078,393 B2 | 12/2011 | Ohi |
| 8,078,485 B1 | 12/2011 | Kraehmueller et al. |
| 8,146,009 B2 | 3/2012 | Mason et al. |
| 8,195,630 B2 | 6/2012 | Ellis et al. |
| 8,214,142 B2 | 7/2012 | Cerecke et al. |
| 8,249,910 B2 | 8/2012 | Wellman et al. |
| 8,275,508 B1 | 9/2012 | Adams et al. |
| 8,275,522 B1 | 9/2012 | Groeneweg et al. |
| 8,284,069 B2 | 10/2012 | Sverrisson |
| 8,290,701 B2 | 10/2012 | Mason et al. |
| 8,315,802 B2 | 11/2012 | Brown |
| 8,330,626 B1 | 12/2012 | Adelson |
| 8,386,283 B2 | 2/2013 | Hand |
| 8,416,067 B2 | 4/2013 | Davidson et al. |
| 8,484,059 B2 | 7/2013 | Bankston et al. |
| 8,732,019 B2 | 5/2014 | Brown et al. |
| 8,775,960 B1 | 7/2014 | Flores |
| 8,855,681 B1 | 10/2014 | George et al. |
| 8,896,430 B2 | 11/2014 | Davidson et al. |
| 8,958,988 B2 | 2/2015 | Gueziec |
| 8,983,762 B2 | 3/2015 | Davidson |
| 8,996,287 B2 | 3/2015 | Davidson et al. |
| 9,070,100 B2 | 6/2015 | Davidson |
| 9,098,956 B2 * | 8/2015 | Lambert ............... G08G 1/162 |
| 9,117,190 B2 | 8/2015 | Davidson |
| 9,129,449 B2 | 9/2015 | Davidson |
| 9,208,626 B2 | 12/2015 | Davidson |
| 9,256,992 B2 | 2/2016 | Davidson |
| 9,324,198 B2 | 4/2016 | Davidson et al. |
| 9,613,468 B2 | 4/2017 | Davidson et al. |
| 9,805,521 B1 | 10/2017 | Davidson |
| 9,961,496 B2 * | 5/2018 | Ahmadzadeh ........ H04W 4/023 |
| 2001/0012976 A1 | 8/2001 | Menig et al. |
| 2001/0018628 A1 | 8/2001 | Jenkins et al. |
| 2001/0029425 A1 | 10/2001 | Myr |
| 2002/0008621 A1 | 1/2002 | Barritz et al. |
| 2002/0024448 A1 | 2/2002 | Olesen |
| 2002/0029108 A1 | 3/2002 | Liu et al. |
| 2002/0032517 A1 | 3/2002 | Buckelew et al. |
| 2002/0044084 A1 | 4/2002 | Itoh et al. |
| 2002/0077742 A1 | 6/2002 | Mintz |
| 2002/0077750 A1 | 6/2002 | McDonald et al. |
| 2003/0014286 A1 | 1/2003 | Cappellini |
| 2003/0083060 A1 | 5/2003 | Menendez |
| 2003/0114206 A1 | 6/2003 | Timothy et al. |
| 2003/0120584 A1 | 6/2003 | Zarefoss et al. |
| 2003/0135304 A1 | 7/2003 | Sroub et al. |
| 2003/0144985 A1 | 7/2003 | Ebert |
| 2003/0149607 A1 | 8/2003 | Ogasawara et al. |
| 2003/0149674 A1 | 8/2003 | Good et al. |
| 2003/0163287 A1 | 8/2003 | Vock et al. |
| 2003/0195606 A1 | 10/2003 | Davidson et al. |
| 2003/0195676 A1 | 10/2003 | Jones et al. |
| 2003/0195696 A1 | 10/2003 | Jones |
| 2003/0197612 A1 | 10/2003 | Tanaka et al. |
| 2003/0224806 A1 | 12/2003 | Hebron |
| 2004/0039504 A1 | 2/2004 | Coffee et al. |
| 2004/0054607 A1 | 3/2004 | Waddington et al. |
| 2004/0090628 A1 | 5/2004 | Ershov et al. |
| 2004/0178902 A1 | 9/2004 | Koike et al. |
| 2004/0193466 A1 | 9/2004 | Kull et al. |
| 2004/0195320 A1 | 10/2004 | Ramsager |
| 2004/0229560 A1 | 11/2004 | Maloney |
| 2004/0249557 A1 | 12/2004 | Harrington et al. |
| 2004/0254698 A1 | 12/2004 | Hubbard et al. |
| 2004/0260585 A1 | 12/2004 | Spangenberg et al. |
| 2004/0267410 A1 | 12/2004 | Duri et al. |
| 2005/0044906 A1 | 3/2005 | Spielman |
| 2005/0065711 A1 | 3/2005 | Dahlgren et al. |
| 2005/0073443 A1 | 4/2005 | Sheha et al. |
| 2005/0125148 A1 | 6/2005 | Van Buer et al. |
| 2005/0131627 A1 | 6/2005 | Ignatin |
| 2005/0134504 A1 | 6/2005 | Harwood et al. |
| 2005/0140523 A1 | 6/2005 | Publicover |
| 2005/0143889 A1 | 6/2005 | Isaji et al. |
| 2005/0203683 A1 | 9/2005 | Olsen et al. |
| 2005/0216553 A1 | 9/2005 | Mallonee et al. |
| 2005/0240343 A1 | 10/2005 | Schmidt et al. |
| 2005/0283699 A1 | 12/2005 | Nomura et al. |
| 2006/0047379 A1 | 3/2006 | Schullian et al. |
| 2006/0047423 A1 | 3/2006 | Min |
| 2006/0055564 A1 | 3/2006 | Olsen et al. |
| 2006/0089767 A1 * | 4/2006 | Sowa ................... G01M 15/05 |
| | | 701/31.4 |
| 2006/0089787 A1 | 4/2006 | Burr et al. |
| 2006/0095175 A1 | 5/2006 | deWaal et al. |
| 2006/0100779 A1 | 5/2006 | Vergin |
| 2006/0142934 A1 | 6/2006 | Kim |
| 2006/0145837 A1 | 7/2006 | Horton |
| 2006/0155464 A1 * | 7/2006 | Smartt ................... G01C 21/32 |
| | | 701/450 |
| 2006/0161315 A1 | 7/2006 | Lewis et al. |
| 2006/0164232 A1 | 7/2006 | Waterhouse et al. |
| 2006/0181411 A1 | 8/2006 | Fast et al. |
| 2006/0206261 A1 | 9/2006 | Altaf et al. |
| 2006/0208722 A1 | 9/2006 | Takemasa et al. |
| 2006/0235580 A1 | 10/2006 | Weiss et al. |
| 2006/0265228 A1 | 11/2006 | Ando |
| 2006/0271246 A1 | 11/2006 | Bell et al. |
| 2007/0027583 A1 | 2/2007 | Tamir et al. |
| 2007/0027726 A1 | 2/2007 | Warren et al. |
| 2007/0038348 A1 | 2/2007 | Larschan et al. |
| 2007/0051544 A1 | 3/2007 | Fernandez |
| 2007/0093943 A1 | 4/2007 | Nelson et al. |
| 2007/0115101 A1 | 5/2007 | Creekbaum et al. |
| 2007/0126605 A1 | 6/2007 | Aleksic et al. |
| 2007/0174004 A1 | 7/2007 | Tenzer et al. |
| 2007/0179680 A1 | 8/2007 | Tamura |
| 2007/0226041 A1 | 9/2007 | Oesterling et al. |
| 2007/0239346 A1 | 10/2007 | Hawkins |
| 2007/0241882 A1 | 10/2007 | Panttaja et al. |
| 2007/0244633 A1 | 10/2007 | Phillips et al. |
| 2007/0271014 A1 | 11/2007 | Breed |
| 2008/0016504 A1 | 1/2008 | Cheng et al. |
| 2008/0045245 A1 | 2/2008 | Billmaier et al. |
| 2008/0046274 A1 * | 2/2008 | Geelen .................. G01C 21/32 |
| | | 717/176 |
| 2008/0059055 A1 | 3/2008 | Geelen et al. |
| 2008/0091681 A1 | 4/2008 | Dwivedi et al. |
| 2008/0097731 A1 | 4/2008 | Lanes et al. |
| 2008/0125724 A1 | 5/2008 | Monroe |

(56) References Cited

U.S. PATENT DOCUMENTS

| | | | |
|---|---|---|---|
| 2008/0136670 A1* | 6/2008 | Tengler | G08G 1/20 340/905 |
| 2008/0140287 A1 | 6/2008 | Yang et al. | |
| 2008/0140654 A1 | 6/2008 | Daley | |
| 2008/0143834 A1 | 6/2008 | Comeau et al. | |
| 2008/0154691 A1 | 6/2008 | Wellman et al. | |
| 2008/0162036 A1 | 7/2008 | Breed | |
| 2008/0177646 A1 | 7/2008 | Frink | |
| 2008/0252487 A1 | 10/2008 | McClellan et al. | |
| 2008/0255722 A1 | 10/2008 | McClellan et al. | |
| 2008/0255888 A1 | 10/2008 | Berkobin et al. | |
| 2008/0262670 A1 | 10/2008 | McClellan et al. | |
| 2008/0269978 A1 | 10/2008 | Shirole et al. | |
| 2008/0270519 A1 | 10/2008 | Ekdahl et al. | |
| 2008/0285886 A1 | 11/2008 | Allen | |
| 2008/0295586 A1 | 12/2008 | Fosseen | |
| 2008/0307491 A1 | 12/2008 | Duri et al. | |
| 2008/0319602 A1 | 12/2008 | McClellan et al. | |
| 2009/0007098 A1 | 1/2009 | Chevrette et al. | |
| 2009/0024419 A1 | 1/2009 | McClellan et al. | |
| 2009/0030574 A1 | 1/2009 | Yamakado et al. | |
| 2009/0045924 A1 | 2/2009 | Roberts, Sr. et al. | |
| 2009/0051566 A1 | 2/2009 | Olsen et al. | |
| 2009/0055091 A1 | 2/2009 | Hines et al. | |
| 2009/0070027 A1 | 3/2009 | Newhouse et al. | |
| 2009/0070035 A1 | 3/2009 | Van Buer | |
| 2009/0088924 A1 | 4/2009 | Coffee et al. | |
| 2009/0102638 A1 | 4/2009 | Olsen et al. | |
| 2009/0112396 A1 | 4/2009 | Tsai et al. | |
| 2009/0114575 A1 | 5/2009 | Carpenter et al. | |
| 2009/0177350 A1 | 7/2009 | Williams et al. | |
| 2009/0216434 A1 | 8/2009 | Panganiban et al. | |
| 2009/0248235 A1 | 10/2009 | Hering et al. | |
| 2009/0248236 A1 | 10/2009 | Schwinke | |
| 2009/0248237 A1 | 10/2009 | Koepf et al. | |
| 2009/0271057 A1 | 10/2009 | Stone | |
| 2009/0281929 A1 | 11/2009 | Boitet et al. | |
| 2009/0287369 A1 | 11/2009 | Nielsen | |
| 2009/0287410 A1* | 11/2009 | Kobayashi | G01C 21/30 701/533 |
| 2009/0287739 A1 | 11/2009 | Zhang et al. | |
| 2009/0306997 A1 | 12/2009 | Betancourt | |
| 2009/0318121 A1 | 12/2009 | Marumoto | |
| 2009/0319119 A1 | 12/2009 | Park et al. | |
| 2009/0319341 A1 | 12/2009 | Berkobin et al. | |
| 2009/0326753 A1 | 12/2009 | Chen et al. | |
| 2009/0326991 A1 | 12/2009 | Wei et al. | |
| 2010/0009476 A1 | 1/2010 | Tu et al. | |
| 2010/0010732 A1 | 1/2010 | Hartman | |
| 2010/0030582 A1 | 2/2010 | Rippel et al. | |
| 2010/0030586 A1 | 2/2010 | Taylor et al. | |
| 2010/0035602 A1 | 2/2010 | Doherty et al. | |
| 2010/0036591 A1 | 2/2010 | Nakai | |
| 2010/0042311 A1 | 2/2010 | Nakai | |
| 2010/0057356 A1 | 3/2010 | Lin | |
| 2010/0059007 A1 | 3/2010 | Senda et al. | |
| 2010/0061190 A1 | 3/2010 | Nelson | |
| 2010/0063850 A1 | 3/2010 | Daniel | |
| 2010/0070153 A1 | 3/2010 | Bradley et al. | |
| 2010/0076935 A1 | 3/2010 | Hussain et al. | |
| 2010/0082230 A1 | 4/2010 | Hong et al. | |
| 2010/0087984 A1 | 4/2010 | Joseph | |
| 2010/0088137 A1 | 4/2010 | Weiss et al. | |
| 2010/0088163 A1 | 4/2010 | Davidson et al. | |
| 2010/0090852 A1 | 4/2010 | Eitan et al. | |
| 2010/0094688 A1 | 4/2010 | Olsen, III et al. | |
| 2010/0094769 A1 | 4/2010 | Davidson et al. | |
| 2010/0100315 A1 | 4/2010 | Davidson et al. | |
| 2010/0100507 A1 | 4/2010 | Davidson et al. | |
| 2010/0114484 A1* | 5/2010 | Kida | G06F 17/30241 701/532 |
| 2010/0127843 A1 | 5/2010 | Koenig | |
| 2010/0131152 A1 | 5/2010 | Castonguay et al. | |
| 2010/0131308 A1 | 5/2010 | Collopy et al. | |
| 2010/0138242 A1 | 6/2010 | Ferrick et al. | |
| 2010/0153005 A1 | 6/2010 | Cerecke et al. | |
| 2010/0168992 A1 | 7/2010 | Nakata | |
| 2010/0174485 A1 | 7/2010 | Taylor et al. | |
| 2010/0179844 A1 | 7/2010 | LaFergola et al. | |
| 2010/0185356 A1 | 7/2010 | Haas et al. | |
| 2010/0191403 A1 | 7/2010 | Krause | |
| 2010/0205012 A1 | 8/2010 | McClellan | |
| 2010/0205022 A1 | 8/2010 | Brown | |
| 2010/0211259 A1 | 8/2010 | McClellan | |
| 2010/0212629 A1 | 8/2010 | McDonald et al. | |
| 2010/0217480 A1 | 8/2010 | Link, II | |
| 2010/0217524 A1 | 8/2010 | Oohashi et al. | |
| 2010/0228404 A1 | 9/2010 | Link, II et al. | |
| 2010/0229815 A1 | 9/2010 | Senda et al. | |
| 2010/0235092 A1 | 9/2010 | Kutomi | |
| 2010/0245123 A1 | 9/2010 | Prasad et al. | |
| 2010/0250021 A1 | 9/2010 | Cook et al. | |
| 2010/0250059 A1 | 9/2010 | Sekiyama et al. | |
| 2010/0262333 A1 | 10/2010 | Storgaard | |
| 2010/0262450 A1 | 10/2010 | Kalish et al. | |
| 2010/0265052 A1 | 10/2010 | Koen | |
| 2010/0274440 A1 | 10/2010 | Kim et al. | |
| 2010/0305805 A1 | 12/2010 | Yamaguchi | |
| 2010/0305807 A1 | 12/2010 | Basir et al. | |
| 2010/0332119 A1 | 12/2010 | Geelen et al. | |
| 2011/0015851 A1 | 1/2011 | Burr et al. | |
| 2011/0035139 A1 | 2/2011 | Konlditslotis et al. | |
| 2011/0039587 A1 | 2/2011 | Madhavan et al. | |
| 2011/0040438 A1 | 2/2011 | Kluge et al. | |
| 2011/0040477 A1 | 2/2011 | Eser et al. | |
| 2011/0041088 A1 | 2/2011 | Mason et al. | |
| 2011/0046845 A1 | 2/2011 | Kozlay | |
| 2011/0050732 A1 | 3/2011 | Arrasvuori | |
| 2011/0054767 A1 | 3/2011 | Schafer et al. | |
| 2011/0057784 A1 | 3/2011 | Nakamura et al. | |
| 2011/0068954 A1 | 3/2011 | McQuade et al. | |
| 2011/0071740 A1 | 3/2011 | Nihei et al. | |
| 2011/0078024 A1 | 3/2011 | Messier et al. | |
| 2011/0090075 A1 | 4/2011 | Armitage et al. | |
| 2011/0098880 A1 | 4/2011 | Basir et al. | |
| 2011/0101610 A1 | 5/2011 | Mayalidag | |
| 2011/0102167 A1 | 5/2011 | Baur et al. | |
| 2011/0106416 A1* | 5/2011 | Scofield | G08G 1/0104 701/119 |
| 2011/0112717 A1 | 5/2011 | Resner | |
| 2011/0112740 A1 | 5/2011 | Hashimoto | |
| 2011/0112870 A1 | 5/2011 | Berg et al. | |
| 2011/0118934 A1 | 5/2011 | Lowrey et al. | |
| 2011/0122858 A1 | 5/2011 | Yashiro et al. | |
| 2011/0130906 A1 | 6/2011 | Mayer | |
| 2011/0130916 A1 | 6/2011 | Mayer | |
| 2011/0130960 A1 | 6/2011 | Sheha et al. | |
| 2011/0137489 A1 | 6/2011 | Gilleland et al. | |
| 2011/0137511 A1 | 6/2011 | Harumoto et al. | |
| 2011/0137684 A1 | 6/2011 | Peak et al. | |
| 2011/0143669 A1 | 6/2011 | Farrell et al. | |
| 2011/0153367 A1 | 6/2011 | Amigo et al. | |
| 2011/0160986 A1 | 6/2011 | Wu et al. | |
| 2011/0161118 A1 | 6/2011 | Borden et al. | |
| 2011/0163896 A1 | 7/2011 | Chinigo | |
| 2011/0178695 A1 | 7/2011 | Okumoto et al. | |
| 2011/0196644 A1 | 8/2011 | Davidson et al. | |
| 2011/0205043 A1 | 8/2011 | Fujiki et al. | |
| 2011/0205044 A1 | 8/2011 | Enomoto et al. | |
| 2011/0210838 A1 | 9/2011 | Fujiki et al. | |
| 2011/0225098 A1 | 9/2011 | Wolff et al. | |
| 2011/0231055 A1 | 9/2011 | Knight et al. | |
| 2011/0238457 A1 | 9/2011 | Mason et al. | |
| 2011/0238543 A1 | 9/2011 | Paez et al. | |
| 2011/0298638 A1 | 12/2011 | Groeneweg | |
| 2012/0004933 A1 | 1/2012 | Foladare et al. | |
| 2012/0030133 A1 | 2/2012 | Rademaker | |
| 2012/0072109 A1 | 3/2012 | Waite et al. | |
| 2012/0095682 A1* | 4/2012 | Wilson | G01C 21/32 701/532 |
| 2012/0116678 A1* | 5/2012 | Witmer | G01C 21/32 702/5 |
| 2012/0226390 A1 | 9/2012 | Adams et al. | |
| 2012/0232939 A1 | 9/2012 | Pierre et al. | |

(56) References Cited

U.S. PATENT DOCUMENTS

| | | | |
|---|---|---|---|
| 2012/0246192 A1* | 9/2012 | Kenyon | G01C 21/32 707/769 |
| 2012/0253548 A1 | 10/2012 | Davidson | |
| 2012/0253587 A1 | 10/2012 | Davidson | |
| 2012/0253632 A1 | 10/2012 | Davidson | |
| 2012/0253668 A1 | 10/2012 | Sheha et al. | |
| 2012/0253861 A1 | 10/2012 | Davidson et al. | |
| 2012/0253862 A1 | 10/2012 | Davidson | |
| 2012/0253867 A1 | 10/2012 | Davidson | |
| 2012/0253888 A1 | 10/2012 | Davidson | |
| 2012/0253889 A1 | 10/2012 | Davidson et al. | |
| 2012/0253892 A1 | 10/2012 | Davidson | |
| 2013/0030642 A1* | 1/2013 | Bradley | G07C 5/008 701/32.2 |
| 2013/0030873 A1 | 1/2013 | Davidson | |
| 2013/0197776 A1 | 8/2013 | Davidson et al. | |
| 2013/0245934 A1* | 9/2013 | Ando | G01C 21/12 701/446 |
| 2013/0297175 A1 | 11/2013 | Davidson | |
| 2013/0304347 A1 | 11/2013 | Davidson | |
| 2013/0304348 A1 | 11/2013 | Davidson et al. | |
| 2013/0304349 A1 | 11/2013 | Davidson | |
| 2013/0311076 A1* | 11/2013 | Mieth | G01C 21/32 701/119 |
| 2014/0002277 A1* | 1/2014 | Fulger | G01C 21/3415 340/905 |
| 2014/0148970 A1 | 5/2014 | Dufford et al. | |
| 2014/0188533 A1 | 7/2014 | Davidson | |
| 2014/0278055 A1* | 9/2014 | Wang | G01C 21/32 701/409 |
| 2014/0358423 A1 | 12/2014 | Thiele et al. | |
| 2015/0046062 A1 | 2/2015 | Davidson et al. | |
| 2015/0105934 A1* | 4/2015 | Palmer | G07C 5/0841 701/1 |
| 2015/0161828 A1 | 6/2015 | Davidson | |
| 2015/0170440 A1 | 6/2015 | Davidson et al. | |
| 2015/0170514 A1* | 6/2015 | Stenneth | G08G 1/0125 701/117 |
| 2015/0179004 A1 | 6/2015 | Davidson et al. | |
| 2015/0185031 A1 | 7/2015 | Davidson | |
| 2015/0198451 A1 | 7/2015 | Davidson | |
| 2015/0206356 A1 | 7/2015 | Davidson | |
| 2015/0248795 A1 | 9/2015 | Davidson | |
| 2015/0254592 A1 | 9/2015 | Davidson | |
| 2015/0262433 A1 | 9/2015 | Davidson | |
| 2016/0018239 A1* | 1/2016 | Ko | G01C 21/367 701/425 |
| 2016/0078758 A1* | 3/2016 | Basalamah | G08G 1/0112 701/118 |
| 2016/0125734 A1* | 5/2016 | Stenneth | G08G 1/056 340/935 |
| 2016/0247394 A1* | 8/2016 | Stenneth | G08G 1/0112 |
| 2016/0258764 A1* | 9/2016 | Phuyal | G01C 21/26 |
| 2016/0273925 A1* | 9/2016 | Maekawa | G01C 21/32 |
| 2016/0334221 A1 | 11/2016 | Davidson | |
| 2016/0334225 A1 | 11/2016 | Davidson | |
| 2017/0074670 A1* | 3/2017 | Tashiro | G01C 21/32 |
| 2017/0160096 A1 | 6/2017 | Davidson et al. | |
| 2017/0263059 A1 | 9/2017 | Davidson | |
| 2017/0278316 A1 | 9/2017 | Davidson et al. | |
| 2018/0025555 A1 | 1/2018 | Davidson | |
| 2018/0040173 A1 | 2/2018 | Davidson | |
| 2018/0082497 A1 | 3/2018 | Davidson | |
| 2018/0350162 A1 | 12/2018 | Davidson | |
| 2018/0350164 A1 | 12/2018 | Davidson | |
| 2019/0011279 A1 | 1/2019 | Davidson et al. | |

FOREIGN PATENT DOCUMENTS

| | | |
|---|---|---|
| DE | 102004061331 | 6/2006 |
| EP | 0 635 800 A1 | 1/1995 |
| EP | 0 977 450 A2 | 2/2000 |
| EP | 1113268 | 7/2001 |
| EP | 1 216 901 A1 | 6/2002 |
| EP | 1 229 508 | 8/2002 |
| EP | 1566665 | 8/2005 |
| FR | 2710767 | 9/1993 |
| FR | 2831665 | 10/2001 |
| GB | 2 225 459 A | 5/1990 |
| GB | 2 358 427 A | 7/2001 |
| GB | 2 363 884 A | 1/2002 |
| JP | 3251351 | 11/1991 |
| JP | H6-333117 | 12/1994 |
| JP | 07-199861 | 8/1995 |
| JP | 3062509 | 7/1999 |
| JP | 2000/059292 | 2/2000 |
| JP | 2000/295168 | 10/2000 |
| JP | 2001/024577 | 1/2001 |
| JP | 2001/218252 | 8/2001 |
| JP | 2001/278414 | 10/2001 |
| JP | 2002/112302 | 4/2002 |
| JP | 2002/335202 | 11/2002 |
| WO | WO 1996/31846 | 10/1996 |
| WO | WO 2001/91438 A1 | 11/2001 |
| WO | WO 2003/014752 A1 | 2/2003 |
| WO | WO 2003/081560 A1 | 10/2003 |
| WO | WO 2005/069203 | 7/2005 |
| WO | 2005/109273 A1 | 11/2005 |
| WO | WO 2006/065492 | 6/2006 |
| WO | WO 2010/030341 A1 | 3/2010 |
| WO | WO 2011/020101 A2 | 2/2011 |
| WO | WO 2011/036495 A2 | 3/2011 |

OTHER PUBLICATIONS

Canadian Intellectual Property Office, Requisition by the Examiner for Application No. 2,842,842, dated Oct. 12, 2016, 4 pages, Canada.
United States Patent and Trademark Office, Office Action for U.S. Appl. No. 14/133,258, dated Sep. 7, 2016, 20 pages, U.S.A.
United States Patent and Trademark Office, Office Action for U.S. Appl. No. 13/435,831, dated Oct. 14, 2016, 28 pages, U.S.A.
United States Patent and Trademark Office, Office Action for U.S. Appl. No. 14/711,806, dated Nov. 4, 2016, 51 pages, U.S.A.
United States Patent and Trademark Office, Office Action for U.S. Appl. No. 14/517,500, dated Nov. 16, 2016, 12 pages, U.S.A.
United States Patent and Trademark Office, Notice of Allowance for U.S. Appl. No. 13/435,755, dated Nov. 18, 2016, 28 pages, U.S.A.
United States Patent and Trademark Office, Notice of Allowance for U.S. Appl. No. 14/667,042, dated Nov. 22, 2016, 10 pages, U.S.A.
"ArdGIS9—ArcMap Tutorial", ESRI, 2008, 58 pages, USA.
"Oil Lasts Longer in Diesels, thanks to novel viscosity sensor", Dec. 14, 2006, pp. 1-3; http://machinedesign.com/ContentItem/57322/Oillastslongerindieselthankstonovelviscositysensor.aspx.
"On—The New World of Communication: Notes Tools for Precision: A Tool Kit to Optimize WCDMA Networks," www.ericsson.com/tems; date of publication unknown; one page, numbered p. 46.
"TEMS™—Making Wireless Better," by Ericcson; APAC Workshop (Sep. 2004); seventeen pages.
"TEMS™ Automatic WCDMA: Take Control of Your Mobile Internet Quality of Service," www.ericsson.com; Publication AE/LZT 123 6694 R1; date of publication unknown (copyright 2001); two pages.
"TEMS™ Automatic: Making Wireless Better: Take Control of Your Mobile Internet Quality of Service," www.ericsson.com/services/tems/_cdma/automatic-cdma.shtml; Oct. 19, 2004; two pages.
"TEMS™ Automatic: Streamlined Operations and Improved QoS: GSM/GPRS, CDMA, and TDMA," www.ericsson.com/tems; Publication 287 01-FAP 901 0409 B; date of publication unknown (copyright 2004); four pages.
"TEMS™ Drive Tester CDMA: An Innovative Drive Test Solution," www.ericsson.com/tems; Publication AE/LZT 123 7307, R3; date of publication unknown (copyright 2003); four pages.
"TEMS™ Drive Tester CDMA: An Innovative Drive Test Solution," www.ericsson.com/tems; Publication 287 01-FAP 901 0539 Uen; date of publication unknown (copyright 2005); four pages.
"TEMS™ Drivetester CDMA2000 2.0: An Innovative Drive Test solution for CDMA Networks," www.ericsson.com/products/_TEMSdrivetesterCDMA200020pos.shtml; date of publication unknown; one page.

(56) References Cited

OTHER PUBLICATIONS

"TEMS™ Tech Support: TEMS Automatic GSM: Making Wireless Better: Take Control of Your Mobile Internet Quality of Service," FAQ's www.ericsson.com/services/tems/support/automatic/sup_automatic_gsm.shtml; Nov. 5, 2004; three pages, version 3.2.1.
"TEMS™ Tech Support: TEMS DriveTester CDMA: Making Wireless Better: Instantly Isolate Network Trouble Spots," FAQ's www.ericsson.com/services/tems/support/drivetester/_sup_drivetester_cdma.shtml; Jun. 9, 2004; two pages; version 2.0.1.
"TEMS™ Tech Support: TEMS DriveTester GSM/TDMA: Making Wireless Better: Instantly Isolate Network Trouble Spots," www.ericsson.com/services/tems/support/drivetester/_sup_drivetester_gsm_tdma.shtml; May 13, 2004; two pages; version 1.1.1.
"TEMS™ Tech Support: TEMS LinkPlanner: Making Wireless Better: FAQ's, Import/Export:" www.ericsson.com/services/tems/support/_linkplanner/sup_linkplanner_faq_import.shtml; Aug. 26, 2004; two pages.
"TEMS™ Tech Support: TEMS LinkPlanner: Making Wireless Better: FAQ's: Map Data," www.ericsson.com/services/tems/support/_linkplanner/sup_linkplanner_faq_mapdata.shtml; date of publication unknown; one page.
"TEMS™ Tech Support: TEMS LinkPlanner: Making Wireless Better: FAQ's: General," www.ericsson.com/services/tems/support/_linkplanner/sup_linkplanner_faq_general.shtml; Sep. 10, 2004; one page.
"White Paper: Business Value Through Fleet Management Optimization", Cadec Global Inc., Nov. 2007, 19 pages.
Advanced Vehicle Telematics—Telogis Fleet, Telogis, Feb. 2010.
Barringer & Associates, Inc., Pareto Principle (available at http://www.barringer1.com/anvil_files/anvi104.htm) captured Sep. 8, 2008.
Bing.com/Maps—Bing Maps Platform—web pages—Microsoft, Feb. 2010, Retrieved from Archive.org Jul. 19, 2013.
Canadian Intellectual Property Office, Examiner Requisition for Application No. 2,736,168, dated Jun. 12, 2013, 4 pages, Canada.
Canadian Intellectual Property Office, Requisition by the Examiner for Application No. 2,842,842, dated Oct. 6, 2015, 6 pages, Canada.
Canadian Intellectual Property Office, Requisition by the Examiner for Application No. 2, 831,712, dated Apr. 26, 2016, 4 pages, Canada.
Canadian Intellectual Property Office, Requisition by the Examiner for Application No. 2,736,168, dated Aug. 9, 2016, 6 pages, Canada.
Colin, Lauren, et al., Fleet Telematics Becoming a 'Must-Have' Automotive Fleet, Feb. 2007.
Cooney, Ryan, "Tracking Geocortex Fleet Tracker", *Geocortex Blog*, Aug. 24, 2009, 1 page, retrieved from <http://blog.geocortex.com/2009/08/24/tracking-geocortex-fleet-tracker/> on Sep. 25, 2014.
European Patent Office, Communication Pursuant to Article 94(3) EPC for Application No. 09813349.9, dated Aug. 29, 2014, 7 pages, The Netherlands.
European Patent Office, Communication pursuant to Article 94(3) EPC for Application No. 12743628.5, dated Nov. 2, 2015, 6 pages, Germany.
European Patent Office, Extended European Search Report for Application No. 09813349.9, dated Nov. 20, 2013, 6 pages, The Netherlands.
European Patent Office, Extended European Search Report for Application No. 12743628.5, dated Feb. 27, 2015, 5 pages, Germany.
European Patent Office, Extended European Search Report for Application No. 12717936.4, dated Nov. 9, 2015, 7 pages, Germany.
Geocortex Fleet Tracker User Guide, Latitude Geographics Group, Ltd. Nov. 2010.
Golias, Mihalis, et al., GPS/GIS Analysis of Tennessee Truck Trips, The University of Memphis, Dec. 7, 2012.
Hedin, Lars-Göran, Editor; "On: The New World of Communication," an Ericsson Global Customer Magazine (Mar. 2002); sixteen pages.
Hillier, Amy, "ArcGIS 9.3 Manual", SelectedWorkds by Amy Hiller, Jan. 2007, University of Pennsylvania, 110 pages, USA.

Howard County Bureau of Highways Web-enabled Snowplow Tracking System, Howard County Maryland, 1999.
International Preliminary Examining Authority, International Preliminary Report on Patentability for International Application No. PCT/US2014/034323, dated Apr. 23, 2015, 18 pages, United States Patent and Trademark Office, USA.
International Preliminary Report on Patentability for Application No. PCT/US2005/000729 dated Jul. 17, 2006.
International Preliminary Report on Patentability for Application No. PCT/US2005/000789 dated Jul. 17, 2006.
International Preliminary Report on Patentability for Application No. PCT/US2009/004978, dated Dec. 23, 2010.
International Preliminary Report on Patentability for Application No. PCT/US2009/005049 dated Aug. 20, 2010.
International Preliminary Report on Patentability for Application No. PCT/US2009/056063, dated Dec. 23, 2010.
International Search Report and Written Opinion for PCT/US2005/000729 dated Jan. 10, 2006.
International Search Report and Written Opinion for PCT/US2005/000789 dated Jan. 10, 2006.
International Search Report and Written Opinion from International Application No. PCT/US2009/004978 dated Jan. 12, 2010.
International Search Report and Written Opinion from International Application No. PCT/US09/05049 dated Oct. 28, 2009.
International Search Report and Written Opinion from International Application No. PCT/US2009/056063 dated Jan. 12, 2010.
International Searching Authority, International Search Report and Written Opinion for International Application No. PCT/US2012/048405, dated Dec. 19, 2012, 10 pages, United States Patent and Tmdemark Office, USA.
International Searching Authority, International Search Report and Written Opinion for International Application No. PCT/US2012/031172, dated Dec. 27, 2012, 11 pages, United States Patent and Trademark Office, USA.
International Searching Authority, International Search Report and Written Opinion for International Application No. PCT/US2014/034323, dated Nov. 7, 2014, 10 pages, United States Patent and Tmdemark Office, USA.
International Searching Authority, International Search Report and Written Opinion for Application No. PCT/US2016/022272, dated Jun. 3, 2016, 10 pages, European Patent Office, The Netherlands.
International Searching Authority, International Search Report and Written Opinion for International Application No. PCT/US2016/020392, dated Jun. 6, 2016, 12 pages, European Patent Office, Netherlands.
Kruse, John, "Snow and ice go high-tech", MRT, Oct. 1, 1999, 3 pages, retrieved from <http://preview.mrtmag.com/mag/radio_snow_ice_go/> on Sep. 24, 2015.
Kruse, John, Snow and Ice go High-Tech, Mobile Radio Technology, Oct. 1, 1999.
Lenarcic, Robert, Off the Shelf Approach to ArcGIS Server & The Dashboard Approach to Gaining Insight to ArcGIS Server, Latitude Geographics Group Ltd., Northeast Arc Users Group, NEARC, 2008.
Lo, Grace, Introduction to ArcGIS Tracking Analyst, Texas A&M University, Dec. 2007.
Ma, Xiaolei, et al., Processing Commercial GPS Data to Develop a Web-Based Truck Performance Measures Program, University of Washington, Mar. 15, 2011.
McCormack, Edward D., Developing a GPS-Based Truck Freight Performance Measure Platform, Washington State Department of Transportation, Apr. 2010.
McLean, Brett, Tracking Geocortex Fleet Tracker, Geocortex Blog, Aug. 24, 2009.
Murphy, Jean V., "Yard Management Systems Extend Automation Beyond the Dock Door", SupplyChainBrain.com, Mar. 2005, Global Logistic & Supply Chain Strategies.
Notice of Allowance and Fees Due for U.S. Appl. No. 12/556,140 dated May 4, 2012.
Notice of Allowance and Fees Due from U.S. Appl. No. 12/254,031 dated Mar. 30, 2009.
Office Action from U.S. Appl. No. 12/254,031 dated Jan. 15, 2009.
On the Go FedEx GIS Tracking Operations ESRI, 2011.

(56) References Cited

OTHER PUBLICATIONS

Resource Optimization & Scheduling—Telogis Route, Telogis, Feb. 2010.
Scapinakis, Dimitris, et al., Communications and Positioning Systems in the Motor Carrier Industry, Institute of Transportation Studies, University of California at Berkley, Research Reports, California Partners for Advanced, Transit and Highways (PATH), Institute of Transportation Studies (UCB), UC Berkeley, Jan. 1, 1992.
Schueneman, Thomas, "Brown Continues Getting Greener: Telematics Helps UPS Squeeze Out Higher Efficiencies and Increased Safety", May 7, 2008, Triplepundit.com, retrieved on Sep. 11, 2014.
Scott, L.M., et al., "A.1 Spatial Statistics in ArcGIS", *Handbook of Applied Spatial Analysis: Software Tools, Methods and Applications*, 2010, pp. 27-41, Springer.
Sigler, Lisa, Editor; TEMS an Ericsson Newsletter (No. 2, Jun. 2003); eight pages.
Sigler, Lisa, Editor; TEMS an Ericsson Newsletter (No. 2, Q2 2004); eight pages.
Sigler, Lisa, Editor; TEMS an Ericsson Newsletter (No. 3, Q3 2004); eight pages.
Sigler, Lisa; "Assess speech quality with PESQ, now in TEMSTm Automatic;" date of publication unknown; one page.
Sisiopiku, Virginia P., et al., "Winter Road Maintenance—ITS Options", 2001 IEEE Intelligent Transportation Systems Conference Proceedings, Aug. 25-29, 2001, pp. 298-302, IEEE, U.S.A.
State Intellectual Property Office of the P.R.C., First Office Action for Application No. 201280046510.1, dated May 17, 2016, 17 pages, China.
State Intellectual Property Office of the P.R.C., Third Office Action for Chinese Application No. 200980135226.X, dated Jan. 9, 2014, 7 pages, China.
State Intellectual Property Office of the People's Republic of China, Second Office Action for Application No. 200980135226.X, dated Mar. 1, 2013, 4 pages, China.
Tai, Hideo, "Urban Gas Monitoring System Using Optical Sensors," Proceedings of the SPIE, Jan. 1999,vol. 3746, pp. 332-336.
Telogis Announces OnTrack 7, Delivering the Latest in Saas GPS Fleet Management Software, Directions Magazine, Oct. 8, 2009.
Telogis Introduces New Advanced Scaleable Fleet Management Platform to European Markets: Telogis 8, Directions Magazine, Dec. 14, 2010.
Telogis, a GPS Fleet Tracking and Productivity Software Provider Launches New Brand and Web Site, Directions Magazine, May 21, 2007.
Telogis.com web pages, Telogis, Inc., Oct. 2007, Retrieved from Archive.org Feb. 4, 2013.
United States Patent and Trademark Office, Corrected Notice of Allowability for U.S. Appl. No. 13/435,498, dated Dec. 10, 2014, 6 pages, USA.
United States Patent and Trademark Office, Notice of Allowance and Fee(s) Due for U.S. Appl. No. 13/435,498, dated Nov. 3, 2014, 42 pages, USA.
United States Patent and Trademark Office, Notice of Allowance for U.S. Appl. No. 12/556,140, dated Dec. 12, 2012, 9 pages, USA.
United States Patent and Trademark Office, Notice of Allowance for U.S. Appl. No. 13/799,627, dated Jul. 18, 2014, 7 pages, USA.
United States Patent and Trademark Office, Notice of Allowance for U.S. Appl. No. 13/940,789, dated Jan. 22, 2015, 9 pages, USA.
United States Patent and Trademark Office, Notice of Allowance for U.S. Appl. No. 13/940,699, dated Feb. 2, 2015, 9 pages, USA.
United States Patent and Trademark Office, Notice of Allowance for U.S. Appl. No. 13/940,824, dated Feb. 18, 2015, 9 pages, USA.
United States Patent and Trademark Office, Notice of Allowance for U.S. Appl. No. 13/940,742, dated Jun. 30, 2015, 15 pages, U.S.A.
United States Patent and Trademark Office, Notice of Allowance for U.S. Appl. No. 13/307,997, dated Jul. 28, 2015, 16 pages, U.S.A.
United States Patent and Trademark Office, Notice of Allowance for U.S. Appl. No. 13/436,007, dated Sep. 30, 2015, 12 pages, U.S.A.
United States Patent and Trademark Office, Notice of Allowance for U.S. Appl. No. 14/633,802, dated Dec. 23, 2015, 9 pages, U.S.A.
United States Patent and Trademark Office, Notice of Allowance for U.S. Appl. No. 14/633,603, dated Aug. 22, 2016, 8 pages, U.S.A.
United States Patent and Trademark Office, Office Action for U.S. Appl. No. 13/436,007, dated Apr. 10, 2013, 36 pages, USA.
United States Patent and Trademark Office, Office Action for U.S. Appl. No. 13/435,831, dated Nov. 21, 2012, 33 pages, USA.
United States Patent and Trademark Office, Office Action for U.S. Appl. No. 13/435,934, dated Feb. 15, 2013, 48 pages, USA.
United States Patent and Trademark Office, Office Action for U.S. Appl. No. 13/307,997, dated May 16, 2013, 60 pages, USA.
United States Patent and Trademark Office, Office Action for U.S. Appl. No. 13/559,474, dated Nov. 29, 2013, 52 pages, USA.
United States Patent and Trademark Office, Office Action for U.S. Appl. No. 13/799,627, dated May 30, 2013, 12 pages, USA.
United States Patent and Trademark Office, Office Action for U.S. Appl. No. 13/799,627, dated Jan. 6, 2014, 37 pages, USA.
United States Patent and Trademark Office, Office Action for U.S. Appl. No. 13/307,997, dated Jan. 17, 2014, 40 pages, USA.
United States Patent and Trademark Office, Office Action for U.S. Appl. No. 13/435,934, dated Jul. 25, 2013, 31 pages, USA.
United States Patent and Trademark Office, Office Action for U.S. Appl. No. 13/435,755, dated Aug. 2, 2013, 42 pages, USA.
United States Patent and Trademark Office, Office Action for U.S. Appl. No. 13/435,498, dated Sep. 13, 2013, 20 pages, USA.
United States Patent and Trademark Office, Office Action for U.S. Appl. No. 13/436,083, dated Sep. 13, 2013, 38 pages, USA.
United States Patent and Trademark Office, Office Action for U.S. Appl. No. 13/436,007, dated Sep. 26, 2013, 25 pages, USA.
United States Patent and Trademark Office, Office Action for U.S. Appl. No. 13/435,831, dated Oct. 11, 2013, 25 pages, USA.
United States Patent and Trademark Office, Office Action for U.S. Appl. No. 13/435,755, dated Apr. 3, 2014, 24 pages, USA.
United States Patent and Trademark Office, Office Action for U.S. Appl. No. 13/436,083, dated May 6, 2014, 11 pages, USA.
United States Patent and Trademark Office, Office Action for U.S. Appl. No. 13/435,592, dated Jun. 3, 2014, 51 pages, USA.
United States Patent and Trademark Office, Office Action for U.S. Appl. No. 13/435,498, dated Jun. 16, 2014, 19 pages, USA.
United States Patent and Trademark Office, Office Action for U.S. Appl. No. 13/559,474, dated Jun. 18, 2014, 20 pages, USA.
United States Patent and Trademark Office, Office Action for U.S. Appl. No. 13/436,007, dated Aug. 11, 2014, 31 pages, USA.
United States Patent and Trademark Office, Office Action for U.S. Appl. No. 13/435,831, dated Aug. 14, 2014, 21 pages, USA.
United States Patent and Trademark Office, Office Action for U.S. Appl. No. 13/435,686, dated Aug. 14, 2014, 69 pages, USA.
United States Patent and Trademark Office, Office Action for U.S. Appl. No. 13/435,934, dated Sep. 17, 2014, 36 pages, USA.
United States Patent and Trademark Office, Office Action for U.S. Appl. No. 13/940,789, dated Oct. 22, 2014, 41 pages, USA.
United States Patent and Trademark Office, Office Action for U.S. Appl. No. 13/940,699, dated Nov. 5, 2014, 44 pages, USA.
United States Patent and Trademark Office, Office Action for U.S. Appl. No. 13/940,824, dated Nov. 20, 2014, 44 pages, USA.
United States Patent and Trademark Office, Office Action for U.S. Appl. No. 13/436,007, dated Dec. 2, 2014, 27 pages, USA.
United States Patent and Trademark Office, Office Action for U.S. Appl. No. 13/435,686, dated Dec. 26, 2014, 36 pages, USA.
United States Patent and Trademark Office, Office Action for U.S. Appl. No. 13/436,083, dated Dec. 29, 2014, 9 pages, USA.
United States Patent and Trademark Office, Office Action for U.S. Appl. No. 13/435,831, dated Dec. 29, 2014, 27 pages, USA.
United States Patent and Trademark Office, Office Action for U.S. Appl. No. 13/435,592, dated Jan. 16, 2015, 16 pages, USA.
United States Patent and Trademark Office, Office Action for U.S. Appl. No. 13/559,474, dated Feb. 23, 2015, 27 pages, USA.
United States Patent and Trademark Office, Office Action for U.S. Appl. No. 13/307,997, dated Feb. 20, 2015, 47 pages, USA.
United States Patent and Trademark Office, Office Action for U.S. Appl. No. 13/940,742, dated Mar. 3, 2015, 46 pages, USA.

(56) References Cited

OTHER PUBLICATIONS

United States Patent and Trademark Office, Office Action for U.S. Appl. No. 13/435,755, dated Apr. 2, 2015, 24 pages, USA.
United States Patent and Trademark Office, Office Action for U.S. Appl. No. 13/435,934, dated Apr. 16, 2015, 36 pages, USA.
United States Patent and Trademark Office, Office Action for U.S. Appl. No. 13/436,007, dated May 15, 2015, 25 pages, USA.
United States Patent and Trademark Office, Office Action for U.S. Appl. No. 13/435,831, dated Jun. 5, 2015, 23 pages, USA.
United States Patent and Trademark Office, Office Action for U.S. Appl. No. 14/133,258, dated Jun. 10, 2015, 68 pages, U.S.A.
United States Patent and Trademark Office, Office Action for U.S. Appl. No. 13/436,083, dated Jun. 9, 2015, 13 pages, U.S.A.
United States Patent and Trademark Office, Office Action for U.S. Appl. No. 13/435,686, dated Jul. 1, 2015, 41 pages, U.S.A.
United States Patent and Trademark Office, Office Action for U.S. Appl. No. 13/435,592, dated Jul. 22, 2015, 26 pages, U.S.A.
United States Patent and Trademark Office, Office Action for U.S. Appl. No. 13/559,474, dated Jul. 27, 2015, 27 pages, U.S.A.
United States Patent and Trademark Office, Office Action for U.S. Appl. No. 14/517,500, dated Aug. 25, 2015, 46 pages, U.S.A.
United States Patent and Trademark Office, Office Action for U.S. Appl. No. 14/633,802, dated Aug. 25, 2015, 38 pages, U.S.A.
United States Patent and Trademark Office, Office Action for U.S. Appl. No. 13/435,755, dated Oct. 10, 2015, 25 pages, U.S.A.
United States Patent and Trademark Office, Office Action for U.S. Appl. No. 13/435,934, dated Oct. 16, 2015, 46 pages, U.S.A.
United States Patent and Trademark Office, Office Action for U.S. Appl. No. 14/095,560, dated Sep. 11, 2015, 49 pages, U.S.A.
United States Patent and Trademark Office, Office Action for U.S. Appl. No. 14/133,258, dated Nov. 12, 2015, 22 pages, U.S.A.
United States Patent and Trademark Office, Office Action for U.S. Appl. No. 13/435,686, dated Nov. 23, 2015, 42 pages, U.S.A.
United States Patent and Trademark Office, Office Action for U.S. Appl. No. 13/435,831, dated Jan. 20, 2016, 30 pages, U.S.A.
United States Patent and Trademark Office, Office Action for U.S. Appl. No. 13/435,592, dated Jan. 21, 2016, 32 pages, U.S.A.
United States Patent and Trademark Office, Office Action for U.S. Appl. No. 14/517,500, dated Feb. 8, 2016, 13 pages, U.S.A.
United States Patent and Trademark Office, Office Action for U.S. Appl. No. 14/095,560, dated Feb. 25, 2016, 25 pages, U.S.A.
United States Patent and Trademark Office, Office Action for U.S. Appl. No. 13/435,934, dated Mar. 4, 2016, 18 pages, U.S.A.
United States Patent and Trademark Office, Office Action for U.S. Appl. No. 14/633,603, dated Apr. 14, 2016, 44 pages, U.S.A.
United States Patent and Trademark Office, Office Action for U.S. Appl. No. 13/435,592, dated Jun. 2, 2016, 32 pages, U.S.A.
United States Patent and Trademark Office, Office Action for U.S. Appl. No. 13/435,934, dated Jul. 21, 2016, 21 pages, U.S.A.
United States Patent and Trademark Office, Office Action for U.S. Appl. No. 14/517,500, dated Jun. 16, 2016, 11 pages, U.S.A.
United States Patent and Trademark Office, Office Action for U.S. Appl. No. 14/639,740, dated Jul. 13, 2016, 49 pages, U.S.A.
United States Patent and Trademark Office, Office Action for U.S. Appl. No. 14/620,443, dated Jul. 29, 2016, 16 pages, U.S.A.
United States Patent and Trademark Office, Office Action for U.S. Appl. No. 14/667,042, dated Aug. 3, 2016, 54 pages, U.S.A.
United States Patent and Trademark Office, Office Action for U.S. Appl. No. 14/670,464, dated Aug. 29, 2016, 53 pages, U.S.A.
United States Patent and Trademark Office, Supplemental Notice of Allowability for U.S. Appl. No. 13/799,627, dated Sep. 3, 2014, 3 pages, USA.
U.S. Appl. No. 61/449,044, of USP 2012/0226390, filed Mar. 3, 2011.
Users Guide to ROADNET 5000—Routing & Scheduling System, Version 5.6, Roadnet Technologies, Inc., A United Parcel Service Company, 1996.
Wheeler, Nikki, et al., Multi-Criteria Trucking Freeway Performance Measures in Congested Corridors, Portland State University, Jan. 23-27, 2011.
Wischoff, et al., "SOTIS—a Self-Organizing Traffic Information System," VTC 2003—Spring, the 57th IEEE Semiannual Vehicular Technology Conference, Jeju Korea Apr. 22-25, 2003, vol. 4, pp. 2442-2446.
United States Patent and Trademark Office, Corrected Notice of Allowability for U.S. Appl. No. 14/639,740, dated Feb. 15, 2017, 7 pages, U.S.A.
United States Patent and Trademark Office, Notice of Allowance for U.S. Appl. No. 14/517,500, dated Mar. 10, 2017, 9 pages, U.S.A.
United States Patent and Trademark Office, Notice of Allowance for U.S. Appl. No. 14/133,258, dated Feb. 23, 2017, 16 pages. U.S.A.
United States Patent and Trademark Office, Office Action for U.S. Appl. No. 14/716,160, dated Jan. 27, 2017, 52 pages, U.S.A.
United States Patent and Trademark Office, Office Action for U.S. Appl. No. 14/716,160, dated Apr. 3, 2017, 6 pages, U.S.A.
United States Patent and Trademark Office, Office Action for U.S. Appl. No. 14/670,464, dated Feb. 7, 2017, 14 pages, U.S.A.
United States Patent and Trademark Office, Office Action for U.S. Appl. No. 14/620,443, dated Feb. 15, 2017, 18 pages, U.S.A.
United States Patent and Trademark Office, Office Action for U.S. Appl. No. 13/435,592, dated Mar. 23, 2017, 39 pages, U.S.A.
United States Patent and Trademark Office, Office Action for U.S. Appl. No. 14/667,042, dated Feb. 7, 2017, 8 pages, U.S.A.
European Patent Office, Summons to Attend Oral Proceedings pursuant to Rule 115(1) EPC for Application No. 12743628.5, dated Oct. 24, 2016, 7 pages, Germany.
State Intellectual Property Office of the P.R.C., Second Office Action for Application No. 201280046510.1, dated Nov. 22, 2016, 17 pages, China.
United States Patent and Trademark Office, Office Action (Corrected Notice of Allowability) for U.S. Appl. No. 14/667,042, dated Dec. 13, 2016, 7 pages, U.S.A.
United States Patent and Trademark Office, Office Action for U.S. Appl. No. 13/435,592, dated Dec. 1, 2016, 34 pages, U.S.A.
United States Patent and Trademark Office, Office Action for U.S. Appl. No. 14/095,560, dated Dec. 2, 2016, 28 pages, U.S.A.
United States Patent and Trademark Office, Office Action for U.S. Appl. No. 14/708,648, dated Jan. 4, 2017, 54 pages, U.S.A.
United States Patent and Trademark Office, Office Action for U.S. Appl. No. 14/708,473, dated Jan. 4, 2017, 50 pages, U.S.A.
United States Patent and Trademark Office, Office Action for U.S. Appl. No. 13/435,934, dated Jan. 12, 2017, 9 pages, U.S.A.
United States Patent and Trademark Office, Notice of Allowance for U.S. Appl. No. 14/639,740, dated Jan. 20, 2017, 12 pages, U.S.A.
Notice of Allowance and Fees Due (PTOL-85) dated Sep. 29, 2017 for U.S. Appl. No. 14/716,160.
Notice of Allowance and Fees Due (PTOL-85) dated Sep. 27, 2017 for U.S. Appl. No. 14/095,560.
Notice of Allowance and Fees Due (PTOL-85) dated Sep. 27, 2017 for U.S. Appl. No. 13/436,083.
Notice of Allowance and Fees Due (PTOL-85) dated Oct. 11, 2017 for U.S. Appl. No. 15/437,288.
Notice of Allowance and Fees Due (PTOL-85) dated Oct. 2, 2017 for U.S. Appl. No. 14/620,443.
Non-Final Rejection dated Oct. 6, 2017 for U.S. Appl. No. 14/718,145.
CA Office Action dated Oct. 2, 2017 for CA Application No. 2842842.
Notice of Allowance and Fees Due (PTOL-85) dated Sep. 7, 2017 for U.S. Appl. No. 13/436,083.
Notice of Allowance and Fees Due (PTOL-85) dated Aug. 31, 2017 for U.S. Appl. No. 14/711,806.
Notice of Allowance and Fees Due (PTOL-85) dated Aug. 25, 2017 for U.S. Appl. No. 14/670,464.
Notice of Allowance and Fees Due (PTOL-85) dated Aug. 16, 2017 for U.S. Appl. No. 14/620,443.
English Translation of CN Office Action dated Jul. 20, 2017 for CN Application No. 201280025670.
Corrected Notice of Allowability dated Sep. 11, 2017 for U.S. Appl. No. 14/095,560.
CN Office Action dated Jul. 20, 2017 for CN Application No. 201280025670.
(IPEA/408) Written opinion under Chapter II dated Aug. 3, 2017 for WO Application No. PCT/US16/022272.

(56) References Cited

OTHER PUBLICATIONS

Notice of Allowance and Fees Due (PTOL-85) dated Jun. 21, 2017 for U.S. Appl. No. 13/435,934.
Notice of Allowance and Fees Due (PTOL-85) dated Jun. 15, 2017 for U.S. Appl. No. 14/905,560.
Notice of Allowance and Fees Due (PTOL-85) dated Jul. 13, 2017 for U.S. Appl. No. 14/670,464.
International Preliminary Examining Authority, Written Opinion (Second) for International Application No. PCT/US2016/022272, dated May 12, 2017, European Patent Office, 5 pages.
Final Rejection dated May 15, 2017 for U.S. Appl. No. 14/711,806.
Final Rejection dated May 5, 2017 for U.S. Appl. No. 13/435,831.
Final Rejection dated Jul. 25, 2017 for U.S. Appl. No. 14/708,473.
Final Rejection dated Jul. 12, 2017 for U.S. Appl. No. 14/708,648.
Final Rejection dated Jul. 10, 2017 for U.S. Appl. No. 14/716,160.
English Translation of CN Office Action dated May 17, 2017 for CN Application No. 201280046510.
Communication from the Examining Division dated May 12, 2017 for EP Application No. 12743628.
CN Office Action dated May 17, 2017 for CN Application No. 201280046510.
Outgoing Written Opinion of the ISA dated Nov. 14, 2017 for WO Application No. PCT/US16/020392.
Notice of Allowance and Fees Due (PTOL-85) dated Nov. 8, 2017 for U.S. Appl. No. 14/620,443.
Notice of Allowance and Fees Due (PTOL-85) dated Nov. 7, 2017 for U.S. Appl. No. 14/716,160.
Notice of Allowance and Fees Due (PTOL-85) dated Dec. 21, 2017 for U.S. Appl. No. 14/718,145.
Notice of Allowance and Fees Due (PTOL-85) dated Dec. 12, 2017 for U.S. Appl. No. 13/436,083.
Notice of Allowance and Fees Due (PTOL-85) dated Dec. 4, 2017 for U.S. Appl. No. 14/711,806.
Non-Final Rejection dated Dec. 28, 2017 for U.S. Appl. No. 15/615,232.
Non-Final Rejection dated Dec. 1, 2017 for U.S. Appl. No. 14/708,648.
Non-Final Rejection dated Dec. 1, 2017 for U.S. Appl. No. 14/708,473.
Decision of Patent Board received for U.S. Appl. No. 13/435,592, dated Dec. 21, 2018, 22 pages.
Examiner Interview Summary received for U.S. Appl. No. 13/435,498, dated Jun. 16, 2014, 1 page.
Notice of Allowance received for U.S. Appl. No. 15/703,470, dated Apr. 2, 2018, 11 pages.

* cited by examiner

DETERMINING STREET SEGMENT HEADINGS

CROSS-REFERENCE TO RELATED APPLICATIONS

This application claims priority to U.S. application Ser. No. 14/708,473, filed May 11, 2015, which is hereby incorporated herein in its entirety.

FIELD

Various embodiments of the present invention described herein generally relate to efficiency management systems for analyzing heading data associated with at least one street segment traveled by at least one vehicle and determining the accuracy of map data based on the heading data.

BACKGROUND

Improving operational efficiency has become an increasingly high priority for many businesses. In particular, the increasing cost of energy resources, such as fuel, and recent trends toward improving environmental sustainability have made reducing the consumption of energy resources essential for many businesses to maintain a competitive advantage in their respective industries. Likewise, volatile economic climates have increased competition in various industry sectors and prompted competing businesses to provide better services at a lower cost. As a result, many businesses are searching for ways to improve their operational efficiency in order to reduce costs and provide improved service to customers.

As business emphasis on operational efficiency has grown, so too has the development of technology capable of monitoring various operational characteristics. For example, businesses can use GPS (or other GNSS systems) and RFID technologies to track the location of people, vehicles, and items and generate data representative of those locations in relation to time. In addition, telematics devices are currently used in vehicles to capture information relating to various vehicle dynamics, such as fuel consumption and location.

Although such technology allows businesses to capture large amounts of operational data reflecting a variety of operational characteristics, many businesses are unable to effectively utilize such data to improve efficiencies. This problem is commonly the result of an inability to effectively translate otherwise overwhelming amounts of data into a format that is meaningful in the context of analyzing a particular efficiency. Thus, there is a need in the art for improved concepts for capturing and evaluating operational data in order to improve operational efficiencies in a variety of business contexts.

Additionally, inaccuracies in data used to plan business operations may cause additional inefficiencies. Map vendors, such as Tele Atlas® and NAVTEQ®, provide digital/electronic geographical maps to a variety of clients for different purposes. For example, map vendors may provide digital maps to (a) Internet websites for providing driving directions to consumers; (b) cellular companies to include in smartphones; (c) government agencies (e.g., the United States Department of Agriculture and Environmental Protection Agency) for use in their respective government functions; and (d) transportation and logistics companies, such as United Parcel Service of America, Inc. (UPS), for determining and optimizing delivery routes. Unfortunately, the digital maps provided by vendors are not always accurate. For example, streets may be marked as one-way streets when the street is really bi-directional. By increasing the accuracy of the digital maps, business operations based on the digital maps may be more efficient. Thus, there is also a need in the art for improving the accuracy of digital maps.

BRIEF SUMMARY

Various embodiments of the present invention are generally directed to a system for determining the heading of a defined street segment traveled by at least one vehicle and/or increasing the accuracy of map data based on heading data for one or more defined street segments. Various embodiments of the present invention provide methods, systems, computer program products, and apparatuses for determining whether a street segment is a one-way street segment or a bi-directional segment, validating map data, and/or updating map data.

According to one aspect of the present invention, a method for determining whether a street segment is a one-way street segment or a bi-directional segment is provided. In one embodiment, the method comprises receiving vehicle telematics data associated with one or more vehicles during one or more time periods, the vehicle telematics data indicating a street segment traveled by the one or more vehicles during the one or more time periods; and based at least in part on the vehicle telematics, determining whether the street segment is a one-way street segment or a bi-directional segment.

According to another aspect of the present invention, a system is provided. The system comprises at least one processor and at least one memory including computer program code. In one embodiment, the at least one memory and the computer program code configured to, with the processor, cause the apparatus to at least receive vehicle telematics data associated with one or more vehicles during one or more time periods, the vehicle telematics data indicating a street segment traveled by the one or more vehicles during the one or more time periods; and based at least in part on the vehicle telematics, determine whether the street segment is a one-way street segment or a bi-directional segment.

According to yet another aspect of the present invention, a computer program product is provided. In one embodiment, computer program product comprises at least one non-transitory computer-readable storage medium having computer-readable program code portions stored therein. The computer-readable program code portions comprise an executable portion configured to receive vehicle telematics data associated with one or more vehicles during one or more time periods, the vehicle telematics data indicating a street segment traveled by the one or more vehicles during the one or more time periods; and an executable portion configured to, based at least in part on the vehicle telematics, determine whether the street segment is a one-way street segment or a bi-directional segment.

According to one aspect of the present invention, a method for validating map data associated with a street segment is provided. In one embodiment, the method comprises (a) receiving vehicle telematics data indicative of a travel path of a vehicle on a street segment during one or more time periods; (b) based at least in part on the vehicle telematics data, determining a street segment direction for the street segment, the determined street segment direction indicating whether the street segment is a one-way street segment or a bidirectional street segment; (c) identifying map data associated with the street segment, wherein the map data comprises street segment direction data indicating whether the street segment is a one-way street segment or a bidirectional street segment; and (d) comparing the street segment direction data of the map data and the determined street segment direction.

According to another embodiment of the present invention, a system is provided. In one embodiment, the system comprises at least one processor and at least one memory including computer program code. The at least one memory and the computer program code configured to, with the processor, cause the apparatus to at least (a) receive vehicle telematics data indicative of a travel path of a vehicle on a street segment during one or more time periods; (b) based at least in part on the vehicle telematics data, determine a street segment direction for the street segment, the determined street segment direction indicating whether the street segment is a one-way street segment or a bidirectional street segment; (c) identify map data associated with the street segment, wherein the map data comprises street segment direction data indicating whether the street segment is a one-way street segment or a bidirectional street segment; and (d) compare the street segment direction data of the map data and the determined street segment direction.

According to yet another aspect of the present invention, a computer program product is provided. In one embodiment, the computer program product comprises at least one non-transitory computer-readable storage medium having computer-readable program code portions stored therein. The computer-readable program code portions comprise (a) an executable portion configured to receive vehicle telematics data indicative of a travel path of a vehicle on a street segment during one or more time periods; (b) an executable portion configured to, based at least in part on the vehicle telematics data, determine a street segment direction for the street segment, the determined street segment direction indicating whether the street segment is a one-way street segment or a bidirectional street segment; (c) an executable portion configured to identify map data associated with the street segment, wherein the map data comprises street segment direction data indicating whether the street segment is a one-way street segment or a bidirectional street segment; and (d) an executable portion configured to compare the street segment direction data of the map data and the determined street segment direction.

According to one aspect of the present invention, a method for updating map data associated with a street segment is provided. In one embodiment, the method comprises (a) receiving vehicle telematics data indicative of a travel path of a vehicle on a street segment during one or more time periods; (b) based at least in part on the vehicle telematics data, determining a street segment direction for the street segment, the determined street segment direction indicating whether the street segment is a one-way street segment or a bidirectional street segment; (c) identifying map data associated with the street segment, wherein the map data comprises street segment direction data indicator indicating whether the street segment is a one-way street segment or a bidirectional street segment; and (d) updating the map data to reflect the determined street segment direction for the street segment direction.

According to another aspect of the present invention, a system is provided. In one embodiment, the system comprises at least one processor and at least one memory including computer program code. The at least one memory and the computer program code configured to, with the processor, cause the apparatus to at least (a) receive vehicle telematics data indicative of a travel path of a vehicle on a street segment during one or more time periods; (b) based at least in part on the vehicle telematics data, determine a street segment direction for the street segment, the determined street segment direction indicating whether the street segment is a one-way street segment or a bidirectional street segment; (c) identify map data associated with the street segment, wherein the map data comprises street segment direction data indicator indicating whether the street segment is a one-way street segment or a bidirectional street segment; and (d) update the map data to reflect the determined street segment direction for the street segment direction.

According to yet another aspect of the present invention, a computer program product is provided. In one embodiment, the computer program product comprises at least one non-transitory computer-readable storage medium having computer-readable program code portions stored therein. the computer-readable program code portions comprise (a) an executable portion configured to receive vehicle telematics data indicative of a travel path of a vehicle on a street segment during one or more time periods; (b) an executable portion configured to based at least in part on the vehicle telematics data, determine a street segment direction for the street segment, the determined street segment direction indicating whether the street segment is a one-way street segment or a bidirectional street segment; (c) an executable portion configured to identify map data associated with the street segment, wherein the map data comprises street segment direction data indicator indicating whether the street segment is a one-way street segment or a bidirectional street segment; and (d) an executable portion configured to update the map data to reflect the determined street segment direction for the street segment direction.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

Figure 1:
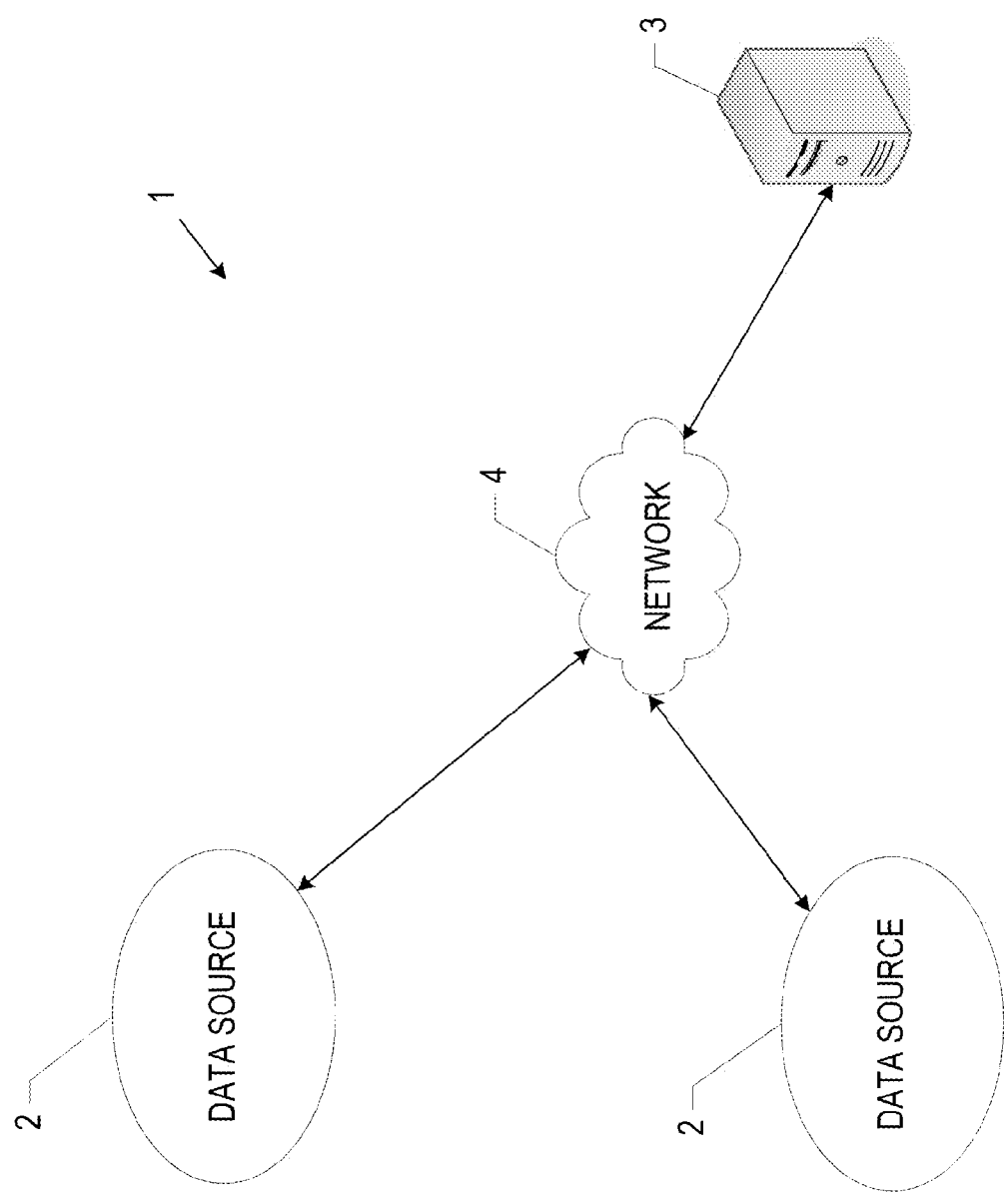
FIG. 1 is a block diagram of an efficiency management system according to one embodiment of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Overview

According to various embodiments of the present invention, an efficiency management system is provided for evaluating various operational efficiencies based on operational data. FIG. 1 illustrates the high-level system architecture of an efficiency management system 1 according to various embodiments. As shown, the efficiency management system 1 includes one or more data sources 2 and a central server 3. The data sources 2 may be, for example, devices configured for capturing and communicating operational data indicative of one or more operational characteristics (e.g., a telematics device capturing telematics data from a vehicle, handheld devices such as mobile phones, and/or the like). The data sources 2 are configured to communicate with the central server 3 by sending and receiving operational data over a network 4 (e.g., the Internet, an Intranet, or other suitable network). The central server 3 may be configured to process and evaluate operational data received from the data sources 2 in accordance with user input received via a user interface (e.g., a graphical user interface (user interface) provided on a local or remote computer). A user interface may be an application, browser, user interface, interface, and/or similar words used herein interchangeably. For example, in certain embodiments, the central server 3 may be configured for segmenting operational data according to various operational activities, identifying various undesirable or inefficient activities or occurrences based on the operational data, and/or generating a graphical presentation based on the operational data that displays operational activities in the context of other efficiency-indicative data.

As discussed in greater detail below, the components and general system architecture of the efficiency management system 1 illustrated in FIG. 1 may be adapted for use in specific environments. For example, in certain embodiments, the efficiency management system may be configured as a "fleet management system" adapted for evaluating and managing a fleet of vehicles (e.g., a fleet of vehicles operated by a carrier entity, a fleet of taxis or buses operated by a private or public transportation entity, and/or the like). In such embodiments, the data sources may comprise telematics devices positioned on various vehicles in the fleet, as well as mobile service devices operated at least in part by operators of the fleet vehicles. Likewise, the central server may be configured for evaluating telematics data received from the telematics devices in order to assess vehicle efficiency and other logistical efficiencies. In addition, the central server may be configured for providing graphical presentations of telematics data in efficiency-indicative formats, as well as for updating GPS-based maps based on vehicle telematics data.

The following description provides a detailed explanation of certain embodiments of the efficiency management system, including the aforementioned fleet management system. As will be appreciated from the detailed description herein, the various components and features of these systems may be modified and adapted to assess efficiencies in a variety of operational contexts.

Fleet Management System

According to various embodiments, a fleet management system is provided for capturing and storing operational data for a fleet of vehicles, and for evaluating the operational data in order to assess various fleet efficiencies and improve the overall operational efficiency of the fleet. The fleet management system may be used, for example, by a carrier entity to evaluate the efficiency of a fleet of vehicles used to deliver freight or packages. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like.

As described in detail below, various embodiments of the fleet management system are configured to capture operational data from the fleet—including telematics data from fleet vehicles—and evaluate the captured operational data in order to identify inefficient operations. As a particular example, the efficiency management system may be configured to evaluate telematics data captured from one or more vehicles to evaluate the accuracy of map data based on vehicle travel during a particular time period, along a particular travel route, and/or within a particular geographic area. As will be appreciated from the description herein, this and other system attributes allow the fleet management system to assist vehicle fleet managers (e.g., carrier entities) in improving the operating efficiency of their fleet.

Fleet Management System Architecture

Figure 2:
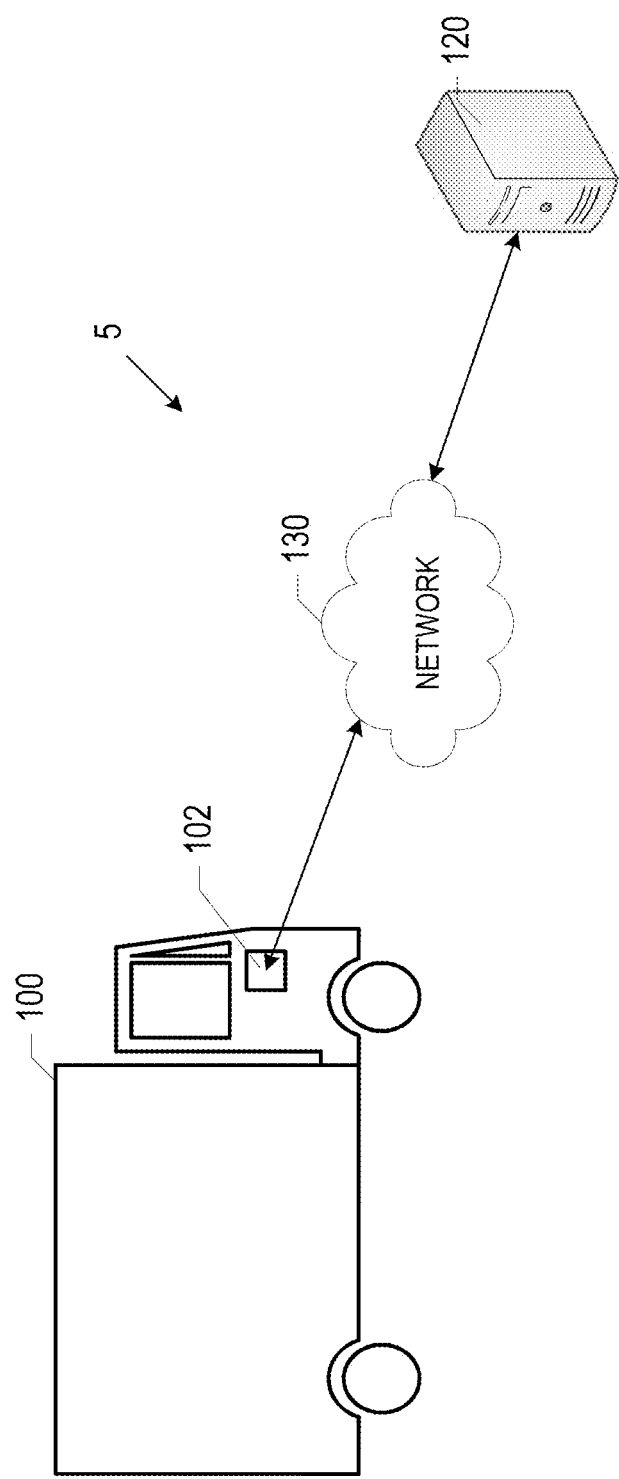
FIG. 2 is a block diagram of a fleet management system according to one embodiment of the present invention.

FIG. 2 shows the system architecture of a fleet management system 5 according to various embodiments. In the illustrated embodiment, the fleet management system 5 comprises a vehicle telematics device 102 positioned on a vehicle 100 and a central server 120. A vehicle 100 may be a manned or an unmanned tractor, a truck, a car, a motorcycle, a moped, a Segway, a bicycle, a golf cart, a hand truck, a cart, a trailer, a tractor and trailer combination, a van, a flatbed truck, a vehicle, a drone, an airplane, a helicopter, a barge, a boat, and/or any other form of object for moving or transporting people and/or items (e.g., one or more packages, parcels, bags, containers, loads, crates, items banded together, vehicle parts, pallets, drums, the like, and/or similar words used herein interchangeably). The telematics device 102 and the central server 120 are configured to communicate with each other via a communications network 130 (e.g., the Internet, an Intranet, a cellular network, or other suitable network). In addition, the telematics device 102 and central server 120 are configured for storing data to an accessible central server database (not shown) located on, or remotely from, the central server 120.

In the description provided herein, the fleet management system 5 may be configured for managing and evaluating the operation of a large fleet of vehicles. As such, in various embodiments, the fleet management system 5 may further comprise a plurality of telematics devices 102, each being associated with one of a plurality of vehicles 100. While the detailed description of the fleet management system's components is provided below with reference to individual components or devices, it will be understood from the description herein that various embodiments of the fleet management system 5 may include a plurality of the components each configured as described below. For example, large-scale embodiments of the fleet management system may include thousands of telematics devices 102 each capturing data from a unique vehicle 100 and transmitting the captured data to multiple servers 120. In addition, as will be appreciated from the description herein, the fleet management system 5 may be adapted for managing and evaluating a fleet of vehicles in a variety of contexts, such as a fleet of taxis, buses, and other service vehicles. Accordingly, the telematics device 102 represents one embodiment of a telematics device that may be adapted for providing telematics data for a fleet of vehicles.

In the illustrated embodiment of FIG. 2, the vehicle 100 includes a plurality of vehicle sensors configured for generating telematics data indicative of various vehicle dynamics, such as engine ignition, engine speed, vehicle speed, vehicle location, vehicle heading, and the status of various vehicle components. The vehicle sensors may be controlled by the telematics device 102, which may be positioned on or within the vehicle 100. In controlling the various vehicle sensors, the telematics device 102 is able to capture and store telematics data from the various vehicle sensors according to a programmed logic and associate the captured telematics data with contextual data (e.g., date, time, location). The captured telematics data and contextual data may then be transmitted by the telematics device 102 directly to the central server 120 via the network 130, or to another computing device (which may later transmit the data to the central server 120 itself).

According to various embodiments, the central server 120 is generally configured for evaluating operational data (e.g., telematics data) for a fleet of vehicles in order to assess various fleet efficiencies and aid fleet management system 5 users in managing the fleet. As shown in FIG. 2, the central server 120 may be configured for receiving and storing telematics data from the telematics device 102 over the network 130. By collecting such operational data over a period of time from various telematics devices 102—which may be associated with a fleet of vehicles 100—the central server 120 is able to amass operational data reflecting the overall operations of the fleet. As will be described in greater detail below, the central server 120 may be configured for evaluating telematics data, presenting the data to a user, and evaluating the data in a variety of ways in order to improve the operating efficiency of the fleet of vehicles 100.

The various components of the fleet management system 5 are now described in detail below according to various embodiments.

Network

As indicated, in one embodiment, the communications network 130 (and associated devices and entities) may also include one or more communications interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the communications network 130 (and associated devices and entities) may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Vehicle Sensors

As noted above, in various embodiments the vehicle 100 is equipped with a variety of vehicle sensors capable of generating vehicle telematics data. For example, in one embodiment, the vehicle 100 includes sensors configured to make measurements and capture data pertaining to the following vehicle dynamics: engine ignition (e.g., on or off), engine speed (e.g., RPM and idle time events), vehicle speed (e.g., miles per hour), seat belt status (e.g., engaged or disengaged), vehicle heading (e.g., degrees from center), vehicle backing (e.g., moving in reverse or not moving in reverse), vehicle door status (e.g., open or closed), vehicle handle status (e.g., grasped or not grasped by a driver), vehicle location (e.g., GPS coordinates; latitude and longitude), distance traveled (e.g., miles between two points), throttle position, brake pedal position, parking brake position, distance or time since last maintenance, and various engine measurements (e.g., engine oil pressure, engine temperature, and engine faults). In various other embodiments, the vehicle 100 may include any combination of the above-referenced sensors (and additional sensors known in the art) depending on the operational data desired by a fleet management system 5 user.

According to various embodiments, the vehicles sensors disposed within the vehicle 100 comprise on/off sensors, which register a voltage amount that corresponds with an on/off condition. For example, in one embodiment, a seat belt sensor may register 0V when the seat belt is disengaged and 12V when the seat belt is engaged. Such on/off sensors are sufficient for measuring vehicle dynamics in which operational data is needed to indicate two conditions, such as a seat belt, which is either engaged or disengaged at all times. As another example, one or more door position sensors may be connected, for example, to the driver side, passenger side, and bulkhead doors, and may register 0V when the door with which the sensor is associated is in an open position, and 12V when the door is closed. As another example, an ignition sensor may register 0V when the vehicle 100 is turned off and 12V when the vehicle 100 is turned on. As yet another example, a backing light sensor may register 0V when the vehicles' backing lights are off and 12V when the vehicle's backing lights are on. As yet another example, the engine idle sensor may be configured to generate 0V when the engine speed is above idle and 12V when the engine is idling.

In addition, according to various embodiments, the vehicle sensors disposed within the vehicles 100 also comprise variable voltage sensors, which may be used to register variations in voltage reflecting a certain vehicle dynamic. For example, the engine speed sensor may detect the speed of the engine in revolutions per minute (RPM) by registering a particular voltage that corresponds to a particular RPM reading. The voltage of the sensor may increase or decrease proportionately with increases or decreases in the engine RPM. As another example, oil pressure sensors may detect the vehicle's oil pressure by registering a particular voltage that corresponds to a particular oil pressure. Other examples of variable voltage sensors may include temperature sensors, vehicle speed sensors, vehicle heading sensors, and vehicle location sensors.

In addition, according to various embodiments, the vehicle sensors disposed within the vehicles 100 also comprise environmental sensors, such as air quality sensors, temperature sensors, and/or the like. Thus, the captured data may also include carbon monoxide (CO), nitrogen oxides (NOx), sulfur oxides (SOx), Ethylene Oxide (EtO), ozone (O3), hydrogen sulfide (H2S) and/or ammonium (NH4) data, and/or meteorological data (e.g., referred to herein as telematics data).

The exemplary vehicle sensors described above may be configured, for example, to operate in any fashion suitable to generate computer-readable data that may be captured, stored, and transmitted by the telematics device 102. In addition, while certain sensors are preferably disposed at particular locations on or within the vehicles 100 (e.g., handle sensors at the vehicle handles), other sensors may be disposed anywhere within the vehicle, such as within the telematics device 102 itself (e.g., a location sensor).

Data Source: Telematics Device

As noted above, according to various embodiments, the telematics device 102 (or data source) may be configured to control various vehicle sensors positioned on an associated vehicle 100, capture vehicle telematics data generated by those sensors, and transmit the captured telematics data to the central server 120 via one of several communication methods. According to various embodiments, the various functions of the telematics device 102 described herein may be generally understood as being performed by one or more of the telematics device 102 components described below.

Figure 3:
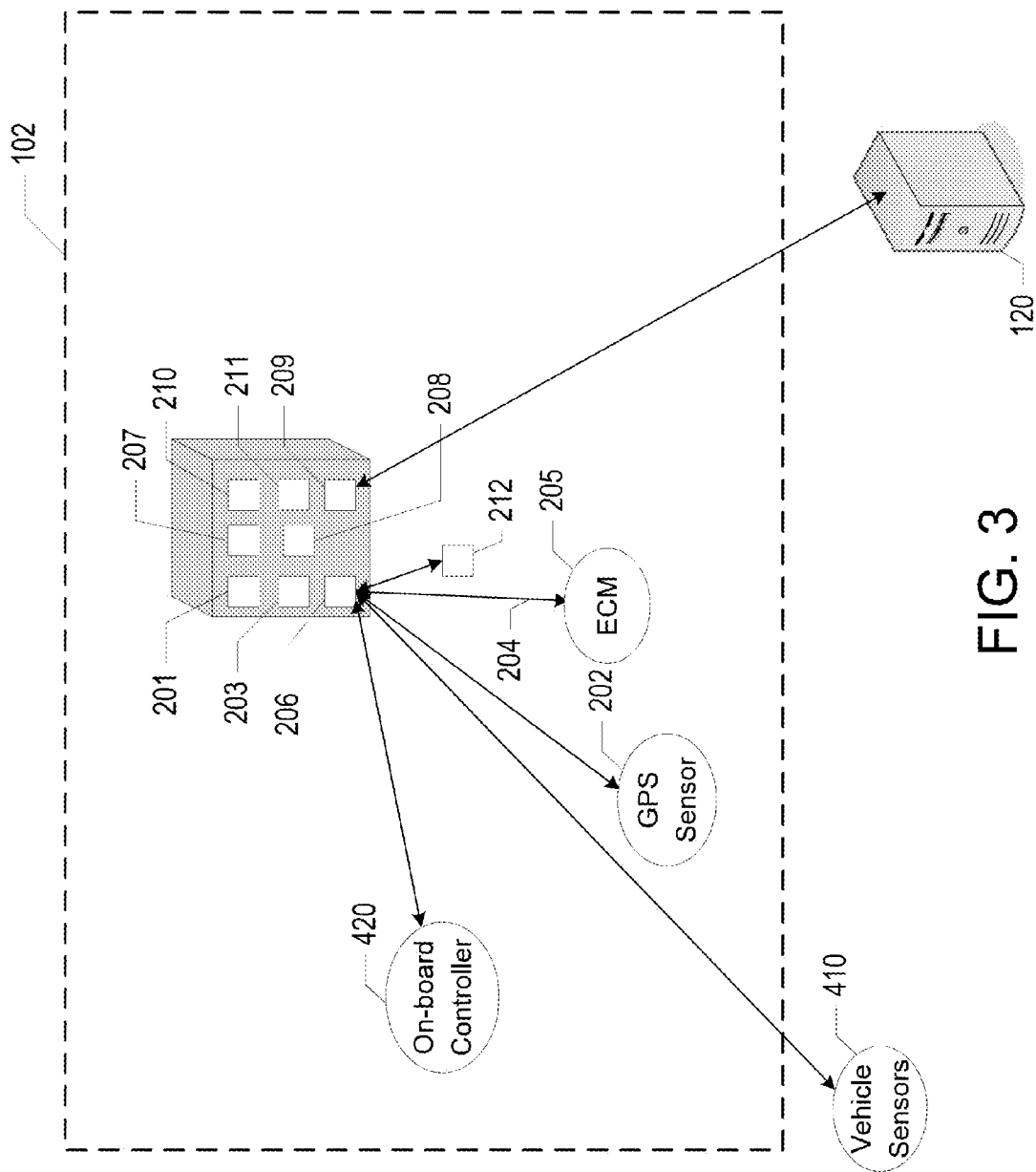
FIG. 3 is a block diagram of a telematics device according to one embodiment of the present invention.

FIG. 3 illustrates a detailed schematic block diagram of an exemplary telematics device 102 according to one embodiment. In the illustrated embodiment, the telematics device 102 includes the following components: a processor or processing element 201 (e.g., one or more complex programmable logic devices (CPLDs), microprocessors, multi-core processors, coprocessing entities, application-specific instruction-set processors (ASIPs), integrated circuits, application specific integrated circuits (ASICs), field programmable gate arrays (FPGAs), programmable logic arrays (PLAs), hardware accelerators, other circuitry, and/or the like), a location-determining device or sensor 202 (e.g., GPS sensor), a real-time clock 203, J-Bus protocol architecture 204, an electronic control module (ECM) 205, a port 206 for receiving data from vehicle sensors 410 located in one of the vehicles 100 (shown in FIG. 2), a communication port 207 for receiving instruction data, a radio frequency identification (RFID) tag 212, a power source 208, a data radio 209 for communication using various wired or wireless protocols and/or various memory 210, and a programmable logic controller (PLC) 211. In an alternative embodiment, the RFID tag 212, the location sensor 202, and the PLC 211 may be located in the vehicle 100, external from the telematics device 102. In other embodiments, the processes described herein as being carried out by a single processor 201 may be accomplished by multiple processors. In various embodiments, the telematics device 102 may not include certain of the components described above, and may include any other suitable components in addition to, or in place of, those described above. For example, the telematics device 102 may include various types of communications components other than those described above (e.g., to support new or improved communications techniques).

In one embodiment, the location sensor 202 may be one of several components available in the telematics device 102. The location sensor 202 may be, for example, a GPS-based sensor compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The location sensor 202 may be used to receive position, time, and speed data. In addition, the location sensor 202 may be configured to detect when its vehicle 100 has entered or exited a GPS-defined geographic area (e.g., a geo-fenced area). As will be appreciated from the description herein, more than one location sensor 202 may be utilized, and other similar techniques may likewise be used to collect geo-location information associated with the vehicle 100 and/or its driver.

In one embodiment, the ECM 205 with J-Bus protocol 204 may be one of several components available in the telematics device 102. The ECM 205, which may be a scalable and subservient device to the telematics device 102, may have data processor capability to decode and store analog and digital inputs and ECM data streams from vehicle systems and sensors 410, 420. The ECM 205 may further have data processing capability to collect and present vehicle data to the J-Bus 204 (which may allow transmittal to the telematics device 102), and output standard vehicle diagnostic codes when received from a vehicle's J-Bus-compatible on-board controllers 420 or vehicle sensors 410.

In one embodiment, the instruction data receiving port 207 may be one of several components available in the telematics device 102. Embodiments of the instruction data receiving port 207 may include an Infrared Data Association (IrDA) communication port, a data radio, and/or a serial port. The instruction receiving data port 207 may receive instructions for the telematics device 102. These instructions may be specific to the vehicle 100 in which the telematics device 102 is installed, specific to the geographical area in which the vehicle 100 will be traveling, or specific to the function the vehicle 100 serves within the fleet.

In one embodiment, an RFID tag 212 may be one of several components available for use with the telematics device 102. One embodiment of the RFID tag 212 may include an active RFID tag, which comprises at least one of the following: (1) an internal clock; (2) a memory; (3) a microprocessor; and (4) at least one input interface for connecting with sensors located in the vehicle 100 or the telematics device 102. Another embodiment of the RFID tag 212 may be a passive RFID tag. One or more RFID tags 212 may be internal to the telematics device 102, wired to the telematics device 102, and/or proximate to the telematics device 102. Each RFID tag 212 may communicate wirelessly with RFID interrogators within a certain geographical range of each other. RFID interrogators may be located external to the vehicle 100.

In one embodiment, the data radio 209 may be one of several components available in the telematics device 102. The data radio 209 may be configured to communicate using various wired or wireless protocols, or any combination thereof. In one embodiment, a WPAN data radio provides connectivity between the telematics device 102 and peripheral devices used in close proximity to the vehicle 100, a local computer, a cellular telephone, and/or the like. As mentioned above, in one embodiment of the invention, a WPAN, such as, for example, a Bluetooth™ network (IEEE 802.15.1 standard compatible) may be used to transfer information between the telematics device 102 and a portable data acquisition device or a peripheral device. In other embodiments, WPANs compatible with the IEEE 802 family of standards may be used. In one embodiment, the data radio 209 may be a Bluetooth™ serial port adapter that communicates wirelessly via WPAN to a Bluetooth™ chipset located in a peripheral device. In addition, a Media Access Control (MAC) address, which is a code unique to each Bluetooth™-enabled device that identifies the device, similar to an Internet protocol address identifying a computer in communication with the Internet, can be communicated to other devices in communication with the WPAN, which may assist in identifying and allowing communication among vehicles, cargo, and portable data acquisition devices equipped with Bluetooth™ devices. As discussed above with regard to FIG. 2, and as one of ordinary skill in the art will readily recognize, other wireless protocols exist (e.g., cellular technology) and can likewise be used in association with embodiments of the present invention.

As described in greater detail below, in various embodiments, the telematics device 102 may be configured to capture and store telematics data from the vehicle sensors 410 at predefined time intervals and in response to detecting the occurrence of one or more of a plurality of predefined vehicle events. Generally, a vehicle event may be defined as a condition relating to any parameter or combination of parameters measurable by the one or more vehicle sensors 410 (e.g., the engine idling, vehicle direction, vehicle turns, vehicle speed exceeding a certain threshold, etc.). As such, the telematics device 102 may be configured to continuously monitor the various vehicle sensors 410 and detect when the data being generated by one or more the vehicle sensors 410 indicates one or more of the plurality of predefined vehicle events. In response to detecting a vehicle event, the telematics device 102 can capture data from all of the vehicle sensors 410 or a particular subset of the vehicle sensors 410 associated with the detected vehicle event.

As an example, the telematics device 102 may be configured to recognize the occurrence of a first vehicle event (e.g., the vehicle's 100 engine being turned on or off), a second vehicle event (e.g., the vehicle's 100 speed exceeding a certain threshold), a third vehicle event (e.g., a seat belt in the vehicle 100 being engaged or disengaged), and/or a fourth vehicle event (e.g., vehicle's 100 heading reaching a threshold away from center). In one embodiment, the telematics device 102 may be configured to capture and store telematics data from all of the vehicle sensors 410 in response to detecting any of the first vehicle event, the second vehicle event, the third vehicle event, and/or the fourth event. In another embodiment, the telematics device 102 is further configured such that the first vehicle event is associated with a first subset of vehicle sensors (e.g., the seat belt sensor and location sensor), the second vehicle event is associated with a second subset of vehicle sensors (e.g., a vehicle speed sensor and location sensor), the third vehicle event is associated with a third subset of vehicle sensors (e.g., a seat belt sensor, engine speed sensor, and vehicle speed sensor), and the fourth vehicle event is associated with a fourth subset of vehicle sensors (e.g., a heading sensor and a location sensor). Accordingly, in this embodiment, the telematics device 102 will capture and store telematics data from the first set of vehicle sensors after detecting the first vehicle event, the second set of vehicle sensors after detecting the second vehicle event, the third set of vehicle sensors after detecting the third vehicle event, and the fourth set of vehicle sensors after detecting the fourth vehicle event.

The vehicle events programmed for recognition by the telematics device 102 can be defined in a variety of ways. As will be appreciated from the description herein, the telematics device 102 may be configured to capture telematics data in response to vehicle events defined by any combination of conditions sensed by the vehicle sensors 410. These predefined vehicle events may be stored, for example, on the telematics device's memory 210, or on another data storage medium accessible by the telematics device's processor 201.

For example, in various embodiments, the telematics device 102 may be configured to recognize vehicle events characterized by data generated by on/off vehicle sensors. These vehicle events may include: (a) a vehicle's engine being turned on, (b) a vehicle's engine being turned off, (c) a vehicle door opening, (d) a vehicle door closing, (e) a vehicle door being locked, (f) a vehicle door being unlocked, (g) a vehicle's reverse gear being selected, (h) a vehicle's one or more forward drive gears being selected, (i) a vehicle's neutral or park gear being selected, (j) a vehicle's parking break being engaged, (k) a vehicle's seat belt being engaged, (l) a vehicle's seat belt being disengaged, (m) a vehicle's heading changing or continuing, (l) a vehicle turning, and any other event definable by a parameter measured by an on/off sensor.

In addition, various embodiments of the telematics device 102 are also configured to recognize vehicle events characterized by data generated by variable voltage vehicles sensors or other types of dynamic vehicle sensors. These vehicle events may include (a) a vehicle's speed increasing from standstill to a non-zero value, (b) a vehicle's speed decreasing from a non-zero value to standstill, (c) a vehicle's engine speed exceeding a certain threshold, (d) a vehicle's engine speed dropping below a certain threshold, (e) a vehicle beginning to move in a reverse direction, (f) a vehicle ceasing to move in a reverse direction, (g) a vehicle's heading reaching a threshold away from center, (h) a vehicle's engine temperature exceeding a certain threshold, (i) a vehicle's gas level falling below a certain level, (j) a vehicle's speed exceeding a certain threshold, and any other event definable by a parameter measured by a variable voltage or other dynamic sensor.

In addition, various embodiments of the telematics device 102 are also configured to recognize vehicle events characterized by data generated by GPS-sensors or other location sensing devices. These vehicle events may include (a) a vehicle moving into a geo-fenced area (e.g., a geo-fenced area defining a shipping hub, delivery area, or other work area), (b) a vehicle moving out of a geo-fenced area (e.g., a geo-fenced area defining a shipping hub, delivery area, or other work area), (c) a vehicle traveling onto a predefined route (e.g., a GPS-based road route), (d) a vehicle traveling off of a predefined route, (e) a vehicle traveling onto a known road (e.g., a road recognized by a GPS device), (f) a vehicle traveling off of a known road (e.g., exceeding a certain predefined distance from a known road), and any other event definable by a parameter measured by a location sensing device.

According to various embodiments, the telematics device 102 may be also configured to recognize multiple unique vehicle events based on a single varying parameter measured by one of the vehicle sensors 410. As one example, the telematics device 102 may be configured such that a first vehicle event is detected anytime the vehicle's speed begins to exceed 50 miles-per-hour, while a second vehicle event is detected anytime the vehicle's speed begins to exceed 70 miles-per-hour. As such, the telematics device 102 may capture telematics data from vehicle sensors 410 in response to the vehicle 100 accelerating past 50 miles-per-hour, and again as the vehicle 100 accelerates past 70 miles-per-hour. In addition, as noted earlier, the telematics device 102 may capture telematics data from unique subsets of vehicle sensors based on the varying measurements of vehicle speed (e.g., a first subset of vehicles sensors associated with the 50-mph vehicle event and a second subset of vehicle sensors associated with the 70-mph vehicle event). This concept may also be applied to other variable parameters sensed by vehicle sensors, such as vehicle heading (e.g., various threshold degrees from center), engine speed (e.g., various threshold RPM measurements), and vehicle distance from a predefined path (e.g., threshold value for feet from a known road, vehicle route, or other GPS-based geographic location).

In addition, vehicle events may be defined by a combination of conditions indicated by various vehicle sensors 410. For example, in certain embodiments, the telematics device 102 may be configured to detect instances of stationary vehicle engine idling (e.g., where the engine is on and the vehicle is not moving) based on a combination of data from a vehicle engine sensor and a vehicle speed sensor. In such embodiments, a first vehicle event is defined as the vehicle 100 being turned on and beginning to idle (e.g., instances in which the vehicle sensors 410 indicate the vehicle's engine is turned on and the vehicle speed is zero), a second vehicle event is defined as the vehicle 100 beginning to move and thereby ceasing to idle (e.g., instances in which the vehicle sensors 410 indicate the vehicle's engine is on and the vehicle's speed has increased from zero to a non-zero value), a third vehicle event is defined as the vehicle 100 slowing to a stop and beginning to idle again (e.g., any instance in which the vehicle sensors 410 indicate the vehicle's engine is on and the vehicle's speed has decreased from a non-zero value to zero), and a fourth vehicle event is defined as the vehicle 100 being turned off and again ceasing to idle (e.g., any instance in which the vehicle sensors 410 indicate the vehicle's engine is turned off and the vehicle speed is zero). As a result, in this embodiment, vehicle events are detected and telematics data is captured at the beginning and end of every period during which the vehicle's engine is idling. In various embodiments, the telematics device 102 can capture every period of engine idling for each vehicle. Other examples of vehicle events defined by a combination of conditions include (a) where a vehicle seat belt is engaged or disengaged while the vehicle is idling, (b) where a vehicle exceeds a certain speed while located within a certain geographic area associated with the certain speed, and (c) a vehicle door opening or closing while the engine is on.

In addition to—or as an alternative to—capturing telematics data in response to detected vehicle events, the telematics device 102 may be further configured to automatically capture telematics data from the vehicle sensors 410 at predefined time intervals. For example, in one embodiment, the telematics device 102 is programmed with a threshold data capture time (e.g., one second, 10 seconds, one minute) and may be configured to automatically capture telematics data from the vehicle sensors 410 where no vehicle events are detected for a period exceeding the defined time. This configuration ensures that the threshold data capture time is the longest possible duration between telematics data being collected and ensures that the vehicle 100 is continuously monitored even through periods where none of the predefined vehicle events are detected. As will be appreciated from the description herein, the threshold data capture time may be defined as any period of time according to the preference of a fleet management system 5 user. Where no vehicle events are defined, the telematics device 102 would then capture telematics data from the vehicle sensors according to the threshold data capture time interval as a default setting.

Although the telematics device 102 is described above as capturing telematics data in response to detected vehicle events, or in response to a certain elapsed time, the telematics device 102 may also be configured to capture telematics data in response to other occurrences. For example, the telematics device 102 may be triggered remotely from the central server to capture telematics data from all, or particular, vehicle sensors at any time.

As noted above, in response to a triggering event—such as a defined vehicle event or elapsed threshold data capture time—the telematics device 102 can capture telematics data from the vehicle sensors 410. In one embodiment, the telematics device 102 may be configured to store the captured telematics data in fields of one or more data records, each field representing a unique measurement or other data from a unique vehicle sensor. As the telematics device 102 continues to capture telematics data in response to triggering events, multiple records of data comprising multiples sets of concurrently captured telematics data are amassed. The captured telematics data may be initially stored, for example, in the telematics devices memory modules 201, in another data storage component of the telematics device 102, or in a remote location (e.g., a cloud database).

In various embodiments, after capturing data from any of the vehicle sensors 410, the telematics device 102 may be further configured to concurrently capture and store contextual data. The contextual data may include, for example, the date (e.g., 12/30/10) and time (e.g., 13:24) the data was captured, the vehicle from which the data was captured (e.g., a vehicle identification number such as 16234), the driver of the vehicle from which the data was captured at the time it was captured (e.g., John Q. Doe), and/or a logged reason for the data capture (e.g., a code indicating a detected vehicle event or indicating that the predefined time interval had elapsed). The contextual data may be captured, for example, from various telematics device components (e.g., an internal clock) and from data stored on the telematics device 102 (e.g., current driver name, current vehicle id, or various vehicle event codes). Further, the telematics device 102 may be configured to associate the captured telematics data with the captured contextual data in order to ensure concurrently captured telematics data and contextual data are linked. For example, in one embodiment, the telematics device 102 stores concurrently captured telematics data and contextual data in the same data record or records.

In various embodiments, a driver may be required to enter his or her driver ID number (or name) and vehicle id number at the beginning of each day (e.g., using a portable data acquisition device in communication with the telematics device 102) in order to enable the telematics device 102 to associate telematics data captured that day with accurate contextual data. In other embodiments, the telematics device 102 may be programmed remotely (e.g., from the central server 120 over the network 130) such that it is associated with the appropriate driver and vehicle information. According to various embodiments, the contextual data may be formatted in any computer-readable and transmittable data format. For example, in one embodiment, the contextual data is metadata. As the telematics data captured from the various vehicle sensors 410 is associated with the captured contextual data, the central server 120 will later be able to search and identify stored telematics data based on—for example—a particular date, time, vehicle, driver, and/or vehicle event.

As noted above, the telematics device 102 is also configured to transmit captured telematics data and contextual data to the central server 120. According to various embodiments, the captured data may be transmitted using any of the communication methods or protocols described herein, as well as various other methods and protocols known in the art. For example, the telematics device 102 may be configured to first attempt to establish a connection with the central server 120 (e.g., via a wireless signal). If a successful connection is made, the telematics device 102 will transfer captured data to the central server 120. However, if a successful connection cannot be made, the telematics device may be configured to alternatively transfer data to a portable data acquisition device (e.g., via a wireless signal or USB connection).

According to various embodiments, the defined vehicle events that trigger the telematics device 102 to capture and store telematics data, the sensors 410 from which telematics data are captured, and the intervals defined for capturing and storing data when no vehicle events are detected each may impact the effectiveness with which the fleet management system 5 is able to evaluate the captured telematics data. For example, capturing data from a large number of vehicle sensors at a high frequency may allow the fleet management system 5 to analyze the telematics data with greater accuracy. This could be accomplished, for example, by a fleet management system with many defined vehicle events and relatively short intervals for automatically capturing telematics data. Although the preceding is described in the context of a telematics device 102 capturing telematics data. The same can occur through various other devices (e.g., mobile phones) and other data (e.g., GPS and heading data captured from a mobile phone).

Data Source: User Computing Entity

In one embodiment, a data source 2 may be a user computing entity. A user may be an individual, a family, a company, an organization, an entity, a department within an organization, a representative of an organization and/or person, and/or the like. As indicated, the terms device, system, computing entity, entity, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Although not shown, the user computing entity can include an antenna, a transmitter (e.g., radio), a receiver (e.g., radio), and a processing element (e.g., CPLDs, microprocessors, multi-core processors, cloud processors, coprocessing entities, ASIPs, microcontrollers, and/or controllers) that provides signals to and receives signals from the transmitter and receiver, respectively.

The signals provided to and received from the transmitter and the receiver, respectively, may include signaling information in accordance with air interface standards of applicable wireless systems. In this regard, the user computing entity may be capable of operating with one or more air interface standards, communication protocols, modulation types, and access types. More particularly, the user computing entity may operate in accordance with any of a number of wireless communication standards and protocols, such as those described above with regard to the central server 120. In a particular embodiment, the user computing entity may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity may operate in accordance with multiple wired communication standards and protocols, such as those described above with regard to the central server 120 via a network interface.

Via these communication standards and protocols, the user computing entity can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity can also download changes, add-ons, and updates, for instance, to its firmware, software (e.g., including executable instructions, applications, program modules), and operating system.

According to one embodiment, the user computing entity may include location determining aspects, devices, modules, functionalities, and/or similar words used herein interchangeably. For example, the user computing entity may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites (e.g., using GPS). The satellites may be a variety of different satellites, including Low Earth Orbit (LEO) satellite systems, DOD satellite systems, the European Union Galileo positioning systems, the Chinese Compass navigation systems, Indian Regional Navigational satellite systems, and/or the like. This data can be collected using a variety of coordinate systems, such as the DD, DMS, UTM, UPS coordinate systems, and/or the like. Alternatively, the location information can be determined by triangulating the user computing entity's position in connection with a variety of other systems, including cellular towers, Wi-Fi access points, and/or the like. Similarly, the user computing entity may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, NFC transmitters, and/or the like. These indoor positioning aspects can be used in a variety of settings to determine the location of someone or something to within inches or centimeters. The position data, location data, heading data, and/or the like may be referred to as location data, GPS data, user computing entity data, and/or the like.

The user computing entity may also comprise a user interface (that can include a display coupled to a processing element) and/or a user input interface (coupled to a processing element). For example, the user interface may be a user application, browser, user interface, interface, and/or similar words used herein interchangeably executing on and/or accessible via the user computing entity to interact with and/or cause display of information from the central server 120 or telematics device 102, as described herein. The user input interface can comprise any of a number of devices or interfaces allowing the user computing entity to receive data, such as a keypad (hard or soft), a touch display, voice/speech or motion interfaces, or other input device. In embodiments including a keypad, the keypad can include (or cause display of) the conventional numeric (0-9) and related keys (#, *), and other keys used for operating the user computing entity and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity can also include volatile storage or memory and/or non-volatile storage or memory, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity. As indicated, this may include a user application that is resident on the entity or accessible through a browser or other user interface for communicating with the telematics device 102, the central server 120, and/or various other computing entities.

In another embodiment, the user computing entity may include one or more components or functionality that are the same or similar to those of the central server 120, as described in greater detail above. As will be recognized, these architectures and descriptions are provided for exemplary purposes only and are not limiting to the various embodiments.

Central Server

As noted above, various embodiments of the central server 120 are generally configured for receiving and storing operational data (e.g., telematics data received from the telematics device 102) and evaluating the operational data for a fleet of vehicles in order to assess various fleet efficiencies and aid fleet management system 5 users in improving the operational efficiency of the fleet. According to various embodiments, the central server 120 includes various means for performing one or more functions in accordance with embodiments of the present invention, including those more particularly shown and described herein. As will be appreciated from the description herein, however, the central server 120 may include alternative devices for performing one or more like functions without departing from the spirit and scope of the present invention.

Figure 4:
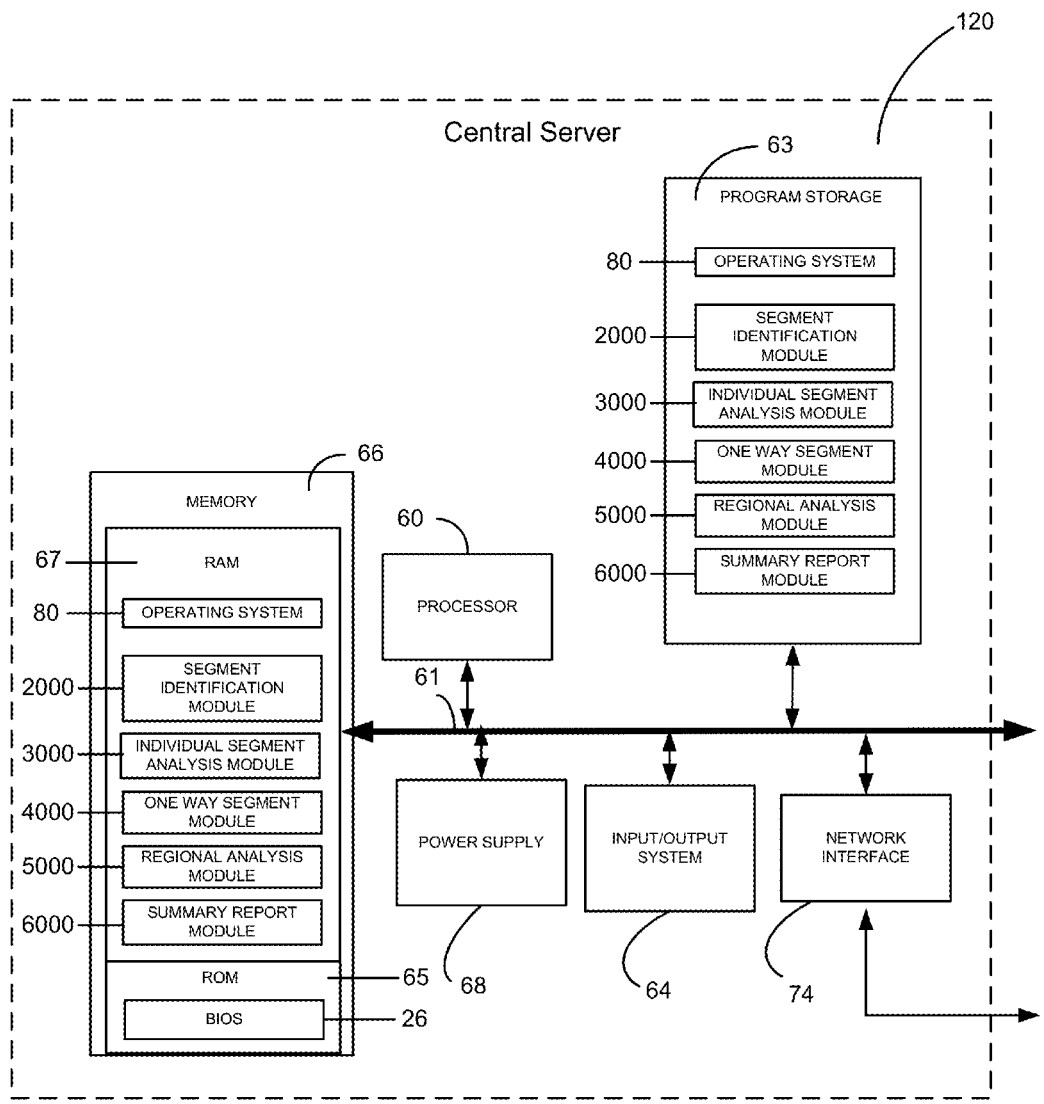
FIG. 4 is a schematic block diagram of a central server according to one embodiment of the present invention.

FIG. 4 illustrates a schematic diagram of the central server 120 according to various embodiments. The central server 120 includes a processor 60 that communicates with other elements within the central server 120 via a system interface or bus 61. In the illustrated embodiment, the central server 120 includes a display device/input device 64 for receiving and displaying data. This display device/input device 64 may be, for example, a keyboard or pointing device that is used in combination with a monitor. In certain embodiments, the central server 120 may not include a display device/input device and may be alternatively accessed by a separate computing device (e.g., a networked device/entity) having a display device and input device. The central server 120 further includes memory 66, which preferably includes both ROM 65 and RAM 67. The server's ROM 65 is used to store a basic input/output system 26 (BIOS), containing the basic routines that help to transfer information between elements within the central server 120.

In addition, the central server 120 includes at least one storage device 63 for storing information on various computer-readable media. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art.

A number of program modules may be stored by the various storage devices and within RAM 65. In the illustrated embodiment, such program modules include an operating system 80, a segment identification module 2000, an individual segment analysis module 3000, a one-way segment module 4000, a regional analysis module 5000, and a summary report module 6000. According to various embodiments, the modules 2000-6000 control certain aspects of the operation of the central server 120 with the assistance of the processor 60 and operating system 80. Embodiments of these modules are described in more detail below in relation to FIGS. 6-23. In a particular embodiment, these program modules 2000-6000, are executed by the central server 120 and are configured to generate user interfaces accessible to users of the system. In one embodiment, the user interfaces may be accessible via the Internet or other communications network. In other embodiments, one or more of the modules 2000-6000 may be stored locally on one or more computers and executed by one or more processors of the computers.

According to various embodiments, the central server 120 may be configured to send data to, receive data from, and utilize data contained in a central server database, which may be comprised of one or more separate, linked databases. For example, in executing the various modules 2000-6000, the central server 120 may retrieve data necessary for performing various analyses from the central server database, and may store data resulting from various analyses in the central server database. According to various embodiments, the central server database may be a component of the central server 120, or a separate component located remotely from the central server 120. In addition, the central server database may be configured for storing data in various data sets. In various embodiments, each data set may comprise a plurality of stored data records, each record (or set of associated records) comprising one or more data fields of unique data entries. For example, telematics data and contextual data concurrently captured by the telematics device 102 may be stored in a data record, where each data field in the data record represents a unique data entry (e.g., a measurement of vehicle speed, GPS coordinates, the time and date the data was captured, and an ID number of the vehicle from which the data was captured).

Also located within the central server 120 is a network interface 74, for interfacing and communicating (e.g., using wired and/or wireless protocols) with other elements of a computer network. It will be appreciated by one of ordinary skill in the art that one or more of the central server 120 components may be located geographically remotely from other central server 120 components. Furthermore, one or more of the components may be combined, and additional components performing functions described herein may be included in the central server 120.

While the foregoing describes a single processor/processing element 60, as one of ordinary skill in the art will recognize, the central server 120 may comprise multiple processors operating in conjunction with one another to perform the functionality described herein. In addition to the memory 66, the processor 60 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

While reference is made to a central "server" 120, as one of ordinary skill in the art will recognize, embodiments of the present invention are not limited to a client-server architecture and that the server need not be centralized. The system of embodiments of the present invention is further not limited to a single server, or similar network entity or mainframe computer system. Rather, the terms server, computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Other similar architectures including one or more network entities operating in conjunction with one another to provide the functionality described herein may likewise be used without departing from the spirit and scope of embodiments of the present invention. For example, a mesh network of two or more personal computers (PCs), or similar electronic devices, collaborating with one another to provide the functionality described herein in association with the central server 120 may likewise be used without departing from the spirit and scope of embodiments of the present invention.

EXEMPLARY OPERATION

Capturing Data for a Fleet

According to various embodiments, the fleet management system 5 may be configured to capture operational data from various vehicles 100 and/or their respective drivers over a period of time in order to amass data reflecting the overall operations of the fleet. The operational data captured by the fleet management system 5 may comprise telematics data, contextual data, user computing entity data, and/or the like.

As described in greater detail below, a data source entity (e.g., telematics device 102, user computing entity, and/or the like) may be configured for capturing operational data (e.g., telematics data, user computing entity data, contextual data, and/or the like) such that the data may later be evaluated. The captured operational data is then transmitted to the central server 120, which receives, processes, and stores the data in order to it prepare it for evaluation in accordance with user requests received via a graphical user interface and/or for automatic analysis in accordance with pre-determined analysis protocols.

Operation of Data Source Capturing Data

Figure 5:
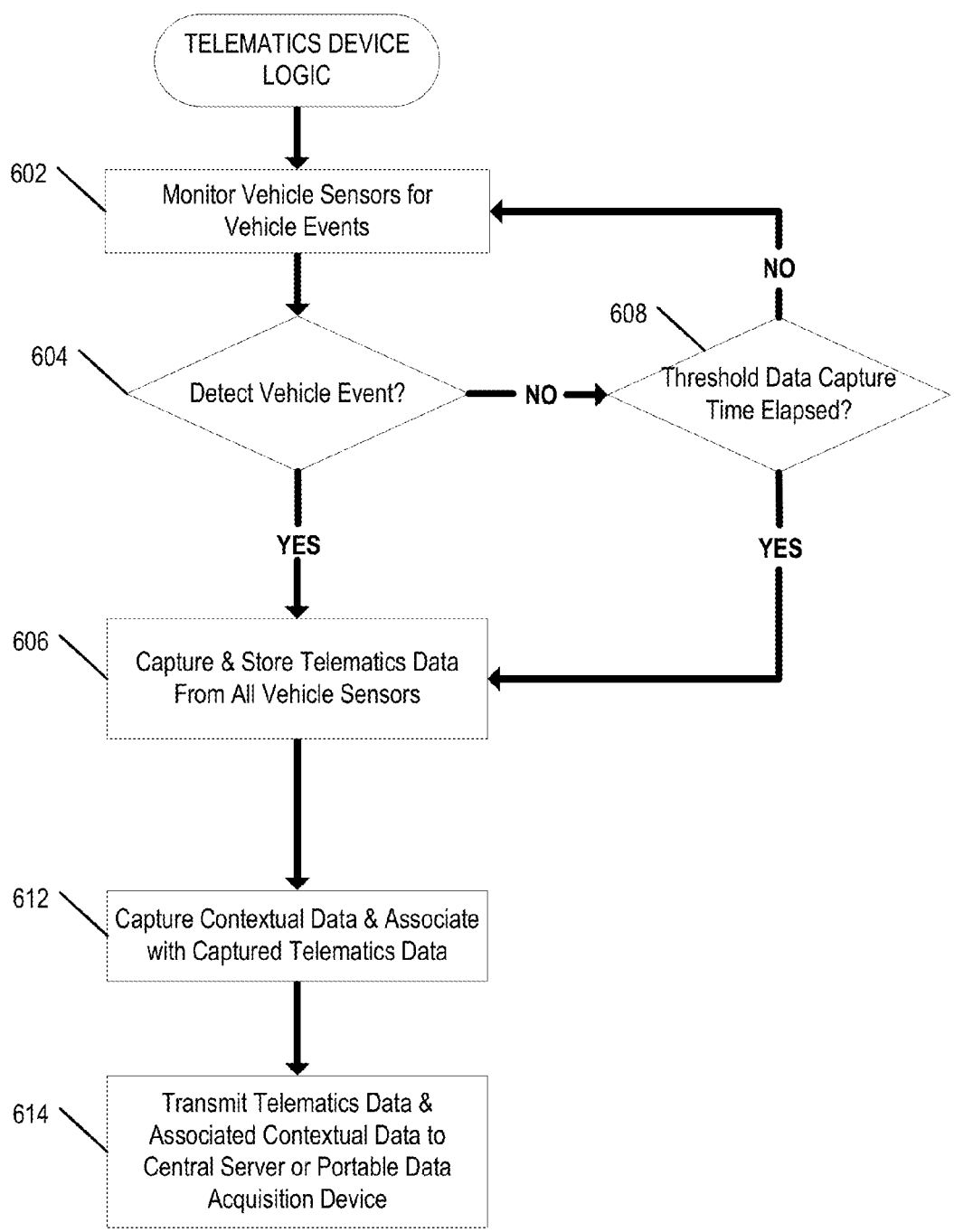
FIG. 5 is a flow diagram of steps executed by the telematics device according to one embodiment of the present invention.

As noted above, according to various embodiments, a data source entity may be configured to collect data from various sensors or determinations, store the data, and transmit the data to the central server 120. FIG. 5 illustrates exemplary steps executed by the telematics device 102 to capture and transmit telematics data according to one embodiment. In various embodiments, the components of the telematics device 102 described herein may be configured to execute the steps of FIG. 5 in accordance with the principles described above. As will also be recognized, various other devices/entities can capture and store various types data using a variety of techniques and approaches.

Beginning with step 602, the telematics device 102 monitors data generated by the vehicle sensors 410 for parameters that match predefined vehicle events programmed in the telematics device 102. In one embodiment, the telematics device 102 can be programmed to monitor some or all the following predefined vehicle events in step 602: (a) the vehicle 100 being turned on and beginning to idle (e.g., where vehicle sensors 410 indicate the vehicle's engine is turned on and the vehicle speed is zero), (b) the vehicle 100 beginning to move and thereby ceasing to idle (e.g., where the vehicle sensors 410 indicate the vehicle's engine is on and the vehicle's speed has increased from zero to a non-zero value), (c) the vehicle 100 slowing to a stop and beginning to idle (e.g., where the vehicle sensors 410 indicate the vehicle's engine is on and the vehicle's speed has decreased from a non-zero value to zero), (d) the vehicle 100 being turned off and ceasing to idle (e.g., where the vehicle sensors 410 indicate the vehicle's engine is turned off and the vehicle speed is zero), (e) the vehicle 100 moving out of a geo-fenced area associated with its home shipping hub (e.g., as indicated by a GPS sensor), (f) the vehicle 100 moving into a geo-fenced area associated with its home shipping hub, (g) the vehicle 100 moving into a geo-fenced area associated with a delivery area assigned to vehicle 100 and its driver, (h) the vehicle 100 moving out of a geo-fenced area associated with a delivery area assigned to vehicle 100 and its driver, (i) the vehicle 100 beginning to move in a reverse direction, (j) the vehicle 100 ceasing to move in a reverse direction, (k) the vehicle's seat belt being engaged or disengaged while the vehicle's engine is on, (l) the vehicle's heading changing beyond a predefined threshold degree, (m) the vehicle's blinker or lights being activated or inactivated, and/or the like.

Next, at step 604, the telematics device 102 determines whether any of the predefined vehicle events have occurred. If a vehicle event is detected, the telematics device 102 moves to step 606, where it can capture and stores telematics data from the vehicle sensors 410. As noted earlier, the telematics data captured from the sensors 410 may indicate measurements or data from each of the vehicle sensors 410. This telematics data may indicate, for example, engine ignition status (e.g., on or off), engine speed (e.g., RPM), vehicle speed (e.g., miles per hour), vehicle location (e.g., latitude and longitude), current distance traveled (e.g., current odometer reading), location status (e.g., on-property, on-area), seat belt status (e.g., engaged or disengaged), heading, speed, acceleration, vehicle backing status (e.g., moving in reverse or not moving in reverse), and/or the like. In one embodiment, the telematics device 102 stores captured telematics data in its memory 210, in another data storage component of the telematics device 102, or in an associated database (e.g., a cloud database).

If a vehicle event is not detected in step 604, the data source entity (e.g., telematics device 102, user computing entity, and/or the like) moves to step 608, where it determines whether a threshold data capture time has elapsed. For example, in one embodiment, the threshold data capture time is defined as 3 seconds. If the data source entity (e.g., telematics device 102, user computing entity, and/or the like) determines that the threshold data capture time has not elapsed, it returns to step 602 to continue monitoring for vehicle events. However, if the data source entity (e.g., telematics device 102, user computing entity, and/or the like) determines that the threshold data capture time has elapsed (e.g., more than 3 seconds have passed since the last time data was captured from the vehicle sensors), the data source entity moves to step 606 and can capture telematics data (and/or various other types of data) from all or some of the vehicle sensors 410 as described above.

Next, at step 612, the data source entity (e.g., telematics device 102, user computing entity, and/or the like) can capture contextual data and associates the contextual data with the telematics data captured and stored in step 606. In various embodiments, step 612 may be executed concurrently with the step 606. In one embodiment, the data source entity (e.g., telematics device 102, user computing entity, and/or the like) may be configured to capture some or all of the following contextual data in step 612: the date (e.g., 12/30/10) and time (e.g., 13:24) the data was captured, the vehicle from which the data was captured (e.g., a vehicle identification number such as 16234), the driver of the vehicle from which the data was captured at the time it was captured (e.g., John Q. Doe), and a logged reason for the data capture (e.g., a code indicating the detected vehicle event or indicating that the threshold data capture time interval elapsed). Further, in one embodiment, the data source entity (e.g., telematics device 102, user computing entity, and/or the like) (or various other entities/devices) may be configured to associate the captured telematics data with the captured contextual data by storing fields of telematics data captured from the vehicles sensors 410 in the same record, or records, as concurrently captured contextual data, thereby associating concurrently captured data.

Next, at step 614, the data source entity (e.g., telematics device 102, user computing entity, and/or the like) (or various other entities/devices) can transmit the telematics data and associated contextual data captured and stored in steps 606 and 612 to the central server 120. This may be accomplished by using any of the transmission methods and systems described herein, as well as other methods, protocols, and systems known in the art. As described earlier, in one embodiment the data source entity (e.g., telematics device 102, user computing entity, and/or the like) may be configured to first attempt to transmit captured data to the central server 120, and subsequently attempt to transfer data to a portable data acquisition device if a connection with the central server 120 is unavailable.

Operation of Central Server Processing Data

According to various embodiments, the central server 120 (or various other entities/devices) may be configured for receiving, processing, and storing the data (e.g., telematics data, user computing entity data, contextual data, and/or the like) received from the data source entity (e.g., telematics device 102, user computing entity, and/or the like). In particular, the central server 120 processes and stores received operational data (e.g., telematics data, user computing entity data, contextual data, and/or the like) in a manner that facilitates evaluation of the data.

According to various embodiments, in response to receiving operational data (e.g., telematics data, user computing entity data, contextual data, and/or the like), the central server 120 may be configured to process and store the data in an operational data set stored on the central server database (which may comprise one or more databases). The central server 120 can populate the operational data set by storing telematics data/user computing entity data in association with concurrently captured contextual data, thereby providing a contextual relationship between all of the stored operational data. For example, in various embodiments, the operational data set comprises a plurality of data records representing concurrently captured data. Each data record (or plurality of associated data records) comprises a plurality of data fields representing a unique data entry.

In one embodiment, a data record of operational data (e.g., telematics data, user computing entity data, contextual data, and/or the like) may comprise a plurality of data fields each representing a measurement from the vehicle sensors 410 (e.g., vehicle speed, vehicle location, engine speed, vehicle heading) and a plurality of data fields each representing a contextual data measurement (e.g., date, time, driver, vehicle, logged reason for data capture). The data in each data field of the record represents data captured concurrently with the data in the other data fields. By storing telematics data/user computing entity data in association with contextual data, the central server 120 may later access and retrieve data from the operational data set by searching the stored data according to date, time, driver, vehicle, logged reason for data capture, or any other data field or combination of data fields associated with the stored telematics data (e.g., engine speed, street segment, intersection, vehicle speed, RPM, etc.).

In addition, according to various embodiments, the central server 120 may be configured for maintaining a planning data set stored in the central server database (or in another database accessible by the central server 120). The planning data set may include stored data indicating, for example, planned delivery routes for various drivers and vehicles (e.g., a GPS-based route plan for a particular vehicle 100), the locations of planned stops along each delivery route (e.g., location name and/or GPS location), planned distances associated with planned delivery routes and stops (e.g., total planned distance for a delivery route, planned distances between planned stops), planned times associated with various routes and stops (e.g., planned times for travel between stops, planned times for executing a delivery at a particular stop), planned delivery activities at each stop (e.g., pickup, delivery, pickup & delivery), particular packages or freight to be picked-up or delivered at a given stop (e.g., one or more tracking numbers for packages or freight), bills of lading associated with packages or freight being picked up or delivered at a particular stop (e.g., a number or code associated with a bill of lading), the weight of packages or freight to be picked-up or delivered at a particular stop (e.g., total weight for a pickup or delivery, or weight associated with a particular bill of lading, package, or portion of freight), and the number of units to be picked up or delivered at each stop (e.g., total number of units for a pickup or delivery, or number of units associated with a particular bill of lading).

The data stored in the planning data set may be stored such that it is associated with, for example, a particular driver, vehicle, route, date, and/or hub location. As such, the central server 120 may access and retrieve data from the planning data set by searching the stored data according to driver, vehicle, route, date, hub location, or any data field associated with the above described data (e.g., time, distance, weight, bill of lading number, tracking number, etc.). Accordingly, as described in greater detail below, the central server 120 may retrieve planning data stored in the planning data set for use in evaluating the operational data stored in the operational data set, and/or the central server 120 may retrieve operational data stored in the operational data set for use in evaluating planning data stored in the planning data set.

According to various embodiments, the central server 120 may be further configured to evaluate data stored in the operational data set to identify segments of activity indicated by the operational data (herein referred to as "segmenting" the data). For example, each identified activity segment may represent a period of time (e.g., 11:00 to 11:42 on 12/31/10) classified according to activity (e.g., engine idle segments, turning segments, change of direction segments, vehicle stop time, vehicle travel time), many of which may overlap with one another. According to various embodiments, these activity segments may be identified by the central server 120 in accordance with the principles and configurations detailed in U.S. patent application Ser. No. 13/435,498 (now published as U.S. Publication No. 2012/0253888), the entirety of which is hereby incorporated by reference. In such embodiments, the resulting segmented data may be stored in a segmented data set for use in further evaluations or analyses performed by the central server 120.

In various embodiments, the central server 120 may be configured to evaluate data stored in the operational data set to identify segment data corresponding to a defined street segment, the direction and/or heading of a vehicle as it traveled a defined street segment; to determine various attributes of each defined street segment (e.g., whether a defined street segment is a bi-directional segment, a reversible segment, or a one-way segment; the direction of travel of one-way segments; and/or the like); and/or to evaluate the accuracy of map data associated with each defined street segment. For example, the central server 120 may be configured to identify one or more defined street segments. The central server 120 may be further configured to identify incidences where a vehicle traveled along a defined street segment, resulting in a data set corresponding to the vehicle traveling along the defined street segment (referred to herein as "traveled segment data"). Additionally, the central server 120 may be configured to analyze one or more traveled segments for a defined street segment. In various embodiments, the resulting traveled segment data is stored in a street segment data set of the central server database (which may be unique from, or a subset of, the aforementioned segmented data set). As described in greater detail below, according to various embodiments, the central server 120 may be configured to execute the above-referenced segment identification module 2000 in order to segment the operational data stored in the operational data set and generate traveled segment data to be stored in the street segment data set. For example, in one embodiment, the central server 120 may be configured to execute the segment identification module 2000 at the end of each business day (and/or at various other time periods and/or in response to certain triggers), segment the day's data added to the operational data set, and add the resulting segmented data to the street segment data set. In various other embodiments, the central server 120 may be configured to run the segment identification module 2000 at other increments or in response to a specific user request (e.g., a user request to segment a specific subset of operational data in the operational data set).

Segment Identification

As noted above, various embodiments of the segment identification module 2000 are configured for identifying one or more defined street segments and evaluating operational data in order to identify traveled segment data corresponding to one or more defined street segments. Generally, each identified set of traveled segment data corresponds to operational data collected as the vehicle traveled along a defined street segment. For example, the operational data collected by a vehicle as it traversed Main Street between $9^{th}$ Street and $10^{th}$ Street may be identified as a set of traveled segment data corresponding to defined street segment defined along Main Street between $9^{th}$ Street and $10^{th}$ Street. By identifying one or more sets of traveled segment data corresponding to a defined street segment within the operational data captured by the data source entity (e.g., telematics device 102, user computing entity, and/or the like), the segment identification module 2000 can generate an accounting of the direction of travel by one or more vehicles within the fleet during one or more time periods as the one or more vehicles traversed the defined street segment. As described in relation to the various modules 3000-6000 below, identifying traveled segment data in the captured operational data for a fleet enables the central server 120 to perform a variety of further analyses in order to assess various fleet efficiencies, evaluate the accuracy of map data, and to provide a graphical representation of vehicle and delivery activities for any period of time.

Figure 6:
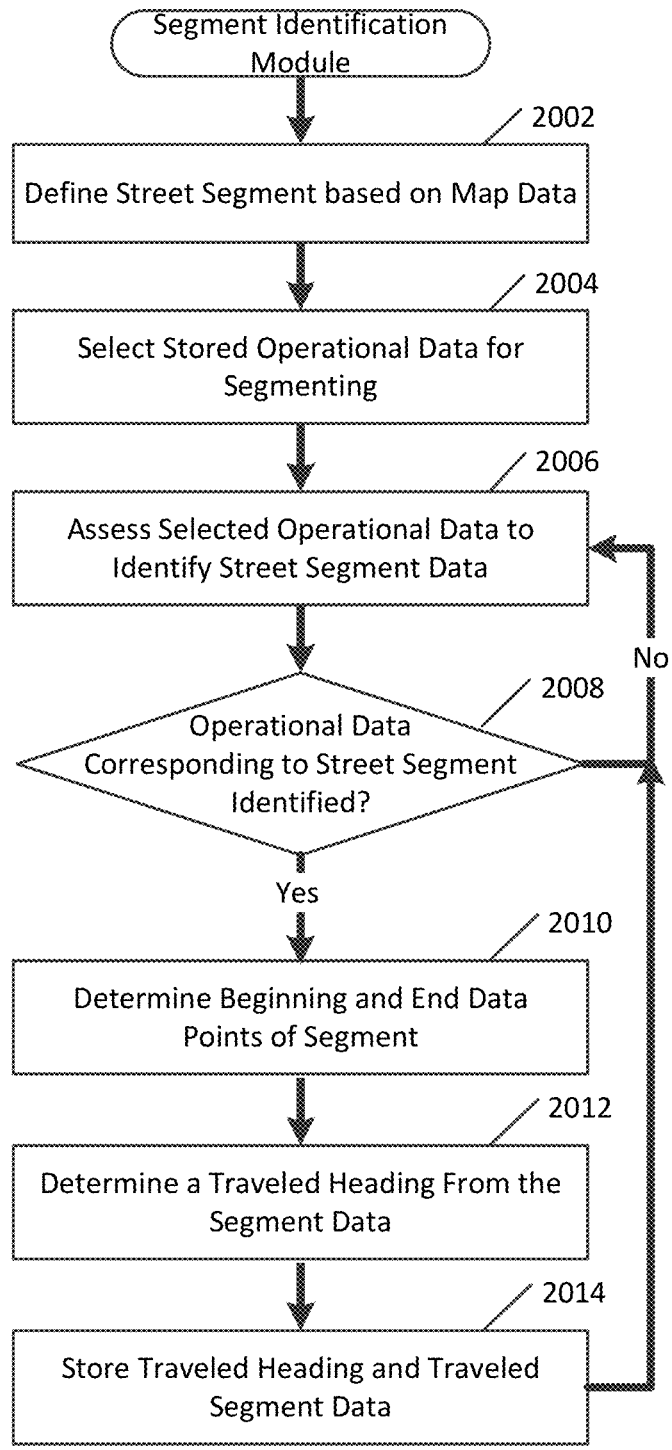
FIG. 6 is a flow diagram of steps executed by a segment identification module according to one embodiment of the present invention.

FIG. 6 illustrates steps executed by the segment identification module 2000 to segment operational data according to one embodiment. Beginning at step 2002, the segment identification module 2000 first defines one or more street segments. A street segment may be defined based on map data, user input, and/or the like. Each defined street segment is defined by one or more GPS coordinates, latitude and longitude coordinates, a geo-fenced area, and/or the like and corresponds to a portion of a street or roadway that a vehicle might travel. For example, the defined street segment may be defined by a pair of end points, a middle point and a length of the defined segment, or a series of points along the defined street segment, where each point may be given by GPS coordinates or latitude and longitude coordinates. In some embodiments, the segment identification module 2000 loads data identifying and/or defining one or more defined street segments, rather than defining the defined street segments each time the segment identification module 2000 is initiated.

Next, the segment identification module selects operational data from the operational data set to segment for segment data identification at step 2004. As noted above, the central server 120 may call the segment identification module 2000 to segment newly captured (or previously unsegmented) operational data stored in the operational data set with a predefined frequency (e.g., at the end of every business day) or in response to a user request (e.g., a request received via the user interface to segment operational data corresponding to certain user-selected parameters). Accordingly, the segment identification module 2000 executes step 2004 according to these frequency or user request parameters (e.g., by identifying unsegmented data in the operational data set or by retrieving operational data corresponding to user-specified parameters).

Next, at step 2006 the segment identification module 2000 assesses data points in the selected operational data to identify instances in which the vehicle has traveled along a defined street segment. For example, in certain embodiments, the segment identification module 2000 may be configured to identify instances in which a particular vehicle's location indicates that the vehicle traveled along the defined street segment. For example, if the defined street segment is defined by a geo-fence or if the location of the vehicle indicated by an operational data point is within the geo-fence, the operational data point corresponds to when the vehicle traveled along the defined street segment. If the defined street segment is defined by one or more points (e.g., GPS coordinates, latitude and longitude coordinates, and/or the like) or if a location of the vehicle indicated by an operational data point is within a predetermined distance of one of the points, a line defined by one or more of the points, and/or the like, the operational data point corresponds to when the vehicle traveled along the defined street segment.

Figure 7A:
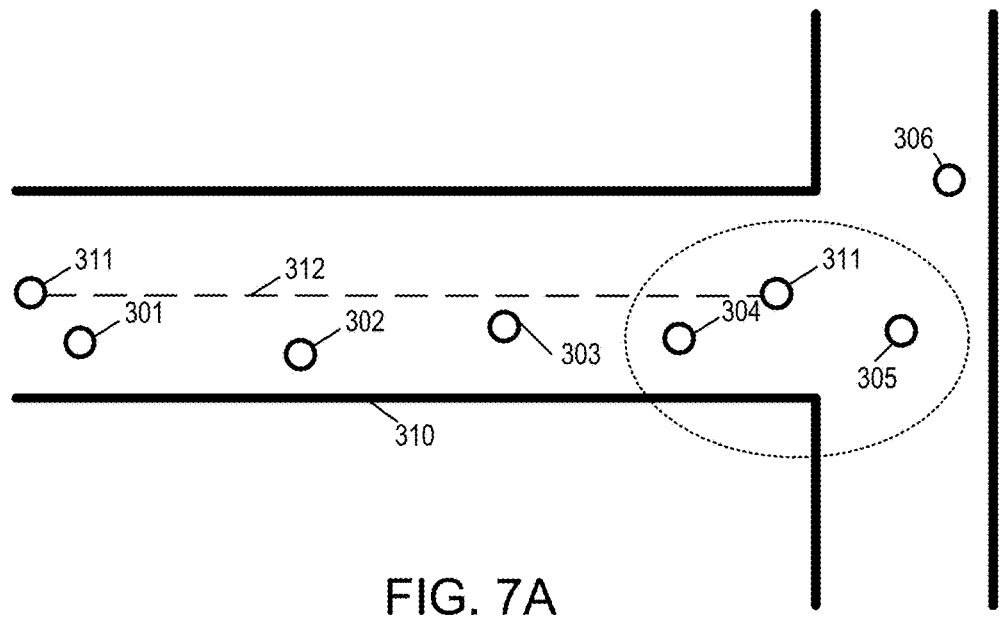
FIGS. 7A and 7B are diagrams of data points captured by the telematics device as a vehicle traveled along a defined street segment according to one embodiment.
Figure 7B:
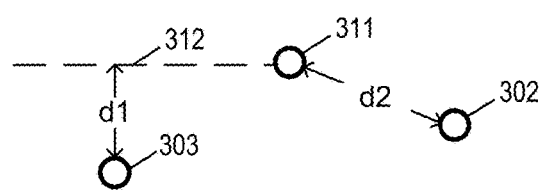

To illustrate this concept, FIG. 7A shows a defined street segment 310 defined by street segment end points 311. The dashed line 312 connects end points 311. Data points 301, 302, 303, 304, 305, and 306 are operational data points collected as a vehicle traveled in the vicinity of defined street segment 310. FIG. 7B is an expanded view of the circled portion of FIG. 7A. The minimum distance between data point 304 and the dashed line 312 is calculated to be a distance d1 and the minimum distance between data point 305 and the dashed line 312 is calculated to be a distance d2. A threshold distance d, which may be predetermined or provided via user input, is used to determine if an operational data point was collected while the vehicle was traveling down the street segment. For example, in the example illustrated in FIGS. 7A and 7B, d1 is less than or approximately equal to the threshold value d and d2 is greater than the threshold value d. Thus, as data point 304 is less than the threshold distance away from the dashed line 312, data point 304 was collected as the vehicle traveled along the defined street segment 310 and, as data point 305 is greater than the threshold distance away from the dash line 312, data point 305 was captured as the vehicle traveled in the vicinity of the street segment 310, but not along the defined street segment 310. Using this logic, the segment identification module 2000 can identify operational data that was collected as a vehicle traveled along a defined street segment. It should be understood that a variety of other methods may be used to determine which operational data points were collected as the vehicle traveled along a defined street segment. For example, in another embodiment, a defined street segment may be defined by a geo-fence. In such an embodiment, the segment identification module 2000 may determine that an operational data point was captured while the vehicle traveled along the defined street segment if the location of the vehicle when the data point was captured is within the geo-fence used to define the defined street segment.

Referring back to FIG. 6, the segment identification module 2000 next proceeds to step 2008 where it determines whether the current data point was captured while the vehicle traveled along a defined street segment based on the analysis performed in step 2006. If the current data point does not correspond to a defined street segment, the segment identification module 2000 returns to step 2006 and analyzes the next data point in the operational data. If the current data point has been marked as corresponding to a defined street segment, the segment identification module 2000 continues to step 2010.

As multiple data points are typically captured as a vehicle travels along a street segment, the segment identification module 2000 next identifies in step 2010 the data points associated with the vehicle entering and exiting the defined street segment. According to various embodiments, the segment identification module 2000 may be configured to identify these segment starting and ending points based on an analysis similar to that discussed above with respect to step 2006 and/or other suitable analysis. For example, using the data point marked in step 2006 as a base, the segment identification module 2000 first analyzes data points preceding the marked data point to identify the data point corresponding to the vehicle beginning to travel along the defined street segment. In various embodiments, the data point corresponding to the vehicle entering the defined street segment, referred to as the segment starting point, may be defined as a data point captured when the vehicle was traveling along and/or located on the defined street segment and for which the immediately preceding data point was not captured when the vehicle was traveling along and/or located on the defined street segment. For example, the segment identification module 2000 analyzes prior data points to determine which data point corresponds to the vehicle entering the defined street segment.

After identifying the segment starting point, the segment identification module 2000 next analyzes data points succeeding the marked data point to identify the data point corresponding to the vehicle leaving the defined street segment. In various embodiments, the data point corresponding to the vehicle leaving the defined street segment, referred to as the segment ending point, may be defined as a data point captured when the vehicle was traveling along and/or located on the defined street segment and for which the immediately seceding data point was not captured when the vehicle was traveling along and/or located on the defined street segment. In various embodiments, this may be accomplished using a methodology similar to that employed to identify the segment starting point. For example, in one embodiment, the segment identification module 2000 analyzes later data points to determine the data point corresponding to when the vehicle exited the defined street segment. Referring back to the illustration of FIG. 7A as an example, if data point 302 is the marked data point, the segment identification module 2000 would first identify data point 303 as the next data point after the marked data point 302. In this example, data point 303 was captured when the vehicle was traveling along the defined street segment, so the segment identification module 2000 would determine that data point 302 is not the segment ending point. The segment identification module 2000 would then analyze data point 303 and determine the data point immediately seceding data point 303, data point 304, was captured while the vehicle was located along the defined street segment. Thus, data point 303 is not the segment ending point. The segment identification module would then analyze data point 304 and determine that the data appoint immediately seceding data point 304, data point 305, was captured while the vehicle was not located along the defined street segment. Thus, the segment identification module 2000 would determine that data point 304 is the segment ending point.

Figure 8:
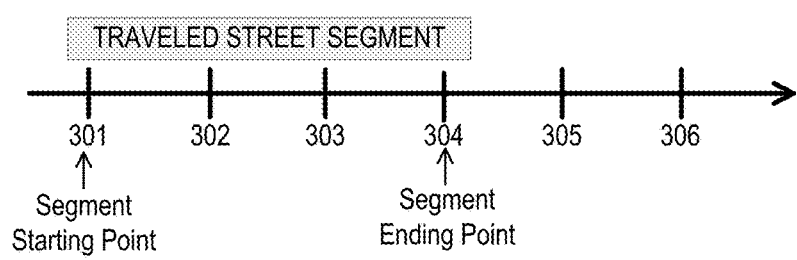
FIG. 8 is a Gantt chart display of a vehicle traveling along the defined street segment shown in FIG. 7A according to one embodiment.

In various embodiments, the segment starting and ending points define a traveled segment. After identifying the starting and ending points of the traveled segment, the segment identification module 2000 completes step 2010 by storing the segment starting and ending points for the traveled segment, all of the points associated with the traveled segment, and/or a sub-set of the points associated with the traveled segment in a street segment data set as being associated with an incidence of a vehicle traveling along a defined street segment (e.g., in the central server database). In various embodiments, the traveled segment data may be stored in association with a defined segment identifier, wherein the defined segment identifier may be configured to identify the defined street segment to which the traveled segment corresponds. In addition, in one embodiment, the identified traveled segment is stored in the street segment data set in association with contextual data indicating the operational data from which it was derived. For context, FIG. 8 shows a Gantt chart type illustration of a traveled segment for a vehicle traveling along a defined street segment identified based on the travel of the vehicle shown in FIG. 7A.

Referring back to FIG. 6, at step 2012, the segment identification module 2000 next determines a traveled heading associated with the traveled segment, wherein the traveled heading indicates the direction the vehicle traveled as it traversed the defined street segment. For example, the segment identification module 2000 may determine the traveled heading as a directional heading (e.g., the vehicle traveled at 36° or 198°), a cardinal or intermediate direction (e.g., the vehicle traveled east or southwest), a relative direction (e.g., heading in to town, away from the airport), and/or the like. As noted above, the operational data may comprise a variety of operational data (e.g., telematics data, user computing entity data, contextual data, and/or the like), such as vehicle heading, location, time the data was collected, and/or other types of data that may be used to determine the traveled heading.

In one embodiment, the vehicle heading data associated with the traveled segment data may be used to determine the traveled heading associated with the traveled segment. The traveled heading determination may be made based on the vehicle heading data associated with a single data point in the traveled segment data or an average or weighted average of the vehicle heading data associated with two or more data points in the traveled segment data. Referring to FIG. 7A, for example, the traveled heading determination may be based on the vehicle heading data associated with data point 303, an average of the vehicle heading data associated with data points 302 and 303, or an average of the vehicle heading data associated with data points 301, 302, 303, and 304. As will be recognized, a variety of other approaches and techniques can be used to determine the heading.

In another embodiment, location data associated with the traveled segment data may be used to determine the traveled heading associated with the traveled segment. As noted above, each data point may be associated with a GPS location or other location. The change in location between two or more data points may therefore be used to determine the direction in which the vehicle traveled between when the data points were captured (e.g., using component or magnitude and direction vector arithmetic and/or the like). The traveled heading may be determined based on the change of location between two consecutive data points of the traveled segment data, two non-consecutive data points of the traveled segment data, an average or weighted average of two or more change in location calculations, based on the change in location between the segment starting point and the segment ending point, and/or the like. For example, referring to FIG. 7A, the traveled heading associated with the traveled segment may be determined by calculating/determining the change in location between the segment starting point 301 and the segment ending point 304, the change in location between points 302 and 303, or by averaging the direction of travel based on the change in location between data points 301 and 302, 302 and 303, and 303 and 304. In various embodiments, when determining the traveled heading, any data points of the traveled data segment that were captured while the vehicle was in reverse may be removed from consideration. As should be understood, a variety of methods may be used to determine the traveled heading associated with the traveled segment.

As should be understood, in various embodiments, one or two data points from the traveled segment data may be sufficient to determine the heading of the vehicle as it traveled along the defined street segment. Thus, in various embodiments, it may not be necessary to identify the segment starting and ending points, to determine all of the data points associated with a traveled segment, and/or store the segment starting and ending points or all of the traveled segment data to the street segment data. In some embodiments, only one data point associated with a traveled segment is identified and/or stored to the street segment data. In other embodiments, two or more data points associated with the traveled segment are identified and/or stored to the street segment data. In some embodiments, all of the data points associated with the traveled segment are identified and/or stored to the street segment data set. Returning to FIG. 6, at step 2014, the segment identification module 2000 stores the traveled heading in association with the traveled segment in the street segment data set.

According to various embodiments, the segment identification module 2000 may also be further configured to execute additional steps to meet the preferences of a particular user. For example, as noted above, the data source entity (e.g., telematics device 102, user computing entity, and/or the like) may be configured to detect when the vehicle 100 has entered or exited a particular geographic area, such as a geo-fenced area surrounding a shipping hub. Accordingly, in one embodiment, the segment identification module 2000 is further configured to review operational data and identify data indicating instances in which the vehicle 100 has entered or departed a predefined geographical area. As a result, the segment identification module 2000 may be configured to analyze street segments traveled within a geo-fenced area or outside of a geo-fenced area separately. For example, in certain embodiments a user may want to assess only traveled segments occurring within a particular geo-fenced delivery area (e.g., a residential neighborhood), which the segment identification module 2000 may be configured to accomplish.

As a result of the foregoing steps, the segment identification module 2000 is able to populate the street segment data set with data records each corresponding to an identified traveled segment. For example, in one embodiment, each traveled segment data record comprises a traveled heading, a defined segment identifier, a segment starting point, a segment ending point, a traveled segment location (e.g., GPS coordinates), a traveled segment time, a traveled segment duration, a traveled segment driver, a traveled segment vehicle ID, a traveled segment route ID, and a traveled segment hub location (e.g., the shipping hub from which the vehicle associated with the traveled segment departed).

User Interface

As described above, the central server 120 may be configured for evaluating operational data (e.g., telematics data and contextual data) for a fleet of vehicles in order to assess various fleet efficiencies and aid fleet management system 5 users in improving the operational efficiency of the fleet. According to various embodiments, the central server's 120 evaluation of operational data is conducted in accordance with user instructions received via the central server's user interface. In various embodiments, the user interface is a graphical user interface accessible from a remote device/entity (e.g., in communication with the central server 120 via the network 130), or by using the central server's display device/input device 64. For example, in various embodiments, a user may log in to the fleet management system 5 from a remote device/entity (e.g., by opening a log-in page and entering a user id and password using a device/entity display and keyboard). The central server 120 may be configured to recognize any such log-in request, verify that user has permission to access the system (e.g., by confirming the user id and password are valid), and present/provide the user with a user interface (e.g., displayed on the device/entity's monitor).

Figure 9:
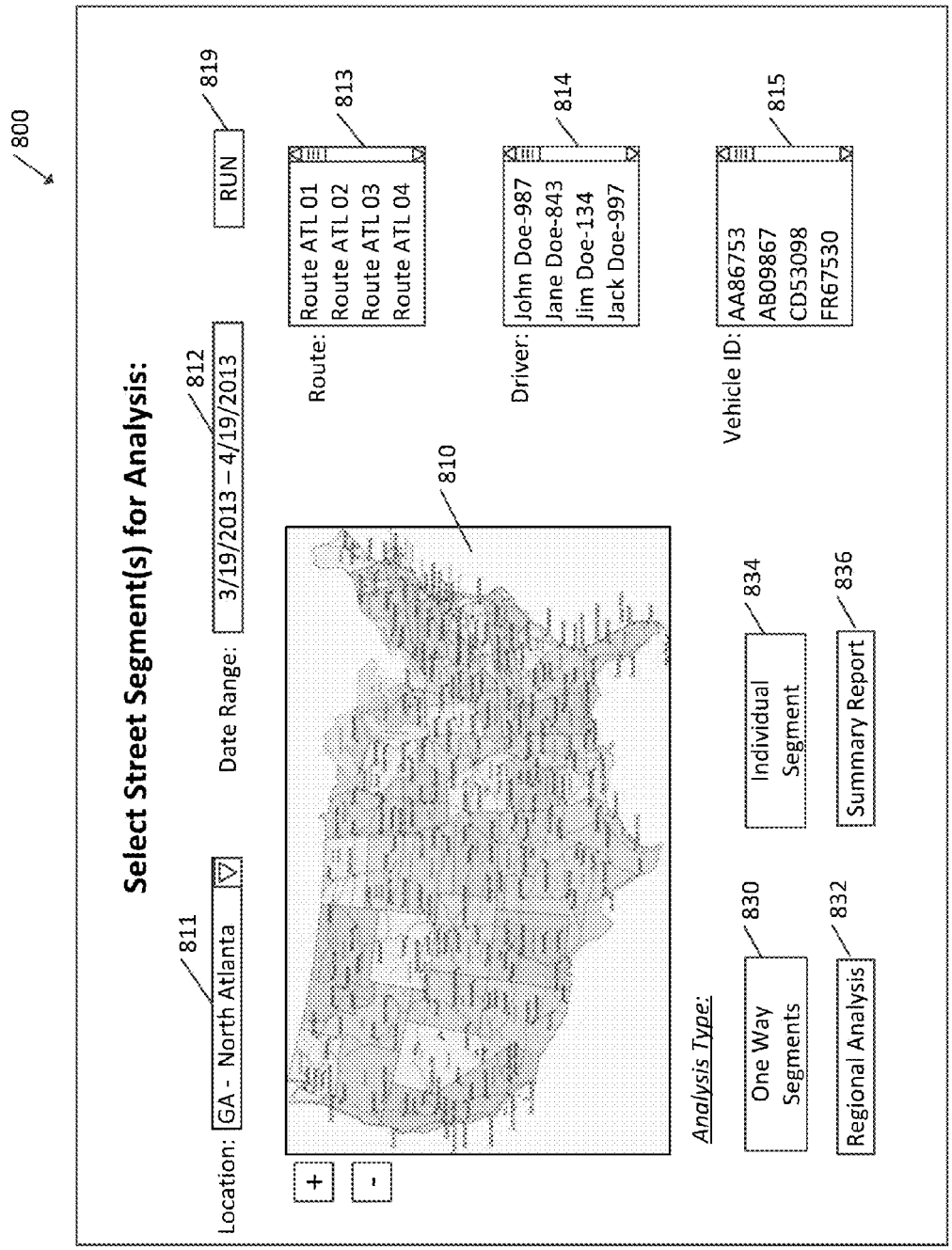
FIG. 9 shows a start-up view of a graphical user interface according to one embodiment of the present invention.

FIG. 9 illustrates a start-up user interface 800 according to one embodiment. In the illustrated embodiment, the start-up user interface 800 includes an interactive geographical map display 810, a location menu 811, a date selection field 812, a route selection menu 813, a driver selection menu 814, a vehicle selection menu 815, a summary report button 836, an individual segment analysis button 834, a regional analysis button 832, a one-way segment analysis 830, and a run analysis button 819.

According to various embodiments, the map and menus 810-815 allow a system user to specify various operational data (e.g., telematics data, user computing entity data, contextual data, and/or the like) attributes in order to select certain traveled segment data for evaluation by the central server 120. In various embodiments, any combination of selections made from the map and menus 810-815 will dictate the traveled segment data loaded and analyzed by the central server 120. For example, in one embodiment, the user may request evaluation of only traveled segment data relating to a particular vehicle route by selecting a route from the route selection menu 813. Likewise, the user may request evaluation of only traveled segment data relating to a particular vehicle by selecting a vehicle ID from the vehicle selection menu 815 and may request evaluation of only traveled segment data relating to vehicles operated by a particular driver by selecting a driver from the driver selection menu 814. As an example, where both a route and vehicle have been selected, the central server 120 would load only traveled segment data relating to the selected vehicle while traveling along the selected route.

Furthermore, a user may request evaluation only of operational data captured on a particular date or range of dates by selecting a desired date or date range (as well as specific time of day associated with any selected date) using the date section field 812. The user also has the option of requesting evaluation of operational data for all routes stemming from a particular location (e.g., by selecting only one or more shipping hub locations from the location menu 811), or for all routes at all locations on a particular date (e.g., by selecting only a date or date range using the date selection field 812). Moreover, a user may request evaluation of traveled segment data relating to a particular geographical area by selecting an area on map display 810 (e.g., by using a mouse to select a two-dimensional geographical area on the map display 810). The map display 810 may also include tools for zooming in on various portions of the illustrated route, selecting a specific intersection for further analysis, and/or the like. As will be appreciated from the description above, the user may request evaluation of all operational data or any subset of operational data defined by any combination of parameters provided in the map/menus 810-815.

After selecting operational data to be evaluated, the user may select a particular type of segment analysis to be performed by the central server 120. As described in greater detail below, in one embodiment, the central server 120 may be configured to analyze the user-selected traveled segment data to generate a summary report, an individual segment analysis, a regional analysis, and a one-way segment analysis. Each of these analyses may be requested by a user by selecting the corresponding one of the analysis type buttons 830-836 on the start-up interface 800. After the user-selected data and analysis type has been defined using the map/menus 810-815 and analysis type buttons 830-836, the user may select the run analysis button 819 to trigger the user-requested analysis by the central server 120.

Figure 10:
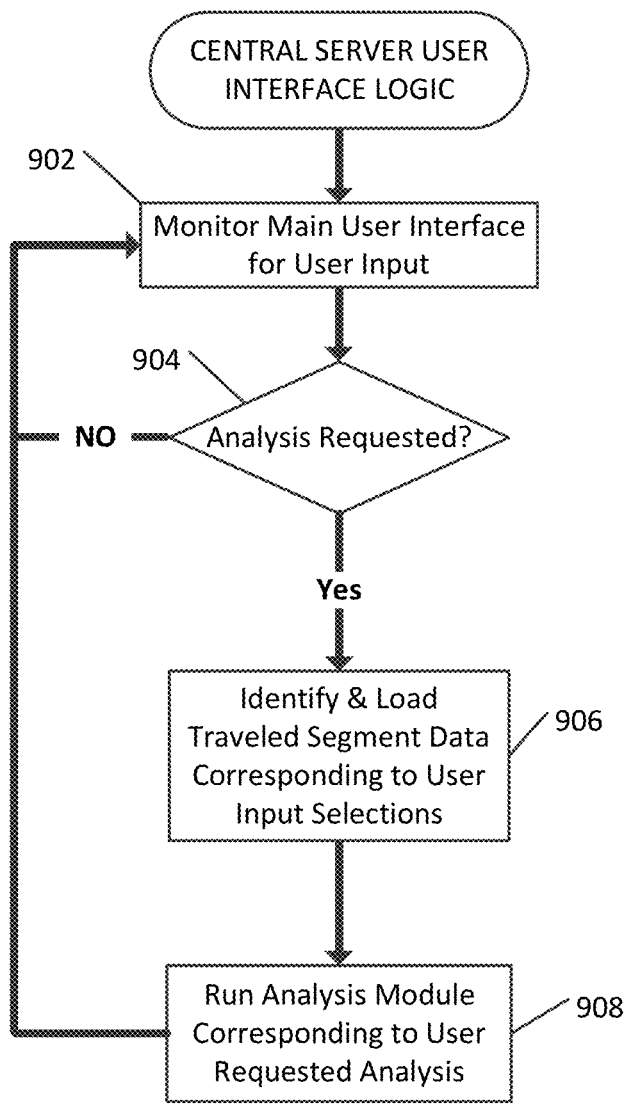
FIG. 10 shows exemplary steps executed by a central server in order to respond to user evaluation requests received via a user interface according to one embodiment of the present invention.

According to various embodiments, the central server 120 may be configured to detect a user's selection of the various parameters and options presented on the user interface 800 and call one or more of the software modules 2000-6000 to perform the appropriate data evaluation. FIG. 10 illustrates exemplary steps executed by the central server 120 in order to respond to user evaluation requests received via the user interface 800. Beginning at step 902, the central server 120 monitors the user interface 800 for user input (e.g., selection of the various menus and buttons 810-839). Next, at step 904, the central server 120 determines whether the user has requested an analysis of particular traveled segment data (e.g., by selecting the run analysis button 819). If the user has not requested that an analysis be performed, the central server 120 moves back to step 902, where it continues to monitor the user interface 800 for user input. If the user has requested that an analysis be performed, the central server 120 moves to step 906.

At step 906, the central server 120 identifies the traveled segment data corresponding to the user's selections from the map/menus 810-815 on the user interface. For example, in one embodiment, the central server 120 reviews the traveled segment data in the street segment data set and identifies the appropriate data based on the contextual data in each traveled segment data record. According to various embodiments, the central server 120 reviews the traveled segment time field to identify segments occurring on a particular date/time, the traveled segment location field to identify segments within a particular geographic location, the traveled segment defined segment identifier to identify segments corresponding to a particular defined street segment, the traveled segment route field to identify segments relating to a particular vehicle route, the traveled segment driver field to identify segments relating to a particular driver, and the traveled segment vehicle field to identify segments relating to a particular vehicle. In certain embodiments, where the user selects the individual segment analysis button 834, the central server 120 may be configured to prompt the user to select a defined street segment (or to define a new defined street segment) from the map display 810 (or by entering a textual description of the street segment) and retrieve traveled segment data corresponding to that particular location (e.g., based on the location field in the traveled segment data records). After identifying the traveled segment data corresponding to the user's request, the central server 120 loads the identified traveled segment database for analysis by one or more of the modules 3000-6000 (e.g., by retrieving the data from the street segment data set in the central server database and loading it in the central server's memory).

Next, at step 908, the central server 120 executes the analysis module corresponding to the user's selection on the user interface 800. For example, if the user selects the individual segment analysis button 834, the central server 120 will execute the individual segment analysis module 3000. If the user selects the one-way segment analysis button 830, the central server 120 will execute the one-way segment analysis module 4000. If the user selects the regional analysis button 832, the central server 120 will execute the regional analysis module 5000. And if the user selects the summary report button 836, the central server 120 will execute the summary report module 6000. A detailed description of the functionality and steps executed by each of the modules 3000-6000 now follows.

Individual Segment Analysis

Figure 11:
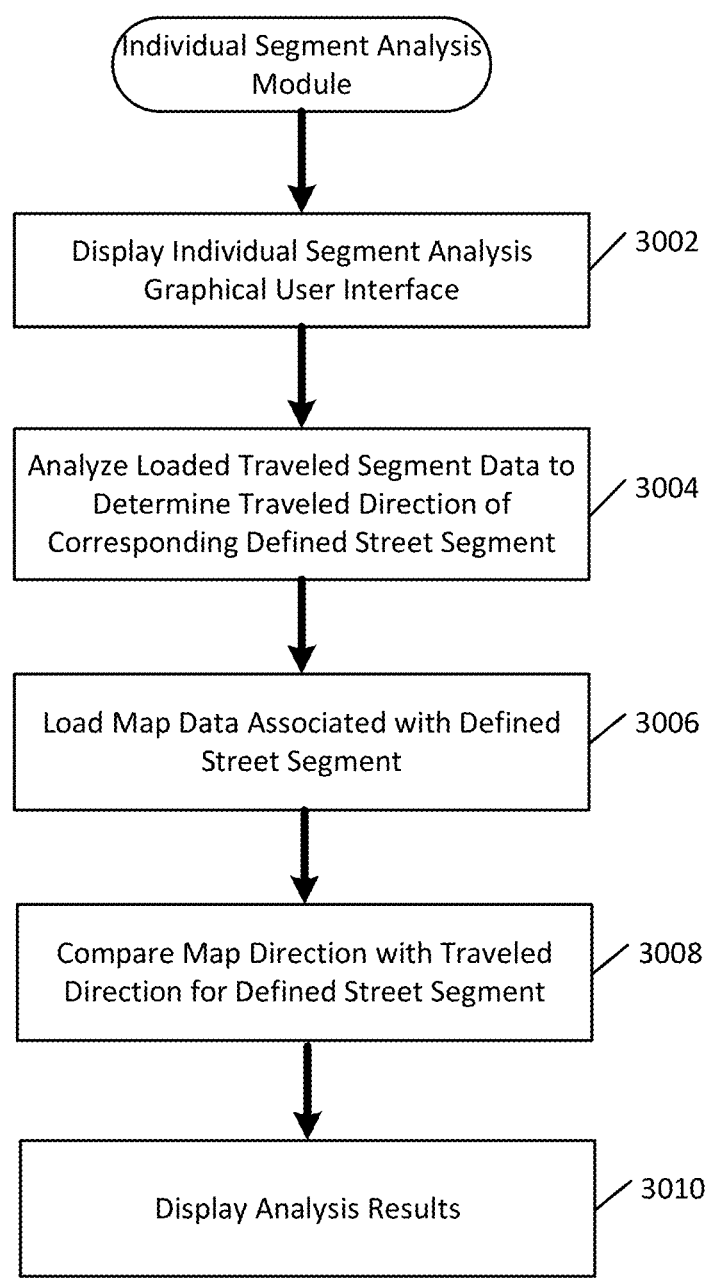
FIG. 11 shows exemplary steps executed by an individual segment analysis module according to one embodiment of the present invention.
Figure 12:
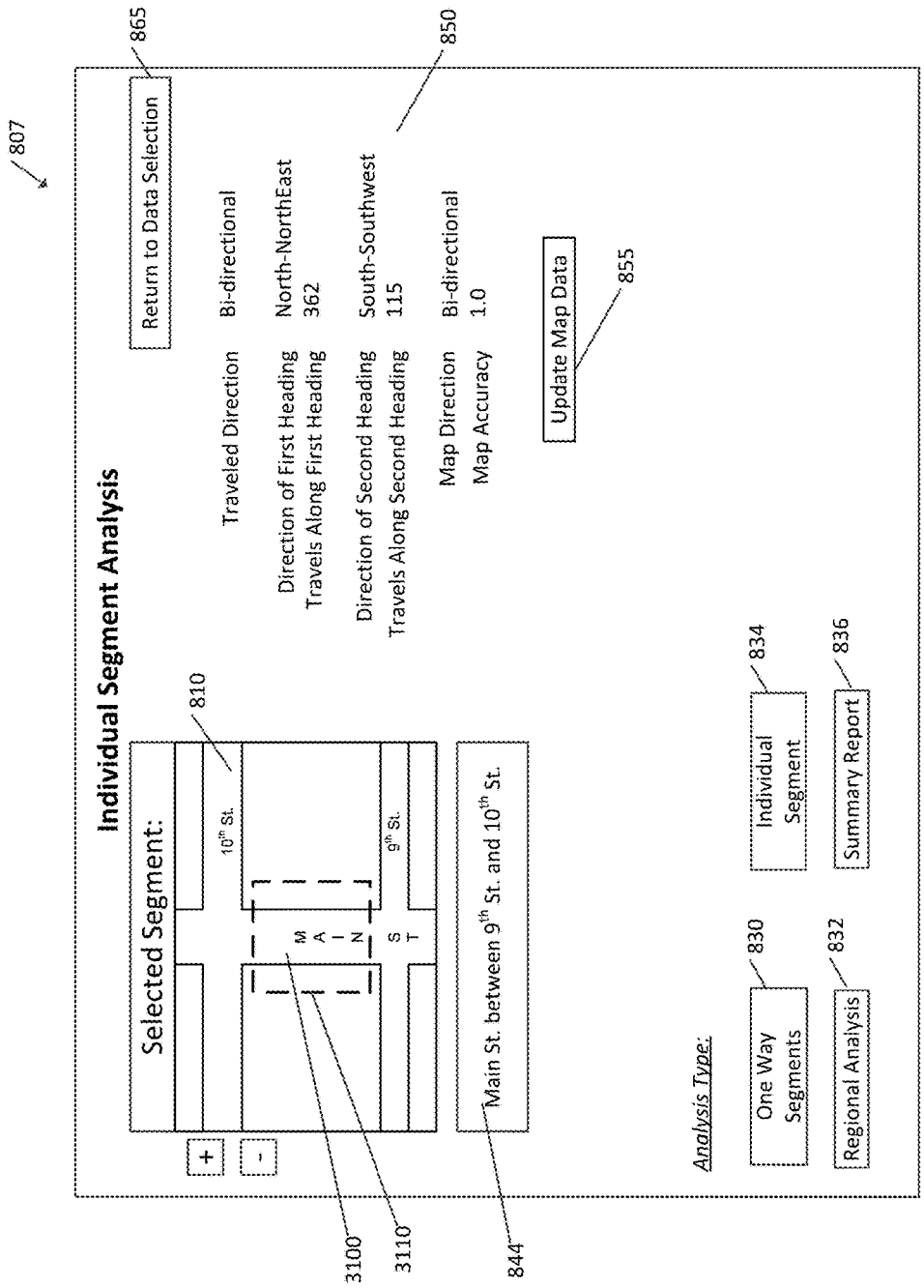
FIG. 12 shows an individual segment analysis graphical user interface according to one embodiment of the present invention.

According to various embodiments, the individual segment analysis module 3000 may be configured to analyze traveled segment data relating to a particular user-selected defined street segment and determine the accuracy of map data associated with the defined segment. For example, FIG. 11 illustrates exemplary steps executed by the individual segment analysis module 3000 in order to analyze traveled segments in the loaded data corresponding to the user-selected segment 3100 and provide an interactive display of information for the related defined street segment to a user. Beginning at step 3002, the individual segment analysis module 3000 displays an individual segment analysis user interface. FIG. 12 shows an individual segment analysis user interface 807 according to one embodiment. As shown in FIG. 12, the individual segment analysis user interface 807 includes a map display 810, a textual description of the user-selected segment 844, analysis buttons 830-836 (e.g., the same as those provided on the start-up user interface 800), a data table 850, a update map data button 855, and a return to data selection button 865.

As discussed above in relation to step 906 executed by the central server 120 in FIG. 10, where the user selects the individual segment analysis button 834, the central server 120 may be configured to prompt the user to select a defined street segment from the map display 810 (or by entering a textual description of the defined street segment) and retrieve traveled segment data corresponding to that street segment. For example, the individual segment analysis module 3000 may load one or more traveled segments associated with the segment identifier corresponding to the user-selected segment. Accordingly, at step 3004, the individual segment analysis module 3000 next analyzes the loaded traveled segment data relating to the user-selected segment to determine the traveled direction. For example, the individual segment analysis module 3000 may determine that the defined street segment is a one-way segment or a bi-directional segment based on the loaded traveled segment data.

Figure 13:
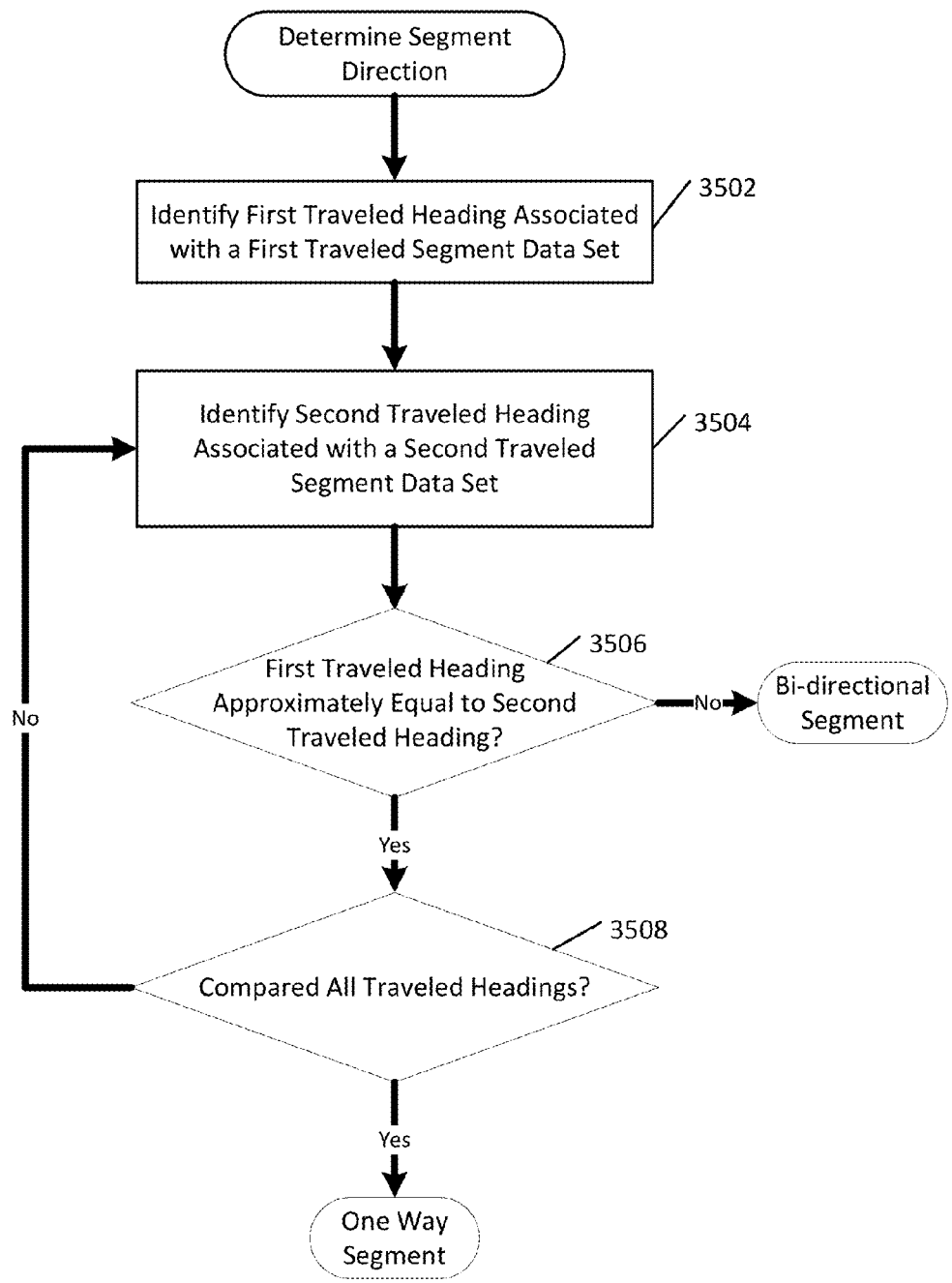
FIG. 13 shows exemplary steps executed to determine a traveled direction according to one embodiment of the present invention.

FIG. 13 illustrates an example process used to determine the traveled direction in one embodiment. At step 3502, a first traveled heading associated with a first traveled segment is identified. For example, as noted above, each traveled segment record may have a traveled heading stored in association therewith. At step 3504, a second traveled heading associated with a second traveled segment is identified. Next, at step 3506, the first traveled heading and the second traveled heading are compared to determine if the second traveled heading is approximately equal to the first traveled heading. For example, if the first traveled heading is north and the second traveled heading is also north, the individual segment analysis module 3000 will determine that the second traveled heading is approximately equal to the first traveled heading. In another example, if the first traveled heading is north and the second traveled heading is northeast, the individual segment analysis module 3000 will determine that the second traveled heading is approximately equal to the first traveled heading. In yet another example, if the first traveled heading is north and the second traveled heading is south or southeast, the individual analysis module 3000 will determine that the second traveled heading is not approximately equal to the first traveled heading. In still another example, if the first traveled heading is 0°, the individual analysis module 3000 will determine that the second traveled heading is approximately equal to the first traveled heading if the second traveled heading is within a predetermined range of the first traveled heading (e.g., within 10°, 30°, 60°, or 90° of the first traveled heading) and the individual analysis module 3000 will determine that the second traveled heading is not approximately equal to the first traveled heading if the second traveled heading is not within a predetermined range of the first traveled heading (e.g., not within 10°, 30°, 60°, or 90° of the first traveled heading).

If, at step 3506, the individual segment analysis module 3000 determines that the second traveled heading is not approximately equal to the first traveled heading, then the individual segment analysis module 3000 will determine that the user-selected segment is a bi-directional segment. If at step 3506, the individual segment analysis module 3000 determines that the second traveled heading is approximately equal to the first traveled heading, then it is determined, at step 3508, if the first traveled heading has been compared to the traveled heading for each of the loaded travel segments. If the first traveled heading has been compared to the travel heading for each of the loaded travel segments, then the segment is a one-way segment. If the first traveled heading has not yet been compared to the traveled heading for each of the loaded traveled segments, then the individual segment analysis module 3000 returns to step 3504 and selects another second traveled heading associated with another second traveled segment. It should be understood that a variety of methods may be used to determine the traveled direction based on the loaded traveled segment data.

Returning to FIG. 11, at step 3006, the map data associated with the user-selected segment being analyzed is loaded. The map data comprises an indication of the map direction (e.g., whether the user-selected segment is a one-way segment or a bi-directional segment). For example, the map data may indicate the direction(s) vehicles may travel along the segment, may have a one-way segment flag associated therewith, and/or the like. At step 3008, the traveled direction is compared to the map direction. If the traveled direction and the map direction agree (e.g., both the traveled direction and the map direction indicate the defined segment is a one-way segment), the individual segment analysis module 3000 determines that the map data is accurate. If the traveled direction and the map direction disagree (e.g., the traveled direction indicates the defined segment is a bi-directional segment and the map direction indicates the defined segment is a one-way segment), the individual segment analysis module 3000 determines that the map data is inaccurate and may flag the map data and/or user-selected segment for further analysis and/or review.

Next, at step 3010, the individual segment analysis module 3000 displays the results of the analysis of the user-selected segment and the corresponding traveled segments. As shown in FIG. 12, the user-selected segment 3100 may be shown on the map display 810. The parameters used to define the user-selected segment 3100 may also be illustrated on the map display 810. For example, geo-fence 3110, used to define the user-selected segment 3100, is shown on the map display 810, in FIG. 12. The individual segment analysis module 3000 also displays the calculated segment statistics in the data table 850 on the segment analysis user interface 807. For example, the data table 850 shows the traveled direction, a first heading and the number of traveled segments having a traveled heading approximately equal to the first heading, a second heading and the number of traveled segments having a traveled heading approximately equal to the second heading, the map direction and an indicator of whether the map data is accurate or not. In some embodiments, an indicator of which direction(s) a vehicle may travel the user-selected segment according to the map data may also be provided. In some embodiments, the user may request to update the map data based on the loaded traveled segment data. For example, if the map data is not accurate, a user may select the update map data button 855 indicating the central server 120 should update the map data based on the loaded traveled segment data.

As will be appreciated from the foregoing description, the individual segment user interface 807 generated by the individual segment analysis module 3000 provides a clear display of segment information/data for a user-selected segment. Once the individual segment analysis module 3000 has executed the steps shown FIG. 11, the user may return to the start-up interface 800 by selecting the return to data selection button 865, or request a different analysis of the currently selected data by selecting one of the analysis type buttons 830-836.

As noted above, a user may select the update map data button 855. In various embodiments, upon receipt of input indicating user selection of the update map data button 855, the map data may be automatically updated based on the traveled segment data. For example, if the map data indicates that a segment is a one-way segment, but the traveled segment data indicates the segment is a bi-directional segment, the central server 120 may automatically updated the map data associated with the segment upon receipt of input indicating user selection of the update map data button 855. In another embodiment, upon selection of the update map data button 855, a satellite or aerial image of the segment or a portion of the segment may be identified and displayed to the user. The user may then determine and provide input regarding whether the map data for the segment should be updated. For example, the central server 120 may identify and cause display of a satellite or aerial image (e.g., via the user interface). The central server 120 may then receive user input (e.g., via the user interface) indicating the user would like to update the map data or not update the map data. If the user input received (e.g., via the user interface) indicates the user would like to update the map data, the map data is updated accordingly. In yet another embodiment, the map data may be automatically updated based on the traveled segment data without the user selecting the update map data button 855.

One-Way Segments

Figure 14:
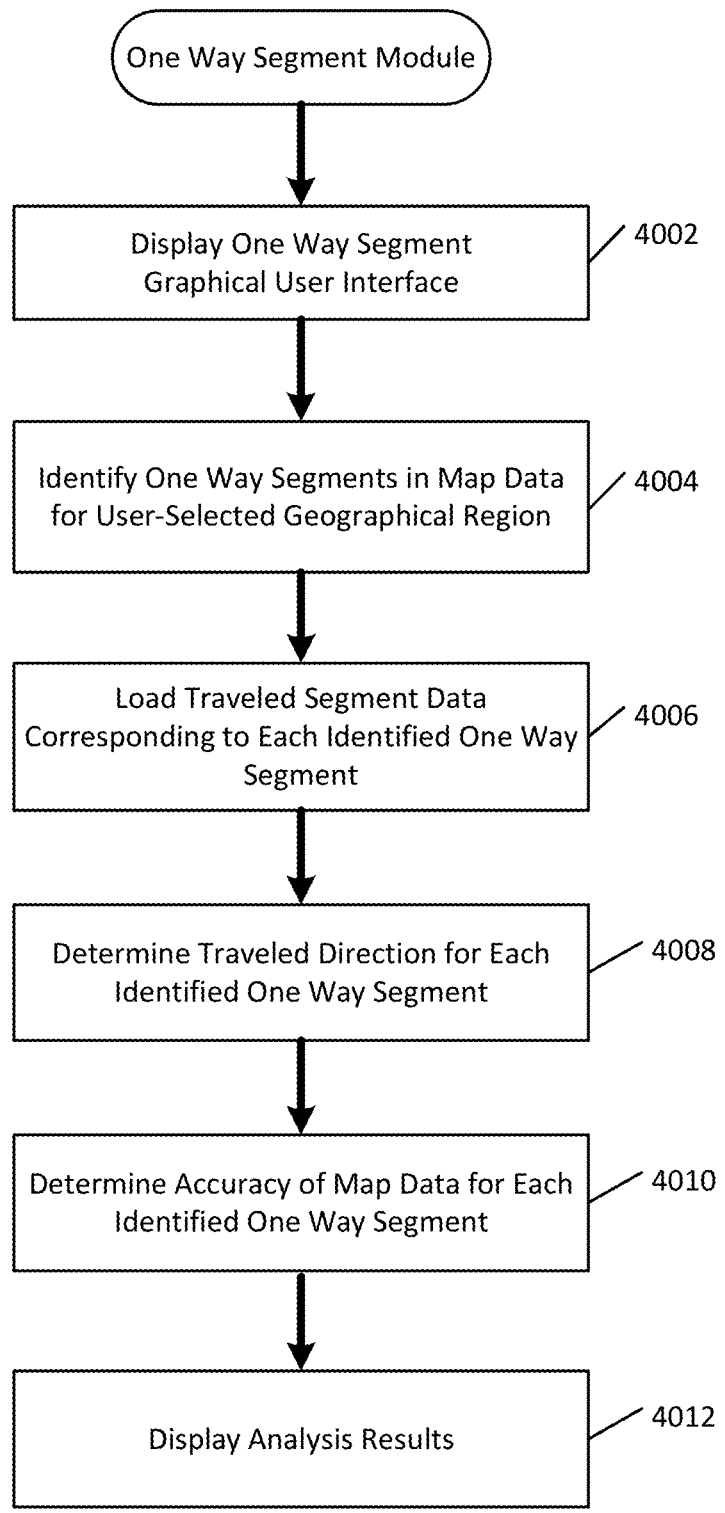
FIG. 14 shows exemplary steps executed by a one-way segment module according to one embodiment of the present invention.
Figure 15:
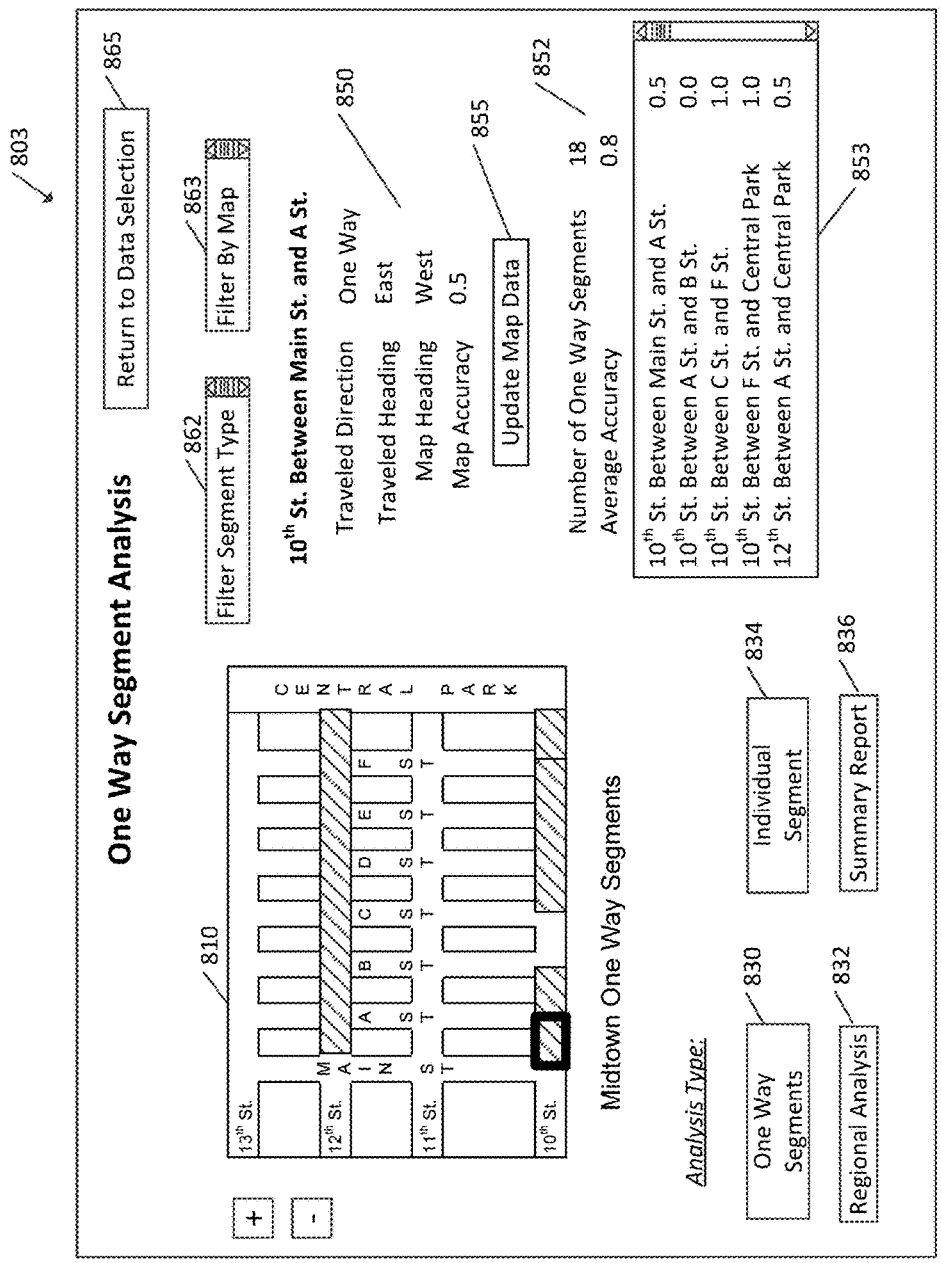
FIG. 15 shows a one-way segment graphical user interface according to one embodiment of the present invention.

According to various embodiments, the one-way segment module 4000 may be configured to identify one-way segments in the map data for a user-selected geographical region, a user-selected time range, or other user-selected data set, and analyze traveled segment data associated with the identified one-way segments to determine if the map data is accurate. For example, FIG. 14 illustrates exemplary steps executed by the one-way segment module 4000 in order to determine the accuracy of map data and provide a user with an analysis thereof. Beginning at step 4002, the one-way segment module 4000 displays a one-way segment user interface. FIG. 15 shows a one-way segment user interface 803 according to one embodiment. As shown in FIG. 15, the one-way segment user interface 803 includes a map display 810, analysis buttons 830-836 (e.g., the same as those provided on the start-up user interface 800), a data table 850, an analysis summary 852, a segment selector 853, an update map data button 855, a segment type filter menu 862, a filter by map button 863, and a return to data selection button 865.

Next, at step 4004, the one-way segment analysis module 4000 identifies one-way segments located within the user-selected geographical region. For example, the one-way segment analysis module 4000 accesses the map data associated with the user-selected geographical region and, based on the map data, identifies one-way segments located therein. For example, the map data associated with a defined street segment may comprise one or more directions that a vehicle may travel along the defined street segment, a flag indicating that the defined segment is a one-way segment, and/or other indicia of whether the defined street segment is a one-way segment or bi-directional segment.

In various embodiments, the user-selected geographical region is based on a hub location (e.g., the defined street segments traveled by all vehicles operating out of a particular hub), a route (e.g., the defined street segments traveled by a particular route), a selected region of a map, a predefined geographical area (e.g., a particular town/city, a zone or portion of a town/city (e.g., Northeast Atlanta), a particular neighborhood), and/or other geographical region.

At step 4006, the one-way segment module 4000 loads traveled segment data from the street segment data set for traveled segments corresponding to the identified one-way segments and in accordance with the user-selected date and/or time range. For example, the one-way segment module 4000 may load traveled segment data associated with a defined segment identifier associated with one of the identified one-way segments. At step 4008, the one-way segment module 4000 may analyze the loaded traveled segment data to determine a traveled direction for each of the identified one-way segments. For example, the one-way segment module 4000 may conduct an analysis of the loaded traveled segment data for each of the identified one-way segments similar to the analysis illustrated in FIG. 13 and described above.

At step 4010, the one-way segment module 4000 may compare the traveled direction to the map direction for each of the identified one-way segments to determine the accuracy of the map data. For example, if the traveled segment data indicates that a segment that was identified as a one-way segment based on the map data is a bi-directional segment, the map data may be inaccurate. In some embodiments, the one-way segment module 4000 may further identify a map heading for at least one of the identified one-way segments based on the map data and indicating a direction that a vehicle can travel along the identified one-way segment. The traveled heading associated with one or more of the traveled segments corresponding to the identified one-way segment may be compared to the map heading to determine the accuracy of the map data.

The analysis is displayed at step 4012 via the one-way segment user interface 803, as illustrated in FIG. 15. For example, the one-way segment module 4000 displays the user-selected geographical region on the map display 810 and the identified one-way segments may be marked thereon. As noted above, the one-way segment user interface 803 may include a segment selector 853 configured to allow a user to select one of the identified one-way segments. As shown in FIG. 15, the data table 850 may display a detailed analysis of the selected one-way segment in addition to the analysis summary 852. Additionally, the one-way segment module 4000 may cause the selected one-way segment to be highlighted on the map display 810.

As will be appreciated from the foregoing description, the one-way segment user interface 803 generated by the one-way segment module 4000 provides a clear display of the identified one-way segments for the user-selected geographical region and time and/or date range and enables the user to quickly view and compare attributes of each of these one-way segments and the accuracy of the corresponding map data. Once the one-way segment analysis module 4000 has executed the steps shown FIG. 14, the user may review the analysis for one or more of the identified one-way segments, update map data for one or more identified one-way segments based on the corresponding traveled segment data by selecting the update map data button 855, return to the start-up interface 800 by selecting the return to data selection button 865, or request a different analysis of the currently selected data by selecting one of the analysis type buttons 830-836.

Regional Analysis

Figure 16:
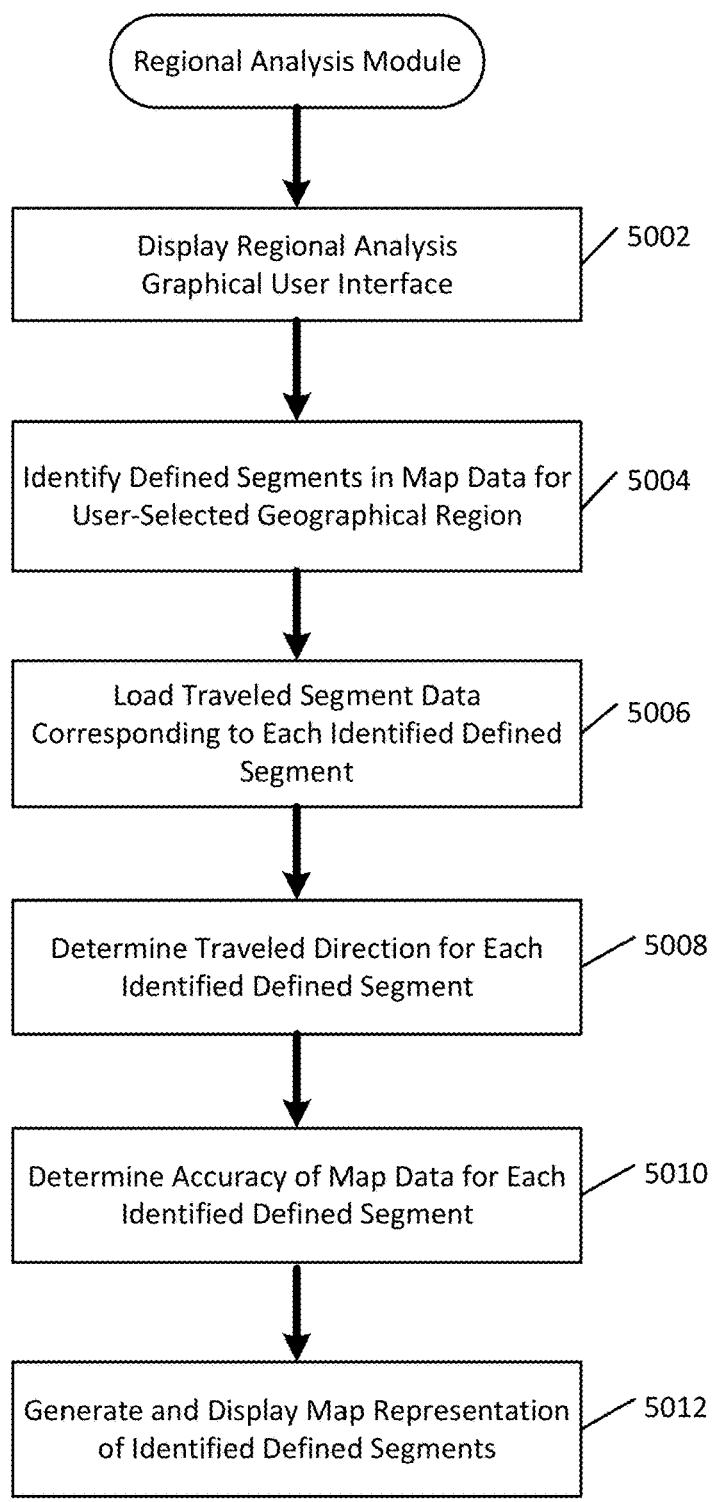
FIG. 16 shows exemplary steps executed by a regional analysis module according to one embodiment of the present invention.
Figure 17:
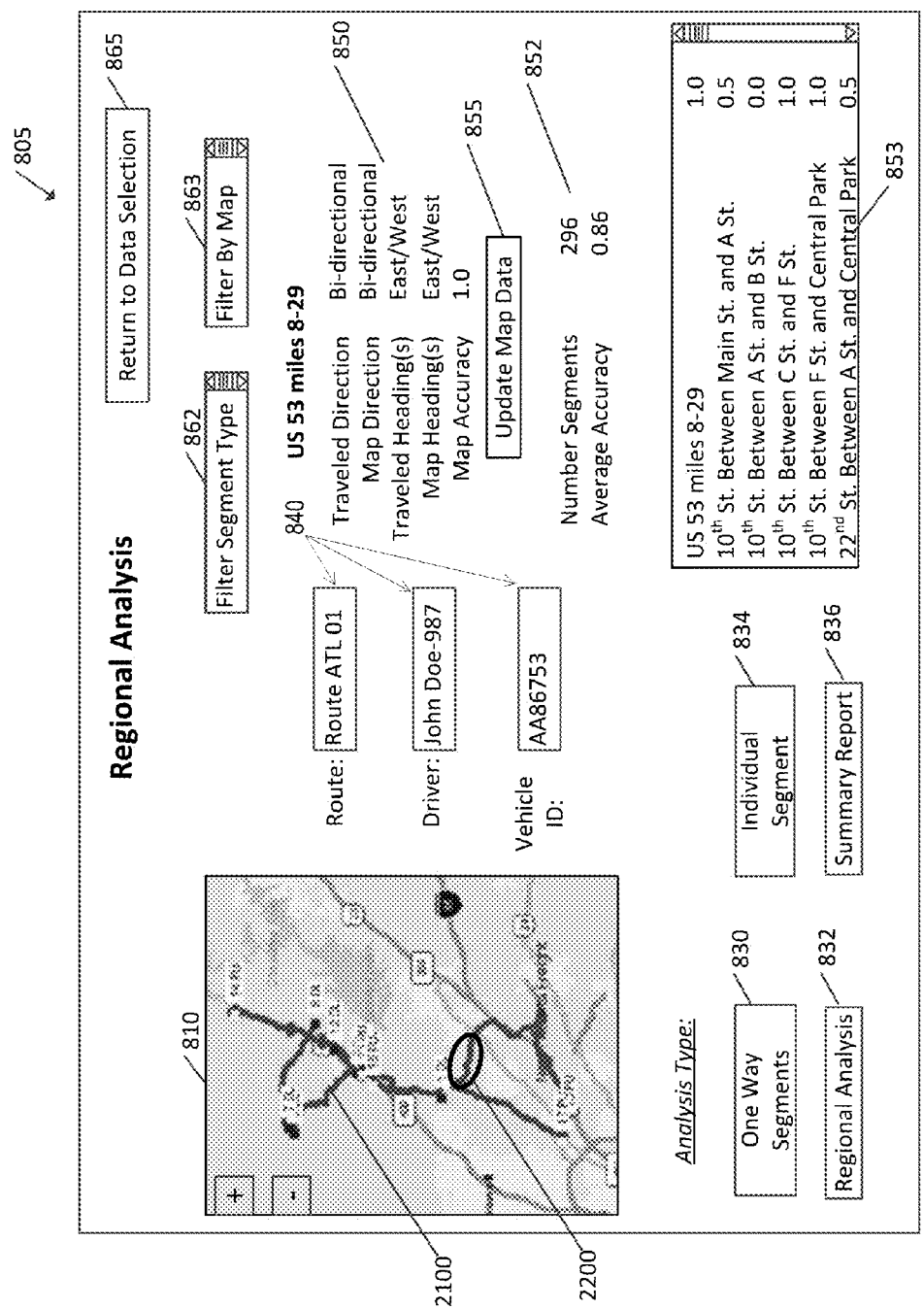
FIG. 17 shows a regional analysis graphical user interface according to one embodiment of the present invention.

According to various embodiments, the regional analysis module 5000 may be configured to analyze user-selected traveled segment data corresponding to defined segments located within a user-selected geographical region and determine the accuracy of map data associated with the defined segments based on the traveled segment data. For example, FIG. 16 illustrates exemplary steps executed by the regional analysis module 5000 in order to analyze traveled segments in the loaded data and provide an interactive display of traveled segment statistics to a user. Beginning at step 5002, the regional analysis module 5000 displays a regional analysis user interface. FIG. 17 shows a regional analysis user interface 805 according to one embodiment. As shown in FIG. 17, the regional analysis user interface 805 includes a map display 810, analysis buttons 830-836 (e.g., the same as those provided on the start-up user interface 800), a data table 850, current data indicators 840, an analysis summary 852, a segment selector 853, an update map data button 855, a segment type filter menu 862, a filter by map button 863, and a return to data selection button 865.

Next, at step 5004, the regional analysis module 5000 identifies the defined street segments located within the user-selected geographical area. In various embodiments, the user may select the geographical region based on a hub location (e.g., the defined street segments traveled by all vehicles operating out of a particular hub), a route (e.g., the defined street segments traveled by a particular route), a selected region of a map, a predefined geographical area (e.g., a particular town/city, a zone or portion of a town/city (e.g., Northeast Atlanta), a particular neighborhood), and/or other geographical region. The map data for the user-selected geographical region may be accessed and used to identify the defined street segments located within the user-selected geographical area.

At step 5006, the traveled segment data corresponding to the identified segments is loaded. The regional analysis module 5000 analyzes the loaded traveled segment data to determine a traveled direction for each identified segment at step 5008. For example, the regional analysis module 5000 may conduct an analysis similar to that described above and illustrated in FIG. 13. At step 5010, the regional analysis module 5000 compares the traveled direction to a map direction indicated by the identified segment map data for each identified segment, to determine the accuracy of the map data.

The analysis is provided to the user and a map representation of the identified segments is generated and displayed to the user at step 5012. For example, if the selected geographical region is a particular route, the regional analysis module 5000 generates a graphical representation of the travel path 2100 of the vehicle associated with user-selected data on the map display 810. In one embodiment, the regional analysis module 5000 accomplishes this by plotting each individual location data point in the loaded operational data (e.g., the loaded traveled segment data) on the map display 810 and then connecting the plotted location points in chronological order—based on the retrieved time data—with lines displayed over the base map. In various embodiments the travel path(s) generated by the regional analysis module 5000 may each comprise colored line(s) having a thickness greater than that of roads shown in the base map and which include arrows disposed along the travel path(s) to indicate the direction of the vehicle's 100 travel. If the user-selected geographical region is a set of routes, a vehicle travel path for each route may be generated and displayed on the map display 810.

The user may view information/data corresponding to a particular identified segment by selecting the particular identified segment using the segment selector 853. In various embodiments, the map display 810 may highlight the selected identified segment on the map, may automatically zoom in on the selected identified segment, and/or the like. For example, the regional analysis module 5000 may highlight the selected segment 2200 as illustrated in FIG. 17. The data table 850 may be updated to display information/data associated with the identified segment selected via the segment selector 853.

As will be appreciated from the foregoing description, the regional analysis user interface 805 generated by the regional analysis module 5000 provides a clear display of segment information/data for defined street segments located within a user-selected geographical area. Once the regional analysis module 5000 has executed the steps shown FIG. 16, the user may return to the start-up interface 800 by selecting the return to data selection button 865, or request a different analysis of the currently selected data by selecting one of the analysis type buttons 830-836.

Summary Reports

Figure 18:
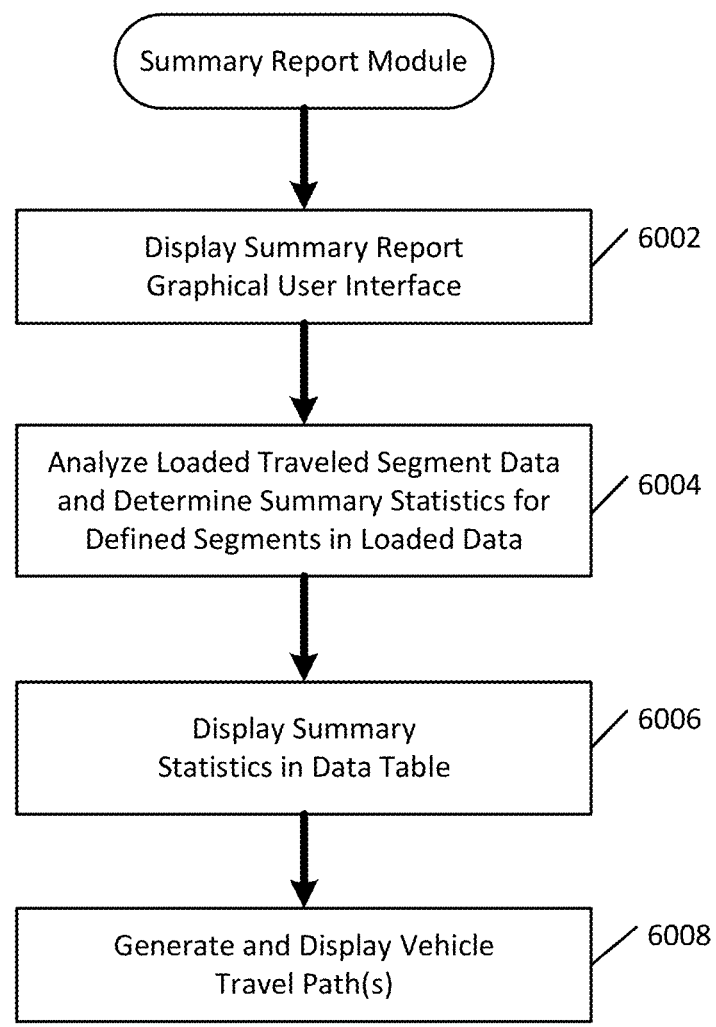
FIG. 18 shows exemplary steps executed by a summary report module according to one embodiment of the present invention.
Figure 19:
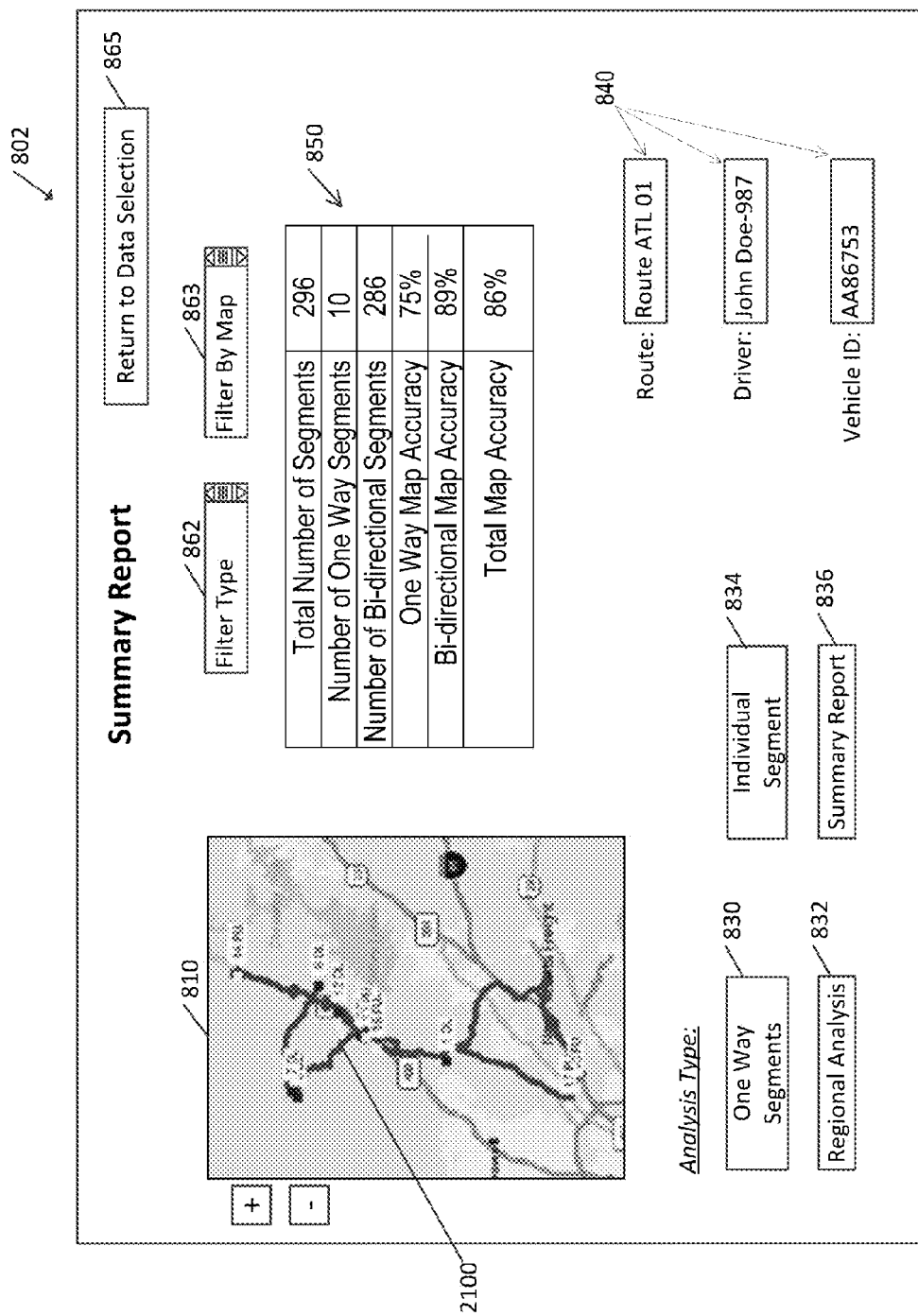
FIG. 19 shows a summary report graphical user interface according to one embodiment of the present invention.

According to various embodiments, the summary report module 6000 may be configured to analyze the user-selected traveled segment data and provide an overall summary of the defined street segments associated with the user-selected data. For example, FIG. 18 illustrates exemplary steps executed by the summary report module 6000 in order to provide an interactive display of segment statistics to a user. Beginning at step 6002, the summary report module 6000 displays a summary report user interface. FIG. 19 shows a summary report user interface 802 according to one embodiment. As shown in FIG. 19, the summary report user interface 802 includes a map display 810, analysis buttons 830-836 (e.g., the same as those provided on the start-up user interface 800), a data table 850, a segment type filter menu 862, a filter by map button 863, current data indicators 840, and a return to data selection button 865.

Next, at step 6004, the summary report module 6000 analyzes the traveled segment data loaded by the central server 120 and calculates a plurality of segment statistics based on the loaded traveled segment data. For example, in one embodiment the summary report module 6000 may be configured to calculate the following statistics: (i) the total number of defined segments corresponding to traveled segments in the loaded traveled segment data; (ii) the number of one-way segments traveled as indicated by the traveled segment data; (iii) the number of bi-directional segments traveled as indicated by the traveled segment data; (iv) map data accuracy for traveled one-way segments (e.g., the percentage of traveled segments that the map data indicates are one-way segments that the traveled segment data indicates are one-way segments); (v) the map data accuracy for traveled bi-directional segments (e.g., the percentage of traveled segments that the map data indicates are bi-directional segments that the traveled segment data indicates are bi-directional segments); and (vi) the combined map data accuracy for one-way and bi-direction segments traveled (e.g., the percentage of all segments traveled for which the map data and the traveled segment data agree). In various embodiments, the summary report module 6000 may use a process similar to that illustrated in FIG. 13 and described above when calculating one or more of the summary statistics. As will be appreciated from the description herein, the summary report module 6000 may be configured to execute these calculations based on the relevant fields in each traveled segment data record contained in the loaded traveled segment data. Additionally, according to various other embodiments, the summary report module 6000 may be configured to calculate any additional relevant statistics based on the loaded traveled segment data.

Next, at step 6006, the summary report module 6000 displays the calculated segment statistics in the data table 850 on the summary report user interface 802. In addition, the current data indicators 840 show the route, driver, and/or vehicle associated with the currently analyzed user-selected data. As shown in FIG. 19, the segment statistics displayed in the data table 850 can be recalculated based on filtered data using the segment type filter menu 862, and the filter by map button 863. For example, in response to user input received via the segment type filter menu 862, the summary report module 6000 will recalculate the segment statistics for only traveled segments having a type matching one or more types specified by the user. For example, the segment type may indicate whether the segment is a delivery segment, in which a delivery or pickup occurred, a travel segment, which was traveled to get to a delivery segment, located in particular part of the region (e.g., downtown, midtown, and/or the like), or some other segment classification. Additionally, in response to selection of the filter by map button 863, the summary report module 6000 enables a user to select a geographical area in the map display 810 and will then recalculate the segment statistics based only on traveled segments occurring within the user-defined map area.

If the user-selected data is defined by one or more routes (e.g., a summary report of a particular route or set of routes), at step 6008, the summary report module 6000 generates and displays the vehicle path(s) 2100, as described above, on the map display 810. Thus, the summary report module 6000 also plots the travel path (or paths) 2100 of the vehicle (or vehicles) associated with the user-selected traveled segments on the map display 810.

As will be appreciated from the foregoing description, the summary report user interface 802 generated by the summary report module 6000 provides a clear display of segment statistics for the user-selected data and enables the user to quickly assess the overall map data accuracy for defined street segments based on traveled segment data for traveled segments associated with particular routes, drivers, vehicles, hubs, geographical regions, or the like associated with the analyzed data. Once the summary report module 6000 has executed the steps shown FIG. 18, the user may return to the start-up interface 800 by selecting the return to data selection button 865, or request a different analysis of the currently selected data by selecting one of the analysis type buttons 830-836.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for updating map data associated with a street segment, the method comprising:
receiving a plurality of instances of vehicle telematics data indicative of a travel path of a vehicle on a street segment during one or more time periods, wherein each instance of the vehicle telematics data (a) comprises location data captured by a location-determining device onboard the vehicle and (b) is captured responsive to a triggering event, the plurality of instances of vehicle telematics data comprising (i) a first instance of telematics data wherein the triggering event is detection of a vehicle event based on data generated by one or more vehicle sensors of a plurality of vehicle sensors onboard the vehicle, and (ii) a second instance of telematics data wherein the triggering event is a determination that a threshold amount of time has elapsed since the preceding instance of the vehicle telematics data was captured;
segmenting the vehicle telematics data to determine a portion of the vehicle telematics data corresponding to the travel path of the vehicle on the street segment, the segmenting of the vehicle telematics data comprising:
accessing a street segment definition associated with the street segment,
identifying a plurality of data points along the street segment, wherein identifying the plurality of data points comprises identifying a segment starting point where the vehicle entered the street segment, where the segment starting point is a data point where an immediately preceding data point was not captured when the vehicle was located on the street segment,
assessing the location data of the vehicle telematics data based on the street segment definition, identifying one or more instances of vehicle telematics data corresponding to the street segment definition, and defining a set of instances of vehicle telematics data consisting of the identified one or more instances of vehicle telematics data corresponding to the street segment definition, based at least in part on the set of instances of vehicle telematics data, determining a street segment direction for the street segment, the determined street segment direction indicating whether the street segment is a one-way street segment or a bidirectional street segment;

identifying map data associated with the street segment, wherein the map data comprises street segment direction data indicator indicating whether the street segment is a one-way street segment or a bidirectional street segment; and updating the map data to reflect the determined street segment direction for the street segment direction.

2. The method of claim 1, wherein determining a street segment direction for the street segment comprises determining a heading associated with the travel path of the vehicle based at least in part on the vehicle telematics data.

3. The method of claim 1, wherein the street segment is a one-way street segment.

4. The method of claim 1, wherein the street segment is a bidirectional street segment.

5. The method of claim 1 further comprising:
determining a first heading associated with the vehicle telematics data, wherein the first heading indicates that the vehicle traveled along the street segment in a first direction;
determining a second heading associated with the vehicle telematics data, wherein the second heading indicates that the vehicle traveled along the street segment in a second direction;
determining whether the first direction and the second direction are substantially different directions; and
responsive to determining that the first direction and the second direction are substantially different directions, indicating that the street segment is a bi-directional segment.

6. The method of claim 1 further comprising:
determining a first heading associated with the vehicle telematics data, wherein the first heading indicates that the vehicle traveled along the street segment in a first direction;
determining a second heading associated with the vehicle telematics data, wherein the second heading indicates that the vehicle traveled along the street segment in a second direction;
determining whether the first direction and the second direction are substantially similar directions; and
responsive to determining that the first direction and the second direction are substantially similar directions, indicating that the street segment is a one-way street segment.

7. A computing system comprising at least one processor and at least one memory including computer program code, the at least one memory and the computer program code configured to, with the processor, cause the computing system to at least:
receive a plurality of instances of vehicle telematics data indicative of a travel path of a vehicle on a street segment during one or more time periods, wherein each instance of the vehicle telematics data (a) comprises location data captured by a location-determining device onboard the vehicle and (b) is captured responsive to a triggering event, the plurality of instances of vehicle telematics data comprising (i) a first instance of telematics data wherein the triggering event is detection of a vehicle event based on data generated by one or more vehicle sensors of a plurality of vehicle sensors onboard the vehicle, and (ii) a second instance of telematics data wherein the triggering event is a determination that a threshold amount of time has elapsed since the preceding instance of the vehicle telematics data was captured;

segment the vehicle telematics data to determine the portion of the vehicle telematics data corresponding to the travel path of the vehicle on the street, wherein to segment the vehicle telematics data, the at least one memory and the computer program code are configured to, with the processor, cause the computing system to at least:

access a street segment definition associated with the street segment, identify a plurality of data points along the street segment, wherein identifying the plurality of data points comprises identifying (a) a segment starting point where the vehicle entered the street segment, where the segment starting point is a data point where an immediately preceding data point was not captured when the vehicle was located on the street segment and (b) a segment ending point where the vehicle exited the street segment, where the segment ending point is a data point where an immediately seceding data point was not captured when the vehicle was located on the street segment, assess the location data of the vehicle telematics data based on the street segment definition, identify one or more instances of vehicle telematics data corresponding to the street segment definition, and define a set of instances of vehicle telematics data consisting of the identified one or more instances of vehicle telematics data corresponding to the street segment definition, based at least in part on the set of instances of vehicle telematics data, determine a street segment direction for the street segment, the determined street segment direction indicating whether the street segment is a one-way street segment or a bidirectional street segment;

identify map data associated with the street segment, wherein the map data comprises street segment direction data indicator indicating whether the street segment is a one-way street segment or a bidirectional street segment; and update the map data to reflect the determined street segment direction for the street segment direction.

8. The computing system of claim 7, wherein determining a street segment direction for the street segment comprises determining a heading associated with the travel path of the vehicle based at least in part on the vehicle telematics data.

9. The computing system of claim 7, wherein the street segment is a one-way street segment.

10. The computing system of claim 7, wherein the street segment is a bidirectional street segment.

11. The computing system of claim 7 wherein the at least one memory and the computer program code are further configured to, with the processor, cause the computing system to at least:

determine a first heading associated with the vehicle telematics data, wherein the first heading indicates that the vehicle traveled along the street segment in a first direction;

determine a second heading associated with the vehicle telematics data, wherein the second heading indicates that the vehicle traveled along the street segment in a second direction;

determine whether the first direction and the second direction are substantially different directions; and responsive to determining that the first direction and the second direction are substantially different directions, indicate that the street segment is a bi-directional segment.

12. The computing system of claim 7 wherein the at least one memory and the computer program code are further configured to, with the processor, cause the computing system to at least:

determine a first heading associated with the vehicle telematics data, wherein the first heading indicates that the vehicle traveled along the street segment in a first direction;

determine a second heading associated with the vehicle telematics data, wherein the second heading indicates that the vehicle traveled along the street segment in a second direction;

determine whether the first direction and the second direction are substantially similar directions; and responsive to determining that the first direction and the second direction are substantially similar directions, indicate that the street segment is a one-way street segment.

13. A computer program product comprising at least one non-transitory computer-readable storage medium having computer-readable program code portions stored therein, the computer-readable program code portions comprising:

an executable portion configured to receive a plurality of instances of vehicle telematics data indicative of a travel path of a vehicle on a street segment during one or more time periods, wherein each instance of the vehicle telematics data (a) comprises location data captured by a location-determining device onboard the vehicle and (b) is captured responsive to a triggering event, the plurality of instances of vehicle telematics data comprising (i) a first instance of telematics data wherein the triggering event is detection of a vehicle event based on data generated by one or more vehicle sensors of a plurality of vehicle sensors onboard the vehicle, and (ii) a second instance of telematics data wherein the triggering event is a determination that a threshold amount of time has elapsed since the preceding instance of the vehicle telematics data was captured;

an executable portion configured to segment the vehicle telematics data to determine the portion of the vehicle telematics data corresponding to the travel path of the vehicle on the street, wherein, to segment the vehicle telematics data, the executable portion is configured to:

access a street segment definition associated with the street segment, assess the location data of the vehicle telematics data based on the street segment definition, identify a plurality of data points along the street segment, wherein identifying the plurality of data points comprises identifying a segment starting point where the vehicle entered the street segment, where the segment starting point is a data point where an immediately preceding data point was not captured when the vehicle was located on the street segment, identify one or more instances of vehicle telematics data corresponding to the street segment definition, and define a set of instances of vehicle telematics data consisting of the identified one or more instances of vehicle telematics data corresponding to the street segment definition, an executable portion configured to, based at least in part on the set of instances of vehicle telematics data, determine a street segment direction for the street segment, the determined street segment direction indicating whether the street segment is a one-way street segment or a bidirectional street segment;

an executable portion configured to identify map data associated with the street segment, wherein the map data comprises street segment direction data indicator indicating whether the street segment is a one-way street segment or a bidirectional street segment; and an executable portion configured to update the map data to reflect the determined street segment direction for the street segment direction.

14. The computer program product of claim 13, wherein determining a street segment direction for the street segment comprises determining a heading associated with the travel path of the vehicle based at least in part on the vehicle telematics data.

15. The computer program product of claim 13, wherein the street segment is a one-way street segment.

16. The computer program product of claim 13, wherein the street segment is a bidirectional street segment.

17. The computer program product of claim 13 wherein the computer-readable program code portions further comprise:

an executable portion configured to determine a first heading associated with the vehicle telematics data, wherein the first heading indicates that the vehicle traveled along the street segment in a first direction;

an executable portion configured to determine a second heading associated with the vehicle telematics data, wherein the second heading indicates that the vehicle traveled along the street segment in a second direction;

an executable portion configured to determine whether the first direction and the second direction are substantially different directions; and an executable portion configured to, responsive to determining that the first direction and the second direction are substantially different directions, indicate that the street segment is a bidirectional segment.

18. The computer program product of claim 13 wherein the computer-readable program code portions further comprise:

an executable portion configured to determine a first heading associated with the vehicle telematics data, wherein the first heading indicates that the vehicle traveled along the street segment in a first direction;

an executable portion configured to determine a second heading associated with the vehicle telematics data, wherein the second heading indicates that the vehicle traveled along the street segment in a second direction;

an executable portion configured to determine whether the first direction and the second direction are substantially similar directions; and an executable portion configured to, responsive to determining that the first direction and the second direction are substantially similar directions, indicate that the street segment is a one-way street segment.

* * * * *

UNITED STATES PATENT AND TRADEMARK OFFICE
CERTIFICATE OF CORRECTION

PATENT NO. : 10,309,788 B2
APPLICATION NO. : 14/708624
DATED : June 4, 2019
INVENTOR(S) : Mark J. Davidson Page 1 of 1

It is certified that error appears in the above-identified patent and that said Letters Patent is hereby corrected as shown below:

On the Title Page

Item (56) Page 6, Column 2, Line 47: delete "ArdGIS9" and replace with --ArcGIS9--.

In the Specification

Column 4, Line 17: delete "the" and replace with --The--.

Column 4, Line 22: delete "configured to based" and replace with --configured to, based--.

Column 14, Line 32: delete "(l)" and replace with --(n)--.

In the Claims

Column 42, Line 32: delete "seceding" and replace with --succeeding--.

Signed and Sealed this
Sixteenth Day of July, 2019

Andrei Iancu
*Director of the United States Patent and Trademark Office*